United States Patent
DeGrazia et al.

(10) Patent No.: US 6,292,076 B1
(45) Date of Patent: Sep. 18, 2001

(54) CIRCUIT INTERRUPTER WITH IMPROVED DIN RAIL MOUNTING ADAPTOR

(75) Inventors: Dean B. DeGrazia, Pittsburgh; Erik R. Bogdon, Carnegie; Michael J. Spangler, Zelienople; Gary R. Funk, Murrysville; Roger W. Helms, Beaver Falls; David C. Turner, Imperial, all of PA (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 09/385,611

(22) Filed: Aug. 30, 1999

(51) Int. Cl.[7] ...................................................... H01H 9/02
(52) U.S. Cl. ............................................ 335/202; 361/807
(58) Field of Search ................................. 335/6, 23–27, 335/35–47, 167–176, 202; 200/293–303; 218/154, 155; 361/600, 652, 673, 636, 807, 809, 810

(56) References Cited

U.S. PATENT DOCUMENTS

| | | | | |
|---|---|---|---|---|
| 5,103,373 | * | 4/1992 | Rusch et al. | 361/335 |
| 5,694,288 | * | 12/1997 | Shortt et al. | 361/673 |
| 5,761,026 | * | 6/1998 | Robinson et al. | 361/627 |
| 5,768,091 | * | 6/1998 | Vinson et al. | 361/601 |
| 5,904,592 | * | 5/1999 | Baran et al. | 439/532 |

* cited by examiner

Primary Examiner—Lincoln Donovan
Assistant Examiner—Tuyen T. Nguyen
(74) Attorney, Agent, or Firm—Charles E. Kosinski

(57) ABSTRACT

A DIN rail adapter for a circuit interrupter including a backplate having two guide members and two substantially planar stabilizing tab. The backplate further includes a first spring attachment region. A slider is slideably disposed between the guide members and the stabilizing tabs, and includes a second spring attachment region. A spring is disposed between the first and second spring attachment regions for biasing the slider in a first direction.

17 Claims, 71 Drawing Sheets

OFF POSITION

ON POSITION

TRIPPED POSITION

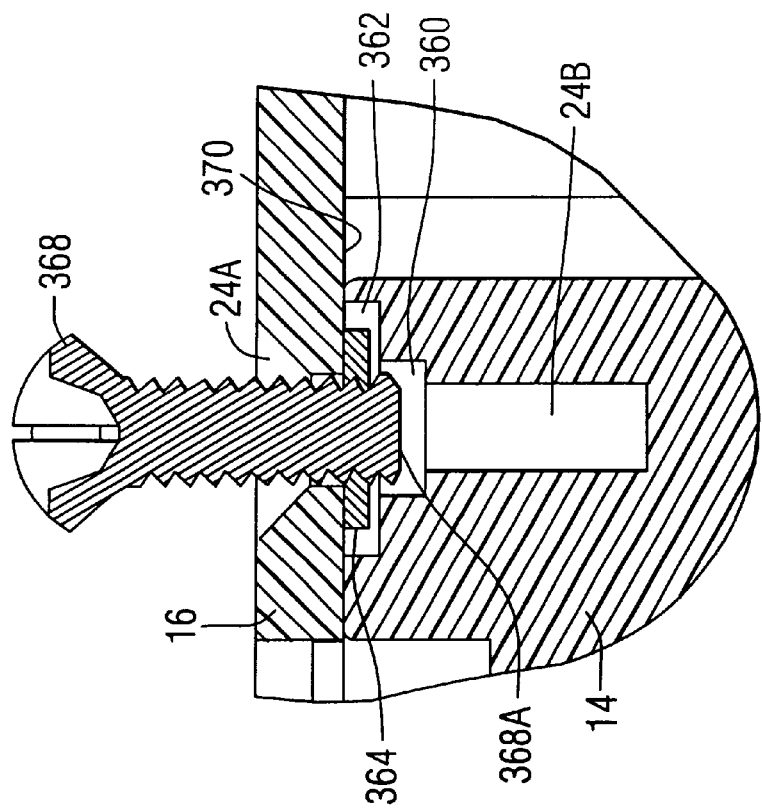
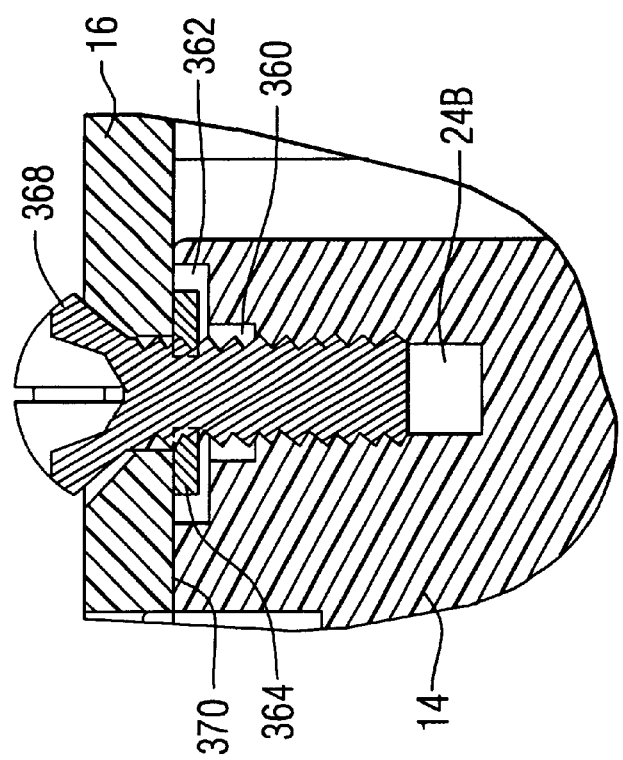
FIG. 44B
FIG. 44A

CIRCUIT INTERRUPTER WITH IMPROVED DIN RAIL MOUNTING ADAPTOR

CROSS REFERENCE TO RELATED APPLICATIONS

The subject matter of this invention is related to concurrently filed applications: U.S. patent application Ser. No. 09/386,126, filed Aug. 30, 1999, entitled "Circuit Interrupter with Trip Bar Assembly Having Improved Biasing" U.S. patent application Ser. No. 09/385,611, filed Aug. 30, 1999, entitled "Circuit Interrupter with Improved Din Rail Mounting Adaptor" U.S. patent application Ser. No. 09/386,130, filed Aug. 30, 1999, entitled "Circuit Interrupter with Screw Retainment" U.S. patent application Ser. No. 09/385,303, filed Aug. 30, 1999, entitled "Circuit Interrupter with Crossbar Having Improved Barrier Protection", U.S. patent application Ser. No. 09/385,717, filed Aug. 30, 1999, entitled "Circuit Interrupter with Improved Terminal Shield and Shield Cover", U.S. patent application Ser. No. 09/386,070, filed Aug. 30, 1999, entitled "Circuit Interrupter with Versatile Mounting Holes U.S. patent application Ser. No. 09/385,304, filed Aug. 30, 1999, entitled "Circuit Interrupter Having Base with Outer Wall Support", U.S. patent application Ser. No. 09/385,392, filed Aug. 30, 1999, entitled "Molded Case Circuit Breaker With Current Flow Indicating Handle Mechanism"; U.S. patent application Ser. No. 09/385,566, filed Aug. 30, 1999, entitled "Circuit Interrupter with Trip Bas Assembly Accommodating Internal Space Constraints" U.S. patent application Ser. No. 09/385,605, filed Aug. 30, 1999, entitled "Circuit Interrupter with Accessory Trip Interface and Break-Away Access Thereto" U.S. patent application Ser. No. 09/386,539, filed Aug. 30, 1999, entitled "Circuit Interrupter with Break-Away Walking Beam Access", U.S. patent application Ser. No. 09/386,329, filed Aug. 30, 1999, entitled "Circuit Breaker With Two Piece Bell Accessory Lever With Overtravel"; and U.S. patent application Ser. No. 09/386,087, filed Aug. 30, 1999, entitled "Circuit Interrupter with Secure Base and Terminal Connection".

BACKGROUND OF THE INVENTION

1. Field of the Invention

The present invention relates to circuit interrupters generally and, more specifically, to a DIN rail adapter used for mounting an interrupter to a DIN rail.

2. Description of the Prior Art

Molded case circuit breakers and interrupters are well known in the art as exemplified by U.S. Pat. No. 4,503,408 issued Mar. 5, 1985, to Mrenna et al., and U.S. Pat. No. 5,910,760 issued Jun. 8, 1999 to Malingowski, et al., each of which is assigned to the assignee of the present application and incorporated herein by reference.

In many applications, a circuit interrupter is mounted onto a conventional DIN rail. For this purpose, a DIN rail adapter is normally connected to the bottom of the interrupter's base. Such a DIN rail adapter typically includes a slider that can slide within guides of a backplate. Stabilizers are often implemented in the backplate to help prevent lateral tilting of the slider within the guides. A spring is connected between the slider and the backplate for biasing the slider in a direction corresponding to a closed disposition wherein the slider and the backplate cooperate to engage a DIN rail. A stopping mechanism is used to limit the movement of the slider in the aforementioned direction. The slider can be pulled in the opposite direction, against the spring tension, in order to obtain an open disposition wherein clearance is provided for positioning of the adapter on the DIN rail before engagement is made.

Unfortunately, prior art DIN rail adapters have included stabilizers that require forming, bending, or curving of the backplate material in order to be provided. Such manipulation of the backplate material increases the tooling and manufacturing costs of the backplate. In addition, prior art DIN rail adapters have included stopping mechanisms that require multiple members and additional material in order to be implemented. Furthermore, prior art DIN rail adapters have required the installer to manually hold the slider against the spring tension in order to maintain the open disposition while the adapter is being correctly positioned with respect to the DIN rail.

In view of the above, it would be advantageous if a DIN rail adapter existed having effective stabilizers that could be easily and conveniently made in the backplate without requiring forming, bending, or curving procedures. It would also be advantageous if a DIN rail adapter existed having an effective stopping mechanism that employed fewer members and that did not require additional material. It would further be advantageous if a DIN rail adapter existed that did not require the installer to manually hold the slider in the open disposition throughout the installation process.

SUMMARY OF THE INVENTION

The present invention provides a circuit interrupter that meets all of the above-identified needs.

In accordance with the present invention, a DIN rail adapter for a circuit interrupter is provided which includes a backplate including two guide members and two substantially planar stabilizing tab. The backplate further includes a first spring attachment region. A slider is slideably disposed between the guide members and the stabilizing tabs, and includes a second spring attachment region. A spring is disposed between the first and second spring attachment regions for biasing the slider in a first direction.

This and other objects and advantages of the present invention will become apparent from a reading of the following description of the preferred embodiment taken in connection with the attached drawings.

BRIEF DESCRIPTION OF THE DRAWINGS

FIG. 44A is a cross-sectional, partially broken away view taken along the line 44—44 of FIG. 43A showing the mounting screw and retaining device with respect to the hole and recessed regions of the primary cover.

FIG. 44B is a cross-sectional, partially broken away view similar to FIG. 44A.

DESCRIPTION OF THE PREFERRED EMBODIMENT

Figure 1:
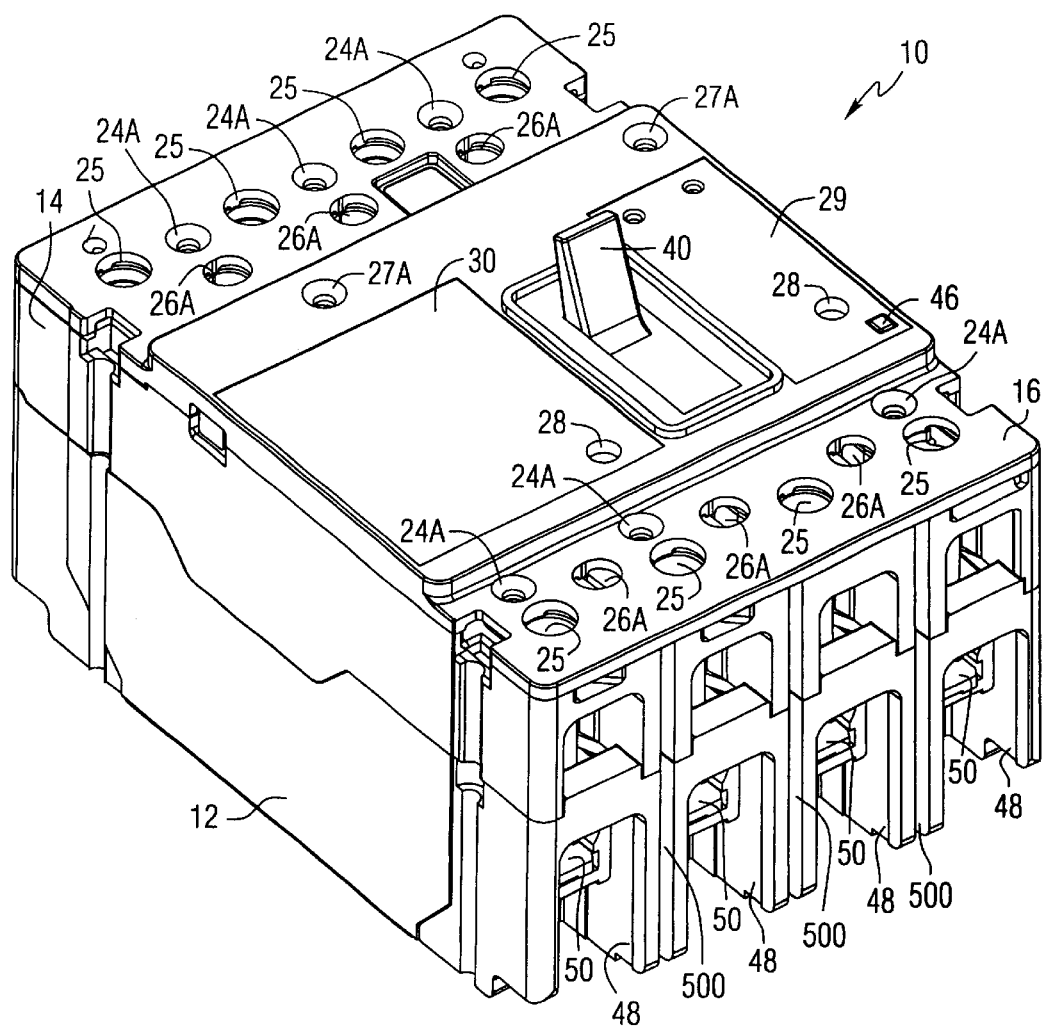
FIG. 1 is an orthogonal view of a molded case circuit interrupter embodying the present invention.
Figure 2:
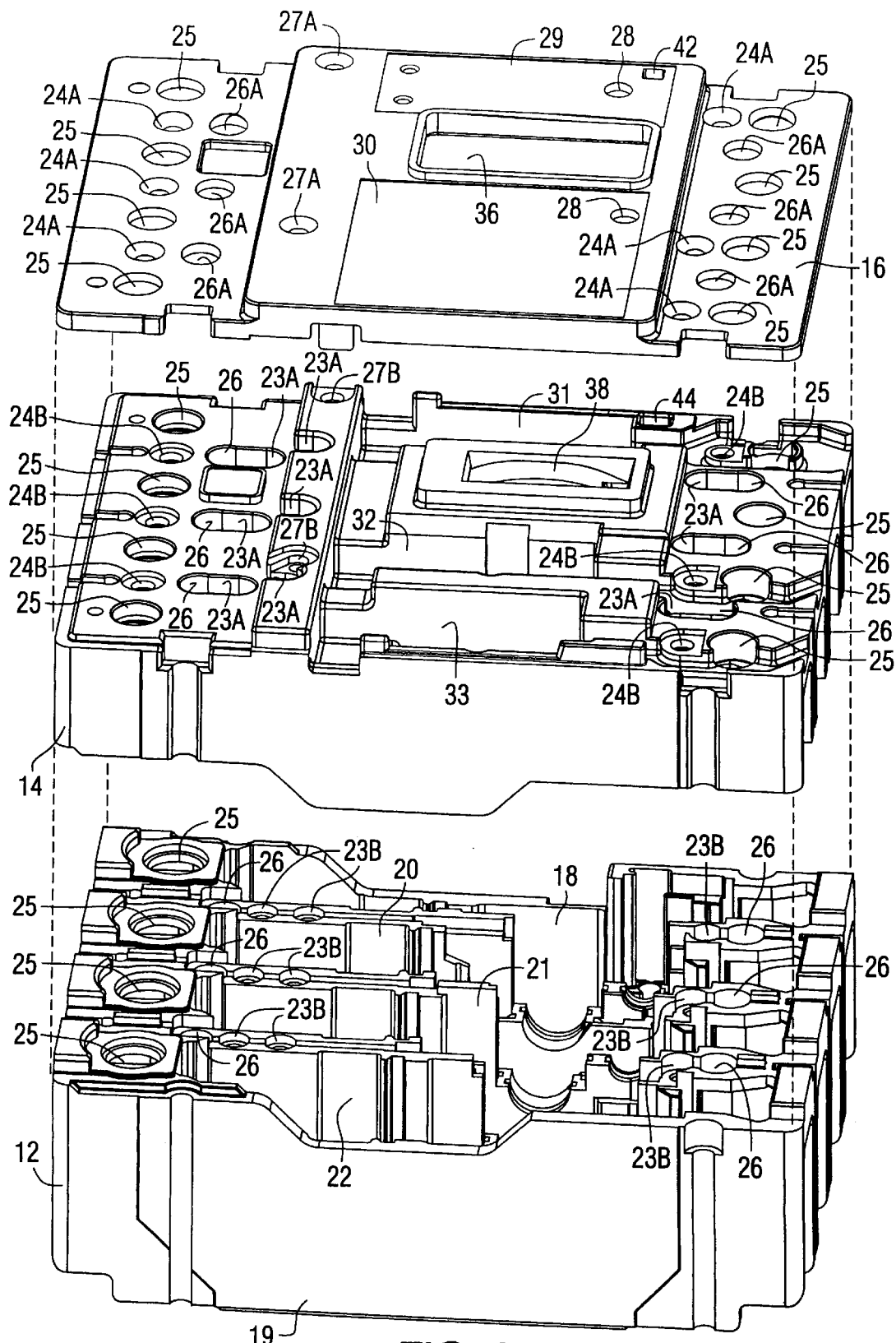
FIG. 2 is an exploded view of the base, primary cover, and secondary cover of the circuit interrupter of FIG. 1.

Referring now to the drawings and FIGS. 1 and 2 in particular, shown is a molded case circuit interrupter or breaker 10. Circuit breaker 10 includes a base 12 mechanically interconnected with a primary cover 14. Disposed on top of primary cover 14 is an auxiliary or secondary cover 16. When removed, secondary cover 16 renders some internal portions of the circuit breaker available for maintenance and the like without requiring disassembly of the entire circuit breaker. Base 12 includes outside sidewalls 18 and 19, and internal phase walls 20, 21, and 22. Holes or openings 23A are provided in primary cover 14 for accepting screws or other attaching devices that enter corresponding holes or openings 23B in base 12 for fastening primary cover 14 to base 12. Holes or openings 24A are provided in secondary cover 16 for accepting screws or other attaching devices that enter corresponding holes or openings 24B in primary cover 14 for fastening secondary cover 16 to primary cover 14. Holes 27A in secondary cover 16 and corresponding holes 27B in primary cover 14 are for attachment of external accessories as described below. Holes 28 are also for attachment of external accessories (only to secondary cover 16) as described below. Holes 25, which feed through secondary cover 16, primary cover 14, and into base 12 (one side showing holes 25), are provided for access to electrical terminal areas of circuit breaker 10. Holes 26A, which feed through secondary cover 16, correspond to holes 26 that feed through primary cover 14 and base 12, and are provided for attaching the entire circuit breaker assembly onto a wall, or into a DIN rail back panel or a load center, or the like. Surfaces 29 and 30 of secondary cover 16 are for placement of labels onto circuit breaker 10. Primary cover 14 includes cavities 31, 32, and 33 for placement of internal accessories of circuit breaker 10. Secondary cover 16 includes a secondary cover handle opening 36. Primary cover 14 includes a primary cover handle opening 38. A handle 40 (FIG. 1) protrudes through openings 36 and 38 and is used in a conventional manner to manually open and close the contacts of circuit breaker 10 and to reset circuit breaker 10 when it is in a tripped state. Handle 40 may also provide an indication of the status of circuit breaker 10 whereby the position of handle 40 corresponds with a legend (not shown) on secondary cover 16 near handle opening 36 which clearly indicates whether circuit breaker 10 is ON (contacts closed), OFF (contacts open), or TRIPPED (contacts open due to, for example, an overcurrent condition). Secondary cover 16 and primary cover 14 include rectangular openings 42 and 44, respectively, through which protrudes a top portion 46 (FIG. 1) of a button for a push-to-trip actuator. Also shown are load conductor openings 48 in base 12 that shield and protect load terminals 50. Although circuit breaker 10 is depicted as a four phase circuit breaker, the present invention is not limited to four-phase operation.

Figure 3:
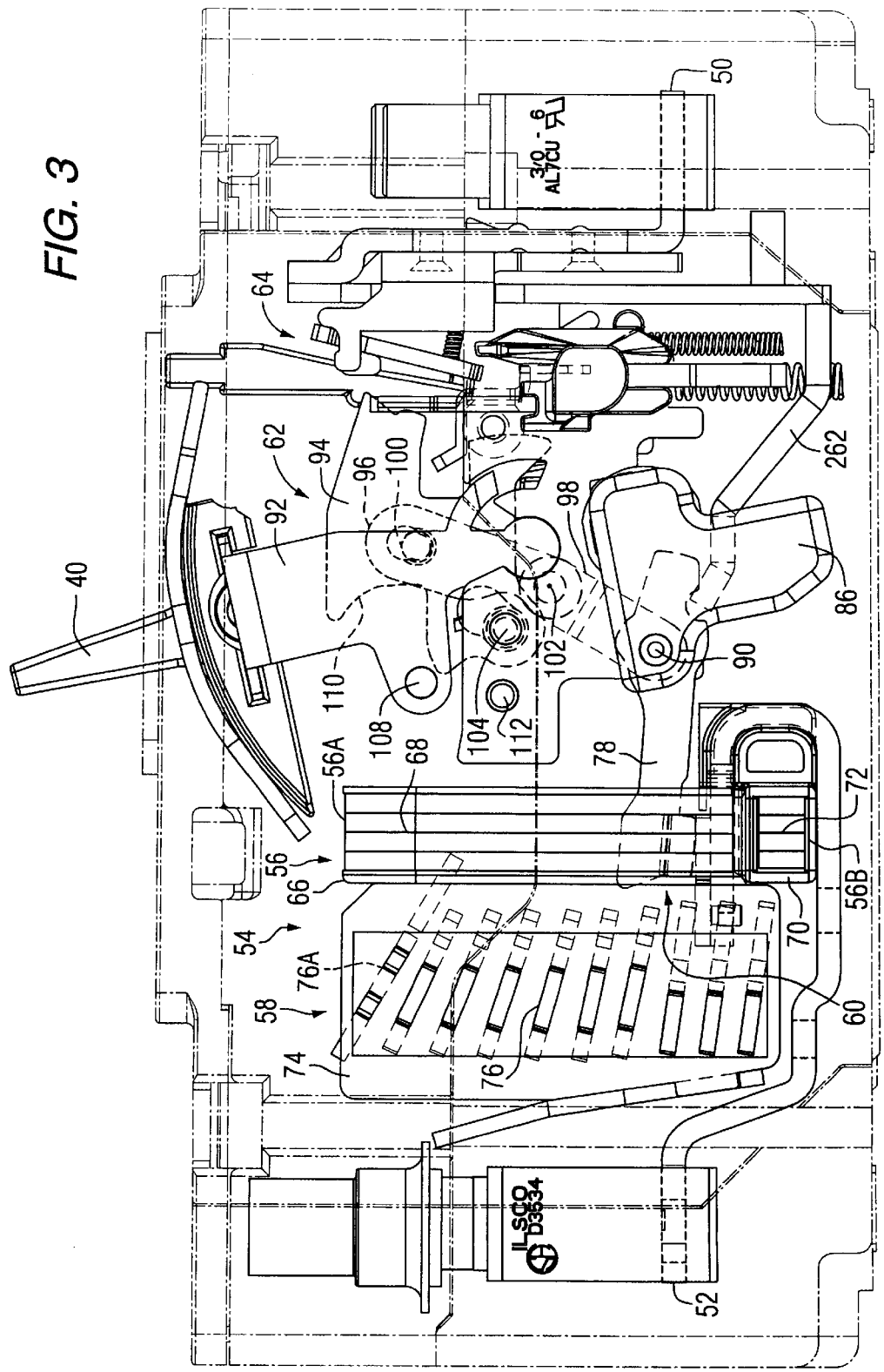
FIG. 3 is a side elevational view of an internal portion of the circuit interrupter of FIG. 1.

Referring now to FIG. 3, a longitudinal section of a side elevation, partially broken away and partially in phantom, of circuit breaker 10 is shown having a load terminal 50 and a line terminal 52. There is shown a plasma arc acceleration chamber 54 comprising a slot motor assembly 56 and an arc extinguisher assembly 58. Also shown is a contact assembly 60, an operating mechanism 62, and a trip mechanism 64. Although not viewable in FIG. 3, each phase of circuit breaker 10 has its own load terminal 50, line terminal 52, plasma arc acceleration chamber 54, slot motor assembly 56, arc extinguisher assembly 58, and contact assembly 60, as shown and described below. Reference is often made herein to only one such group of components and their constituents for the sake of simplicity.

Figure 4:
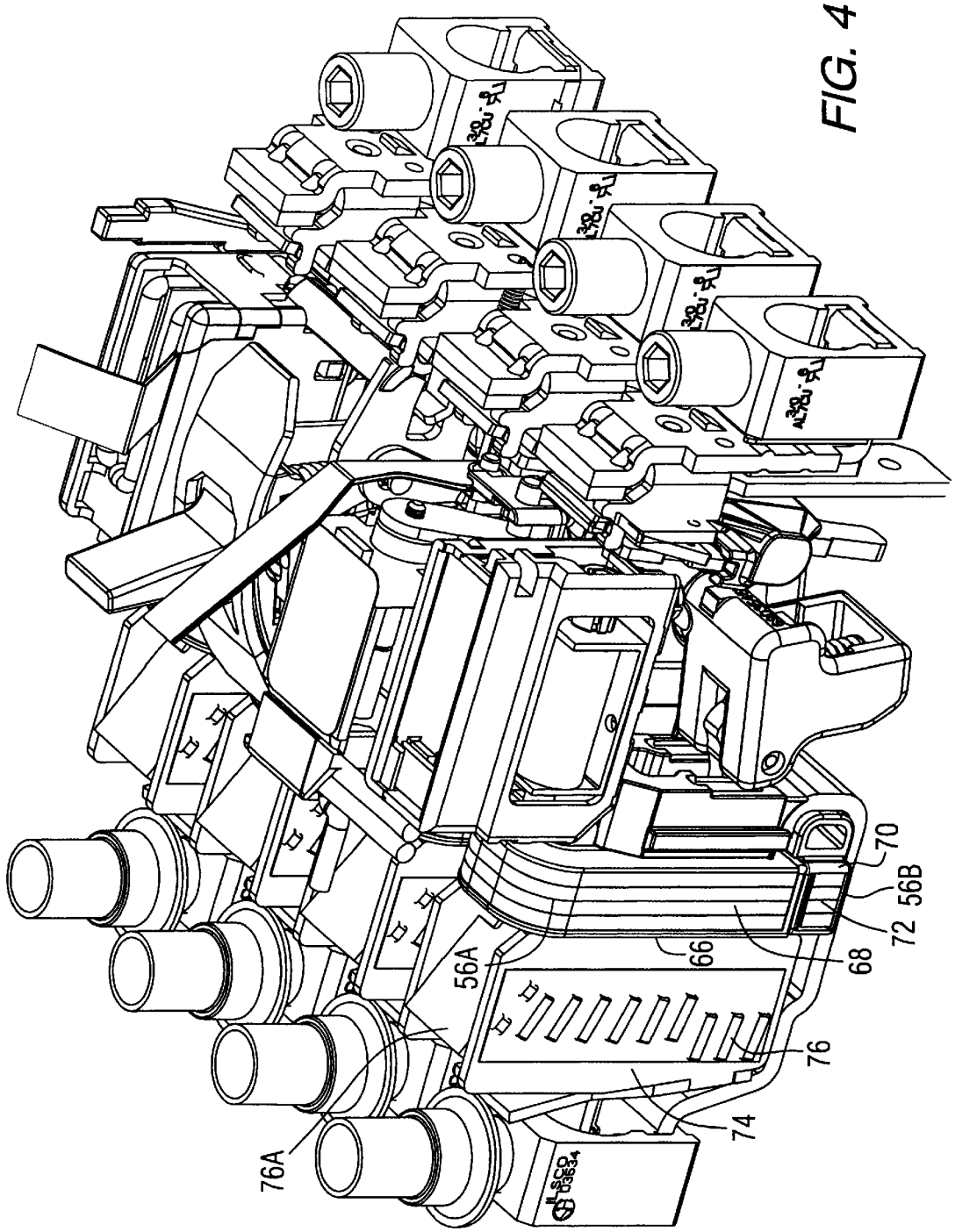
FIG. 4 is an orthogonal view of the internal portions of the circuit interrupter of FIG. 1 without the base and covers.

Referring again to FIG. 3, and now also to FIG. 4 which shows a side elevational view of the internal workings of circuit breaker 10 without base 12 and covers 14 and 16, each slot motor assembly 56 is shown as including a separate upper slot motor assembly 56A and a separate lower slot motor assembly 56B. Upper slot motor assembly 56A includes an upper slot motor assembly housing 66 within which are stacked side-by-side U-shaped upper slot motor assembly plates 68. Similarly, lower slot motor assembly 56B includes a lower slot motor assembly housing 70 within which are stacked side-by-side lower slot motor assembly plates 72. Plates 68 and 72 are both composed of magnetic material.

Each arc extinguisher assembly 58 includes an arc chute 74 within which are positioned spaced-apart generally parallel angularly offset arc chute plates 76 and an upper arc runner 76A. As known to one of ordinary skill in the art, the function of arc extinguisher assembly 58 is to receive and dissipate electrical arcs that are created upon separation of the contacts of the circuit breaker.

Figure 5:
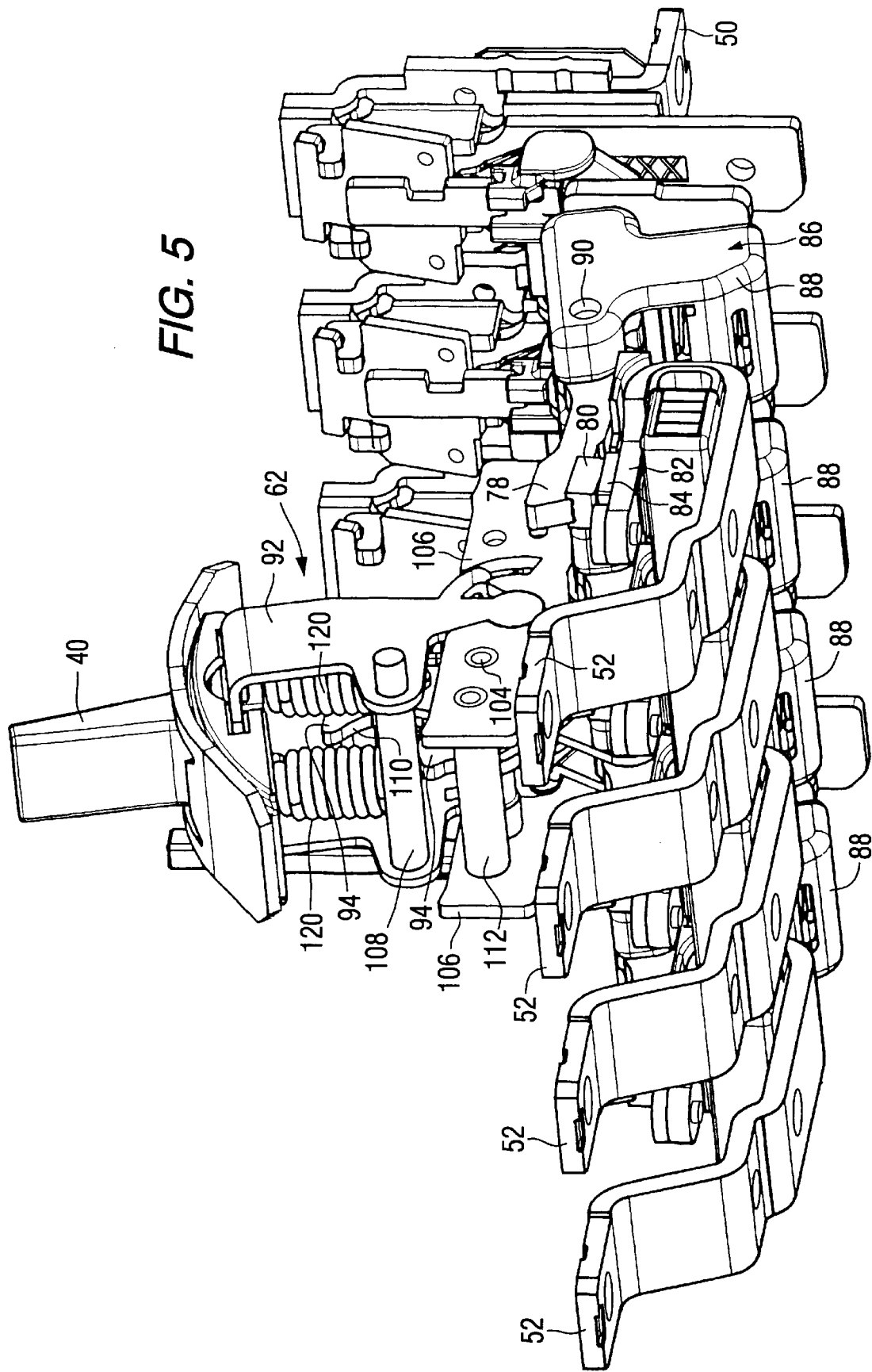
FIG. 5 is an orthogonal view of an internal portion of the circuit interrupter of FIG. 1 including the operating mechanism.

Referring now to FIG. 5, shown is an orthogonal view of an internal portion of circuit breaker 10. Each contact assembly 60 (FIG. 3) is shown as comprising a movable contact arm 78 supporting thereon a movable contact 80, and a stationary contact arm 82 supporting thereon a stationary contact 84. Each stationary contact arm 82 is electrically connected to a line terminal 52 and, although not shown, each movable contact arm 78 is electrically connected to a load terminal 50. Also shown is a crossbar assembly 86 which traverses the width of circuit breaker 10 and is rotatably disposed on an internal portion of base 12 (not shown). Actuation of operating mechanism 62, in a manner described in detail below, causes crossbar assembly 86 and movable contact arms 78 to rotate into or out of a disposition which places movable contacts 80 into or out of a disposition of electrical continuity with fixed contacts 84. Crossbar assembly 86 includes a movable contact cam housing 88 for each movable contact arm 78. A pivot pin 90 is disposed in each housing 88 upon which a movable contact arm 78 is rotatably disposed. Under normal circumstances, movable contact arms 78 rotate in unison with the rotation of crossbar assembly 86 (and housings 88) as crossbar assembly 86 is rotated clockwise or counter-clockwise by action of operating mechanism 62. However, it is to be noted that each movable contact arm 78 is free to rotate (within limits) independently of the rotation of crossbar assembly 86. In particular, in certain dynamic, electromagnetic situations, each movable contact arm 78 can rotate upwardly about pivot pin 90 under the influence of high magnetic forces. This is referred to as "blow-open" operation, and is described in greater detail below.

Continuing to refer to FIG. 5 and again to FIG. 3, operating mechanism 62 is shown. Operating mechanism 62 is structurally and functionally similar to that shown and described in U.S. Pat. No. 5,910,760 issued Jun. 8, 1999 to Malingowski, et al., entitled "Circuit Breaker with Double Rate Spring" and U.S. patent application Ser. No. 09/384, 139, filed Aug. 27, 1999, entitled "Circuit Interrupter With A Trip Mechanism Having Improved Spring Biasing", both disclosures of which are incorporated herein by reference. Operating mechanism 62 comprises a handle arm or handle assembly 92 (connected to handle 40), a configured plate or cradle 94, an upper toggle link 96, an interlinked lower toggle link 98, and an upper toggle link pivot pin 100 which interlinks upper toggle link 96 with cradle 94. Lower toggle link 98 is pivotally interconnected with upper toggle link 96 by way of an intermediate toggle link pivot pin 102, and with crossbar assembly 86 at pivot pin 90. Provided is a cradle pivot pin 104 which is laterally and rotatably disposed between parallel, spaced apart operating mechanism support members or sideplates 106. Cradle 94 is free to rotate (within limits) via cradle pivot pin 104. Also provided is a handle assembly roller 108 which is disposed in and supported by handle assembly 92 in such a manner as to make mechanical contact with (roll against) arcuate portions of a back region 110 of cradle 94 during a "resetting" operation of circuit breaker 10 as is described below. A main stop bar 112 is laterally disposed between sideplates 106, and provides a limit to the counter-clockwise movement of cradle 94.

Figure 6:
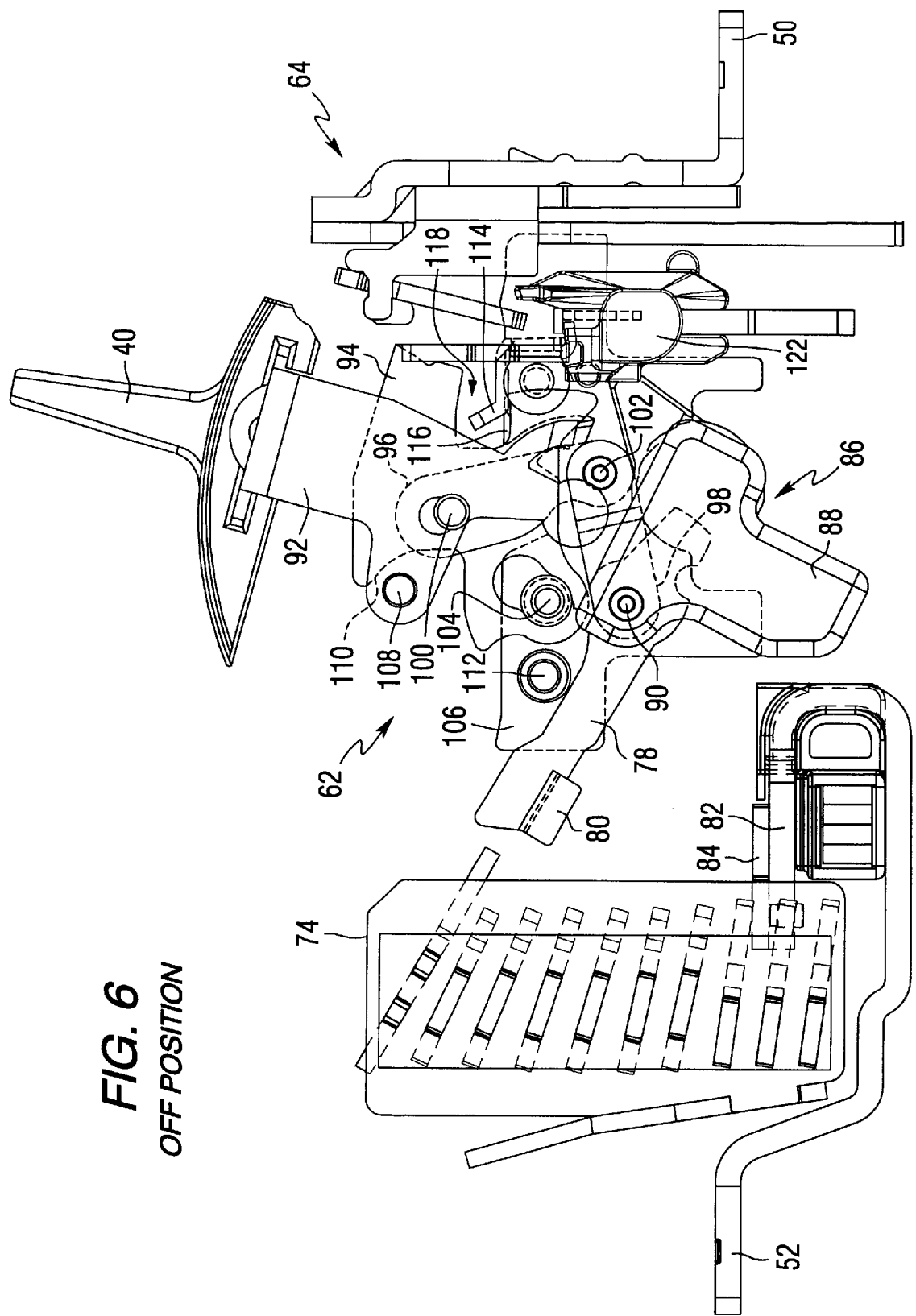
FIG. 6 is a side elevational, partially broken away view of the operating mechanism of the circuit interrupter of FIG. 1 with the contacts and the handle in the OFF disposition.

Referring now to FIG. 6, an elevation of that part of circuit breaker 10 particular associated with operating mechanism 62 is shown for the OFF disposition of circuit breaker 10. Contacts 80 and 84 are shown in the disconnected or open disposition. An intermediate latch 114 is shown in its latched position wherein it abuts hard against a lower portion 116 of a latch cutout region 118 of cradle 94. A pair of side-by-side aligned compression springs 120 (FIG. 5) such as shown in U.S. Pat. No. 4,503,408 is disposed between the top portion of handle assembly 92 and the intermediate toggle link pivot pin 102. The tension in springs 120 has a tendency to load lower portion 116 of cradle 94 against the intermediate latch 114. In the OPEN disposition shown in FIG. 6, latch 114 is prevented from unlatching cradle 94, notwithstanding the spring tension, because the other end thereof is fixed in place by a rotatable trip bar assembly 122 of trip mechanism 64. As is described in more detail below, trip bar assembly 122 is spring-biased in the counter-clockwise rotational direction against the intermediate latch 114. This is the standard latch arrangement found in all dispositions of circuit breaker 10 except the TRIPPED disposition which is described below.

Figure 7:
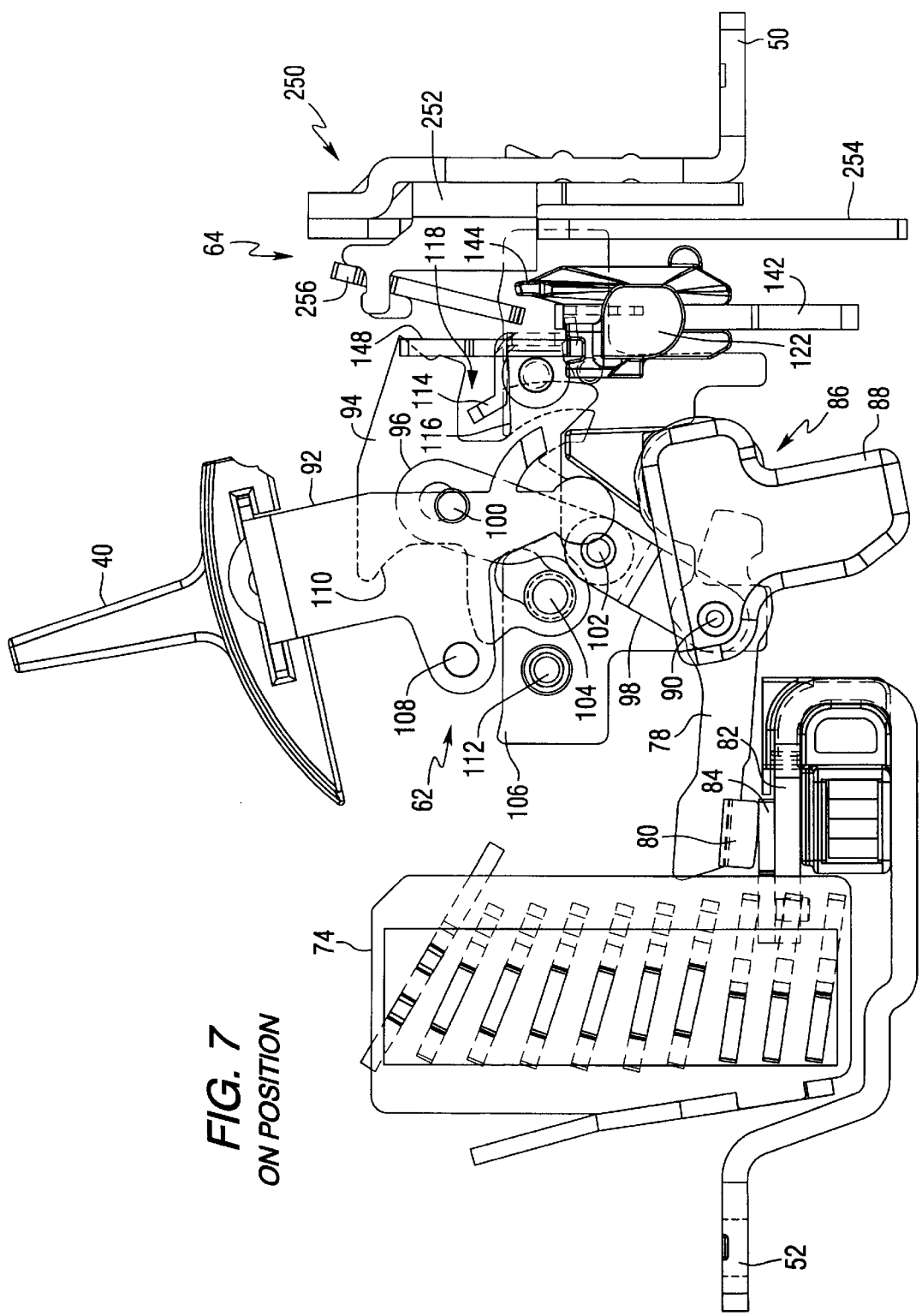
FIG. 7 is a side elevational, partially broken away view of the operating mechanism with the contacts and the handle in the ON disposition.

Referring now to FIG. 7, operating mechanism 62 is shown for the ON disposition of circuit breaker 10. In this disposition, contacts 80 and 84 are closed (in contact with each other) whereby electrical current may flow from load terminals 50 to line terminals 52. In order to achieve the ON disposition, handle 40, and thus fixedly attached handle assembly 92, are rotated in a counter-clockwise direction (to the left) thus causing the intermediate toggle link pivot pin 102 to be influenced by the tension springs 120 (FIG. 5) attached thereto and to the top of handle assembly 92. The influence of springs 120 causes upper toggle link 96 and lower toggle link 98 to assume the position shown in FIG. 7 which causes the pivotal interconnection with crossbar assembly 86 at pivot point 90 to rotate crossbar assembly 86 in the counter-clockwise direction. This rotation of crossbar assembly 86 causes movable contact arms 78 to rotate in the counter-clockwise direction and ultimately force movable contacts 80 into a pressurized abutted disposition with stationary contacts 84. It is to be noted that cradle 94 remains latched by intermediate latch 114 as influenced by trip mechanism 64.

Figure 8:
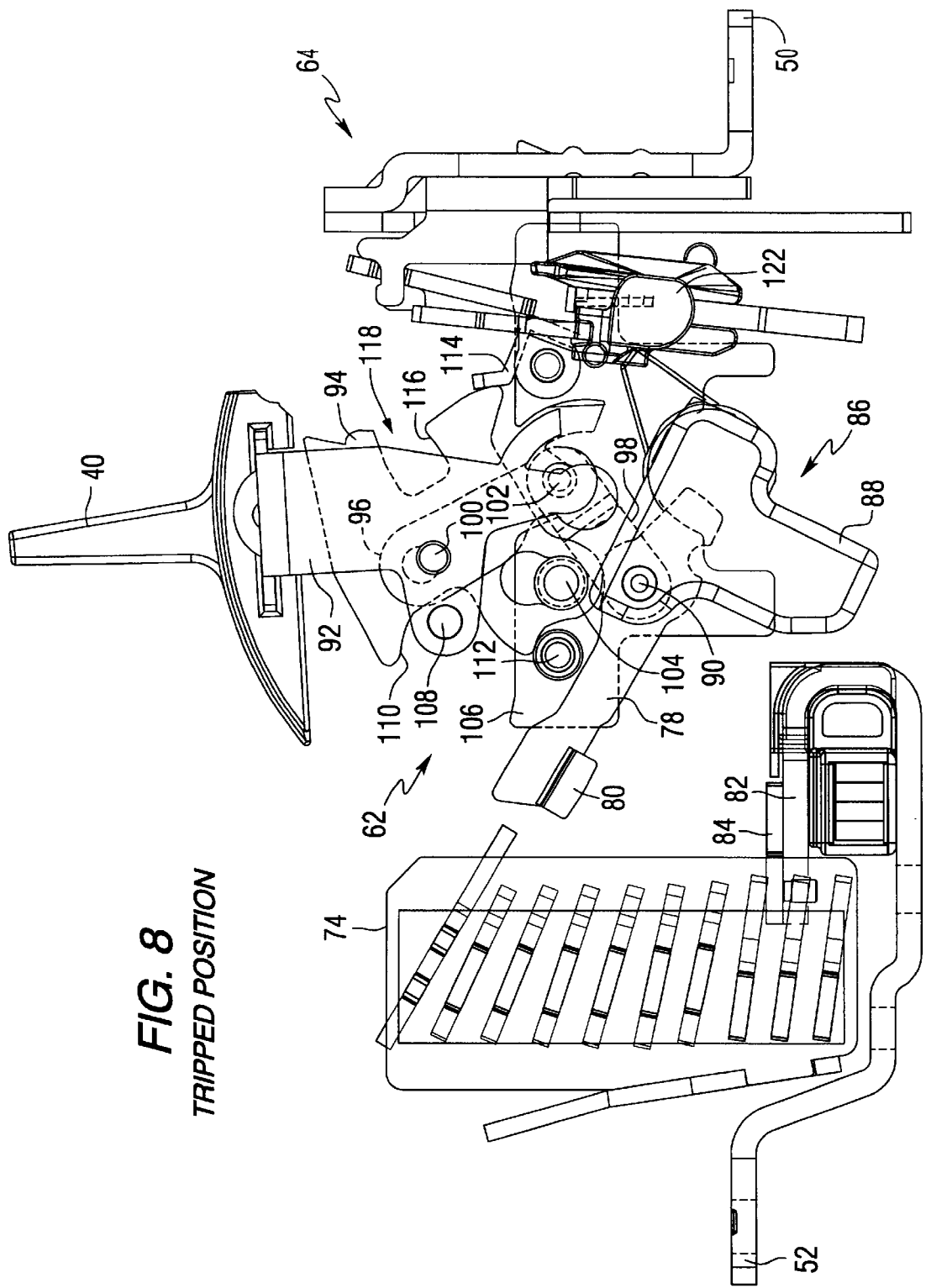
FIG. 8 is a side elevational, partially broken away view of the operating mechanism with the contacts and the handle in the TRIPPED disposition.

Referring now to FIG. 8, operating mechanism 62 is shown for the TRIPPED disposition of circuit breaker 10. The TRIPPED disposition is related (except when a manual tripping operation is performed, as described below) to an automatic opening of circuit breaker 10 caused by the thermally or magnetically induced reaction of trip mechanism 64 to the magnitude of the current flowing between load conductors 50 and line conductors 52. The operation of trip mechanism 64 is described in detail below. For purposes here, circumstances such as a load current with a magnitude exceeding a predetermined threshold will cause trip mechanism 64 to rotate trip bar assembly 122 clockwise (overcoming the spring force biasing assembly 122 in the opposite direction) and away from intermediate latch 114. This unlocking of intermediate latch 114 releases cradle 94 (which had been held in place at lower portion 116 of latch cutout region 118) and enables it to be rotated counter-clockwise under the influence of tension springs 120 (FIG. 5) interacting between the top of handle assembly 92 and the intermediate toggle link pivot pin 102. The resulting collapse of the toggle arrangement causes pivot pin 90 to be rotated clockwise and upwardly to thus cause crossbar assembly 86 to similarly rotate. This rotation of crossbar assembly 86 causes a clockwise motion of movable contact arms 78, resulting in a separation of contacts 80 and 84. The above sequence of events results in handle 40 being placed into an intermediate disposition between its OFF disposition (as shown in FIG. 6) and its ON disposition (as shown in FIG. 7). Once in this TRIPPED disposition, circuit breaker 10 can not again achieve the ON disposition (contacts 80 and 84 closed) until it is first "reset" via a resetting operation which is described in detail below.

Figure 9:
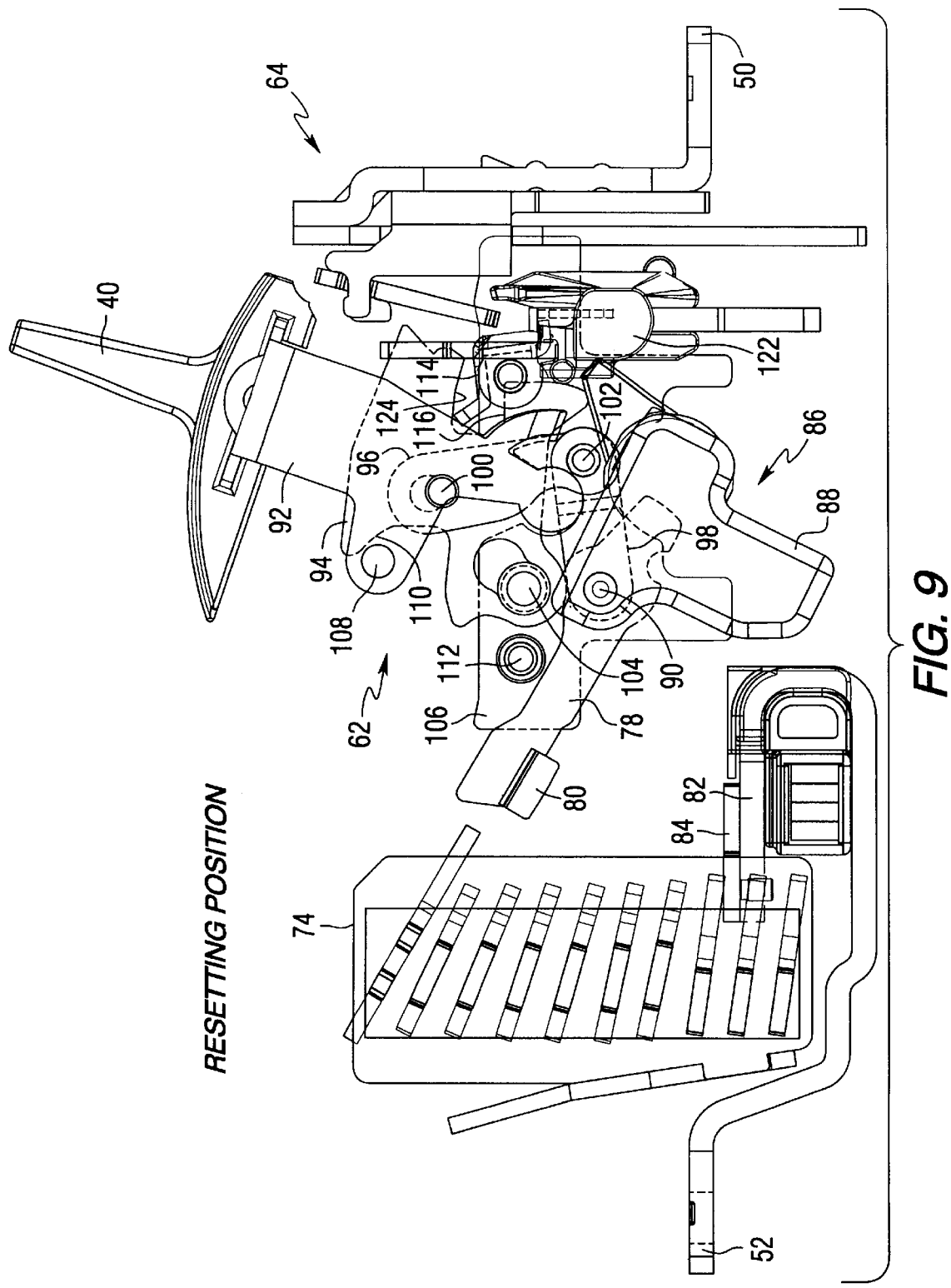
FIG. 9 is a side elevational, partially broken away view of the operating mechanism during a resetting operation.

Referring now to FIG. 9, operating mechanism 62 is shown during the resetting operation of circuit breaker 10. This occurs while contacts 80 and 84 remain open, and is exemplified by a forceful movement of handle 40 to the right (or in a clockwise direction) after a tripping operation has occurred as described above with respect to FIG. 8. As handle 40 is thus moved, handle assembly 92 moves correspondingly, causing handle assembly roller 108 to make contact with back region 110 of cradle 94. This contact forces cradle 94 to rotate clockwise about cradle pivot pin 104 and against the tension of springs 120 (FIG. 5) that are located between the top of handle assembly 92 and the intermediate toggle link pivot pin 102, until an upper portion 124 of latch cutout region 118 abuts against the upper arm or end of intermediate latch 114. This abutment forces intermediate latch 114 to rotate to the left (or in a counter-clockwise direction) so that the bottom portion thereof rotates to a disposition of interlatching with trip bar assembly 122, in a manner described in more detail below. Then, when the force against handle 40 is released, handle 40 rotates to the left over a small angular increment, causing lower portion 116 of latch cutout region 118 to forcefully abut against intermediate latch 114 which is now abutted at its lower end against trip bar assembly 122. Circuit breaker 10 is then in the OFF disposition shown in FIG. 6, and handle 40 may then be moved counter-clockwise (to the left) towards the ON disposition depicted in FIG. 7 (without the latching arrangement being disturbed) until contacts 80 and 84 are in a disposition of forceful electrical contact with each other. However, if an overcurrent condition still exists, a tripping operation such as depicted and described above with respect to FIG. 8 may again take place causing contacts 80 and 84 to again open.

Referring again to FIGS. 3, 4, and 5, upper slot motor assembly 56A and lower slot motor assembly 56B are structurally and functionally similar to that described in U.S. Pat. No. 5,910,760 issued Jun. 8, 1999 to Malingowski et al., and plates 68 and 72 thereof form an essentially closed electromagnetic path in the vicinity of contacts 80 and 84. At the beginning of a contact opening operation, electrical current continues to flow in a movable contact arm 78 and through an electrical arc created between contacts 80 and 84. This current induces a magnetic field into the closed magnetic loop provided by upper plates 68 and lower plates 72 of upper slot motor assembly 56A and lower slot motor assembly 56B, respectively. This magnetic field electromagnetically interacts with the current in such a manner as to accelerate the movement of the movable contact arm 78 in the opening direction whereby contacts 80 and 84 are more rapidly separated. The higher the magnitude of the electrical current flowing in the arc, the stronger the magnetic interaction and the more quickly contacts 80 and 84 separate. For very high current (an overcurrent condition), the above process provides the blow-open operation described above in which the movable contact arm 78 forcefully rotates upwardly about pivot pin 90 and separates contacts 80 and 84, this rotation being independent of crossbar assembly 86. This blow-open operation is shown and described in U.S. Pat. No. 3,815,059 issued Jun. 4, 1974, to Spoelman and incorporated herein by reference, and provides a faster separation of contacts 80 and 84 than can normally occur as the result of a tripping operation generated by trip mechanism 64 as described above in connection with FIG. 8.

Figure 10:
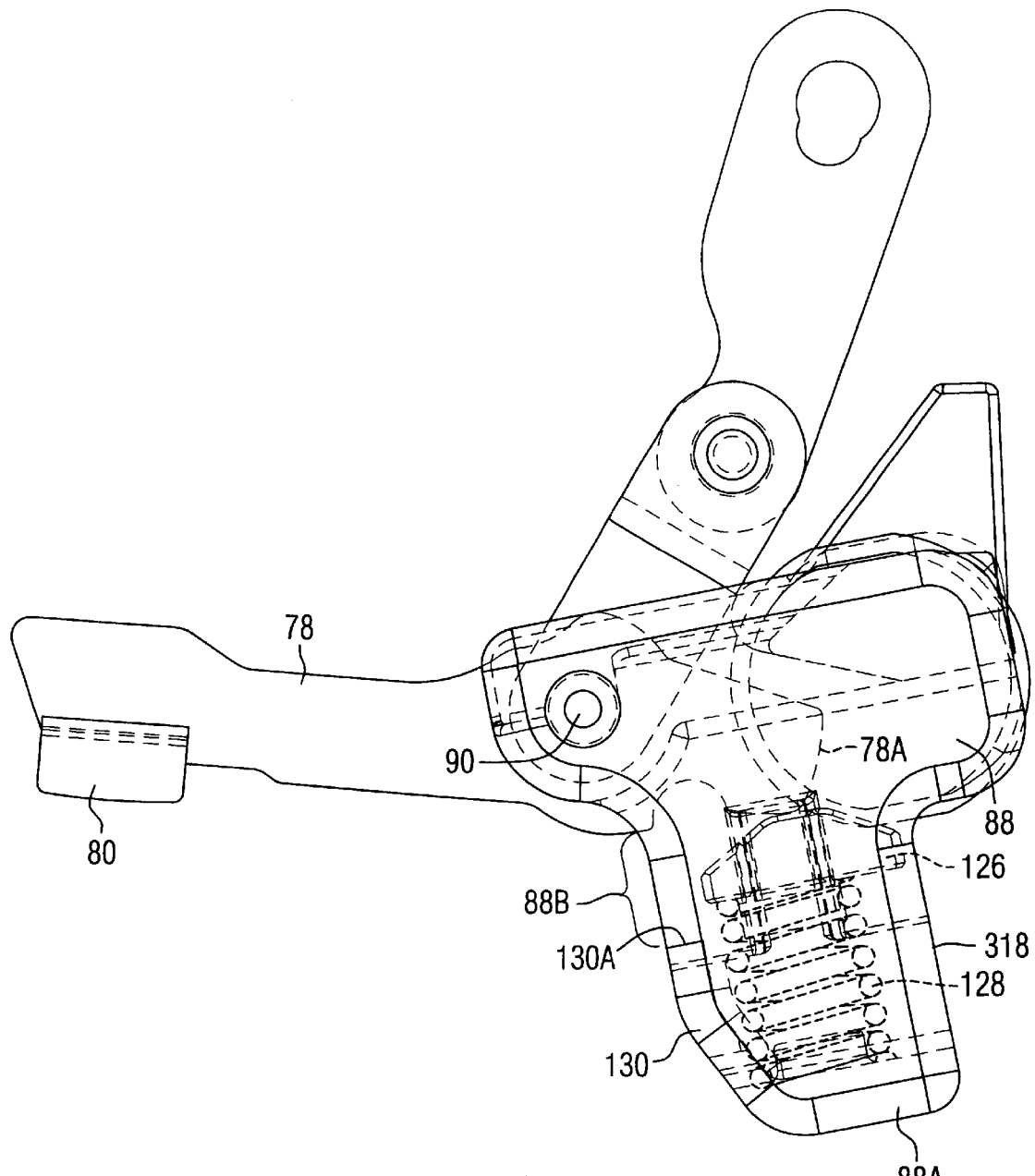
FIG. 10 is a side elevational, partially broken away view of the cam housing of the circuit interrupter of FIG. 1.
Figure 11:
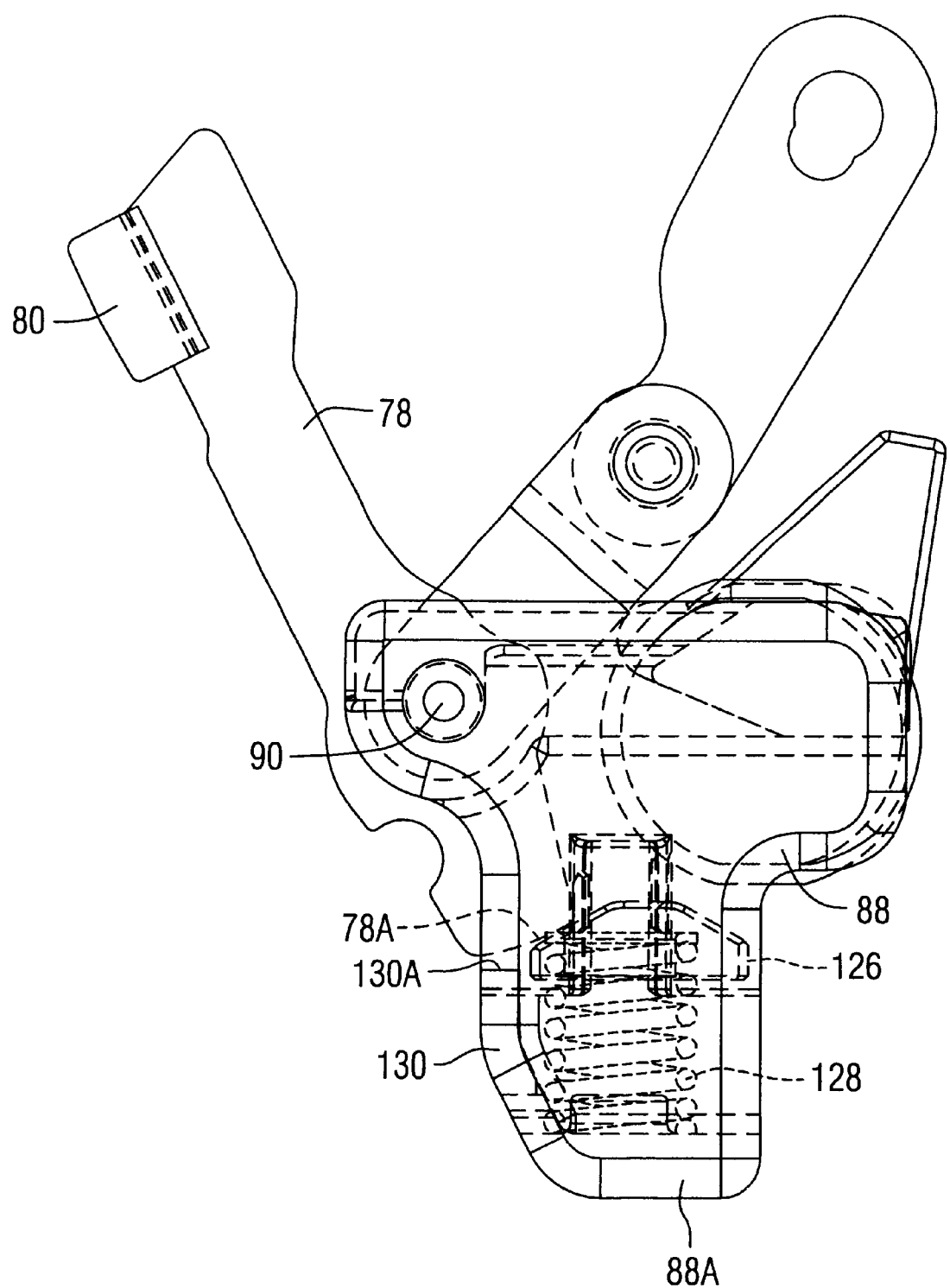
FIG. 11 is another side elevational, partially broken away view of the cam housing.
Figure 12:
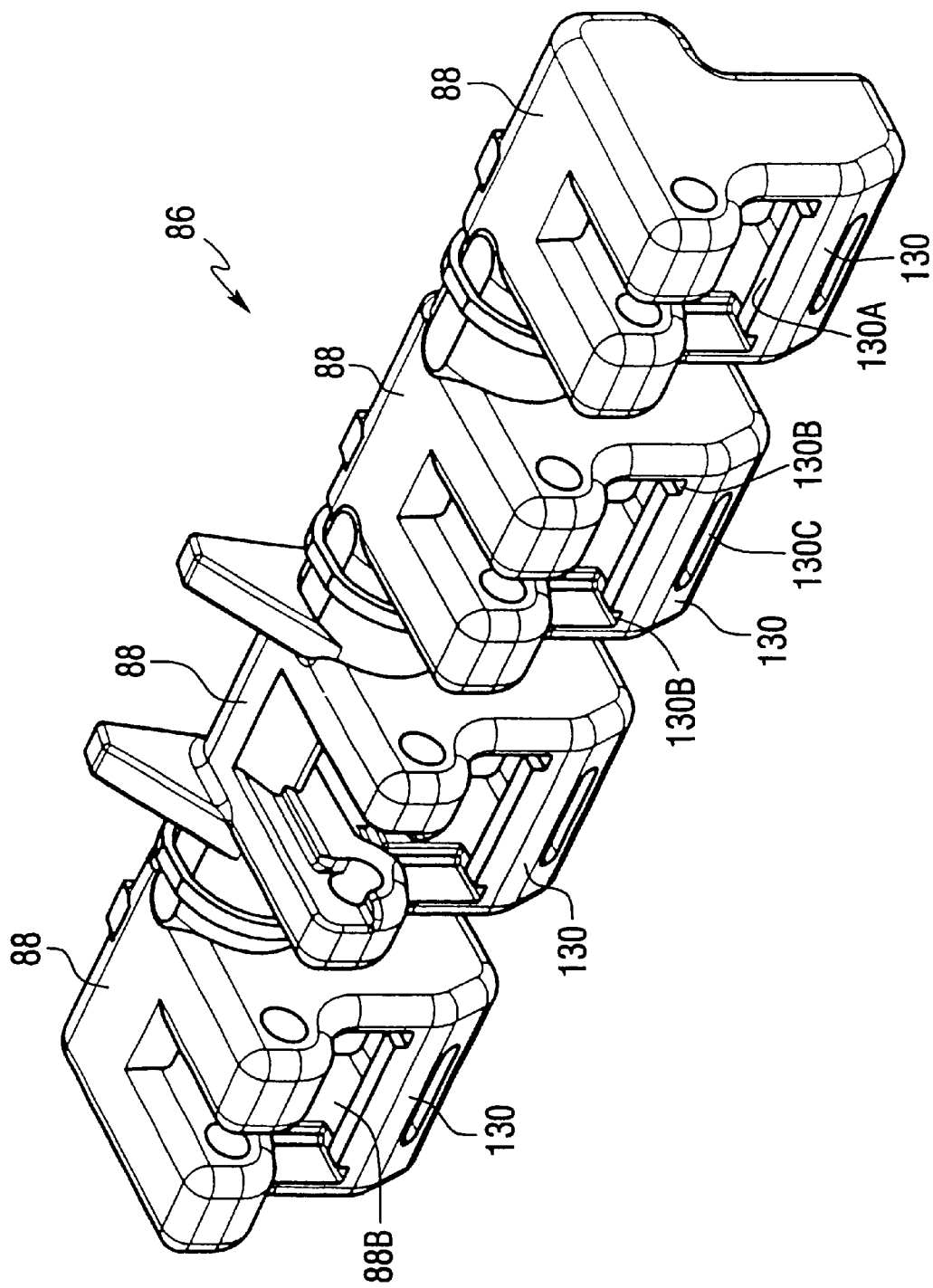
FIG. 12 is an orthogonal view of the crossbar assembly of the circuit interrupter of FIG. 1.

Referring now to FIGS. 10, 11, and 12, shown in FIG. 10 is a side view of a portion of operating mechanism 62 including one of the cam housings 88 of crossbar assembly 86. Cam housing 88 includes a cam follower 126 disposed therein with a compression spring 128 connected between cam follower 126 and the bottom 88A of housing 88. Housing 88 is configured for allowing vertical motion of cam follower 126 against spring 128. A barrier 130 is integrally formed on the outside of cam housing 88 (see also FIG. 12) that extends from the bottom 88A of housing 88 and which faces the direction of contacts 80 and 84.

During a blow-open operation as described above, movable contact arm 78 rotates clockwise about pivot pin 90, as shown in FIG. 11. During this rotation, a bottom portion 78A of contact arm 78 similarly rotates, causing it to abut the top of cam follower 126 and force follower 126 downward, thus compressing spring 128. An opening 88B (FIG. 10) in the side of cam housing 88 enables (provides clearance for) this rotational movement of bottom portion 78A of contact arm 78. The size of opening 88B is preferably limited to only that which is necessary to enable this movement, with the resulting size determining how far barrier 130 extends upwardly from the bottom 88A of housing 88. Cam follower 126 is forced downward until it is approximately level with the top 130A of barrier 130, as shown in FIG. 11. The positioning of barrier 130 then substantially and effectively protects spring 128 and cam follower 126 from hot gases and debris that are often formed during such a blow-open operation and which flow towards barrier 130 from the direction of contacts 80 and 84. As crossbar assembly 86 is then rotated clockwise during the subsequent "normal" tripping operation generated by trip mechanism 64, the bottom 88A of cam housing 88 cooperates with barrier 130 whereby this protection is continued. In addition to providing such protection, barrier 130 beneficially strengthens the structure of cam housing 88. In the exemplary embodiment best seen in FIG. 12, barrier 130 includes top grooves 130B and a bottom elongated opening 130C which are included only for facilitating the molding of cam housing 88.

Trip Bar Assembly

Figure 13A:
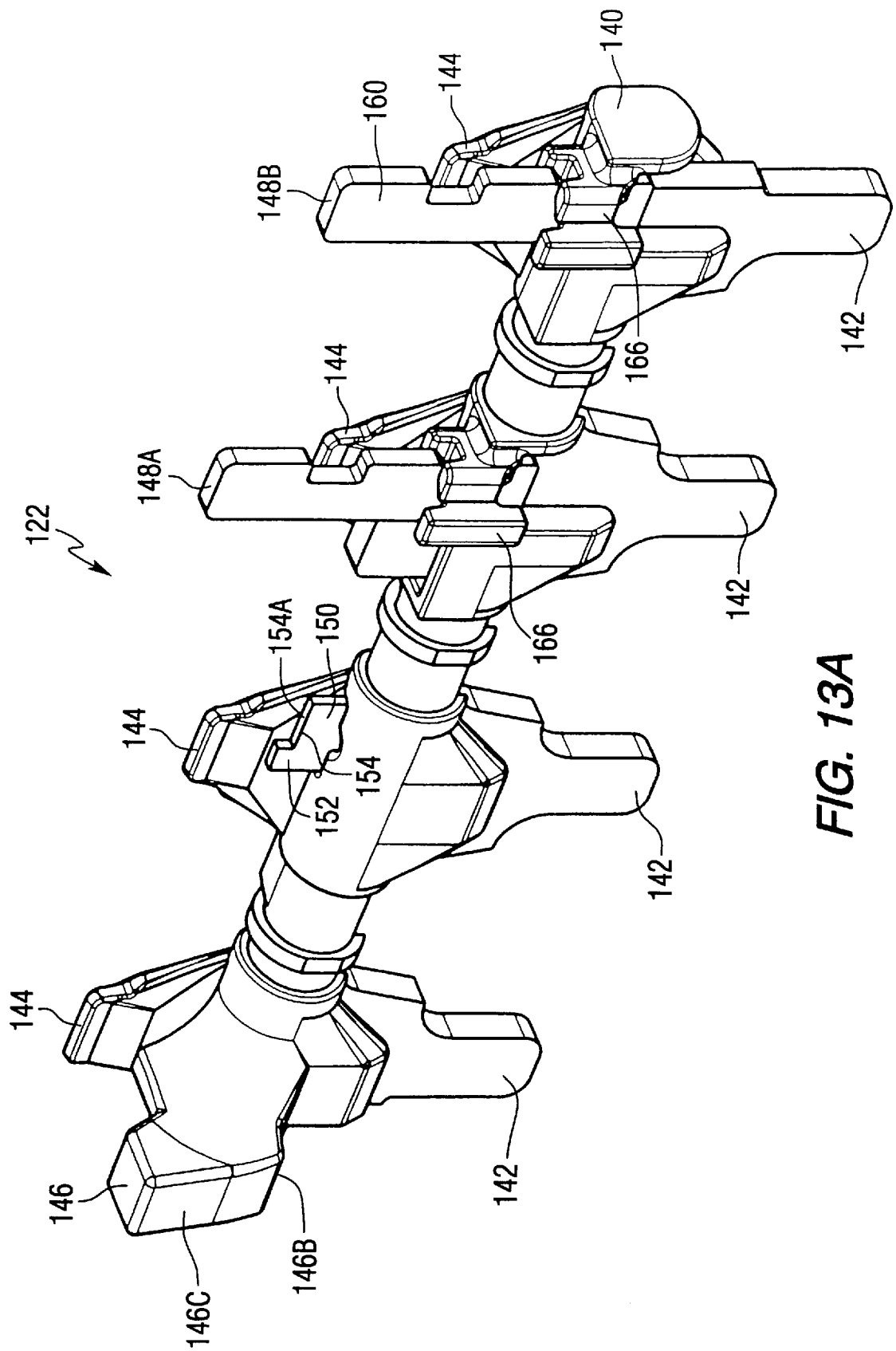
FIG. 13A is an orthogonal view of the trip bar assembly of the circuit interrupter of FIG. 1.
Figure 13B:
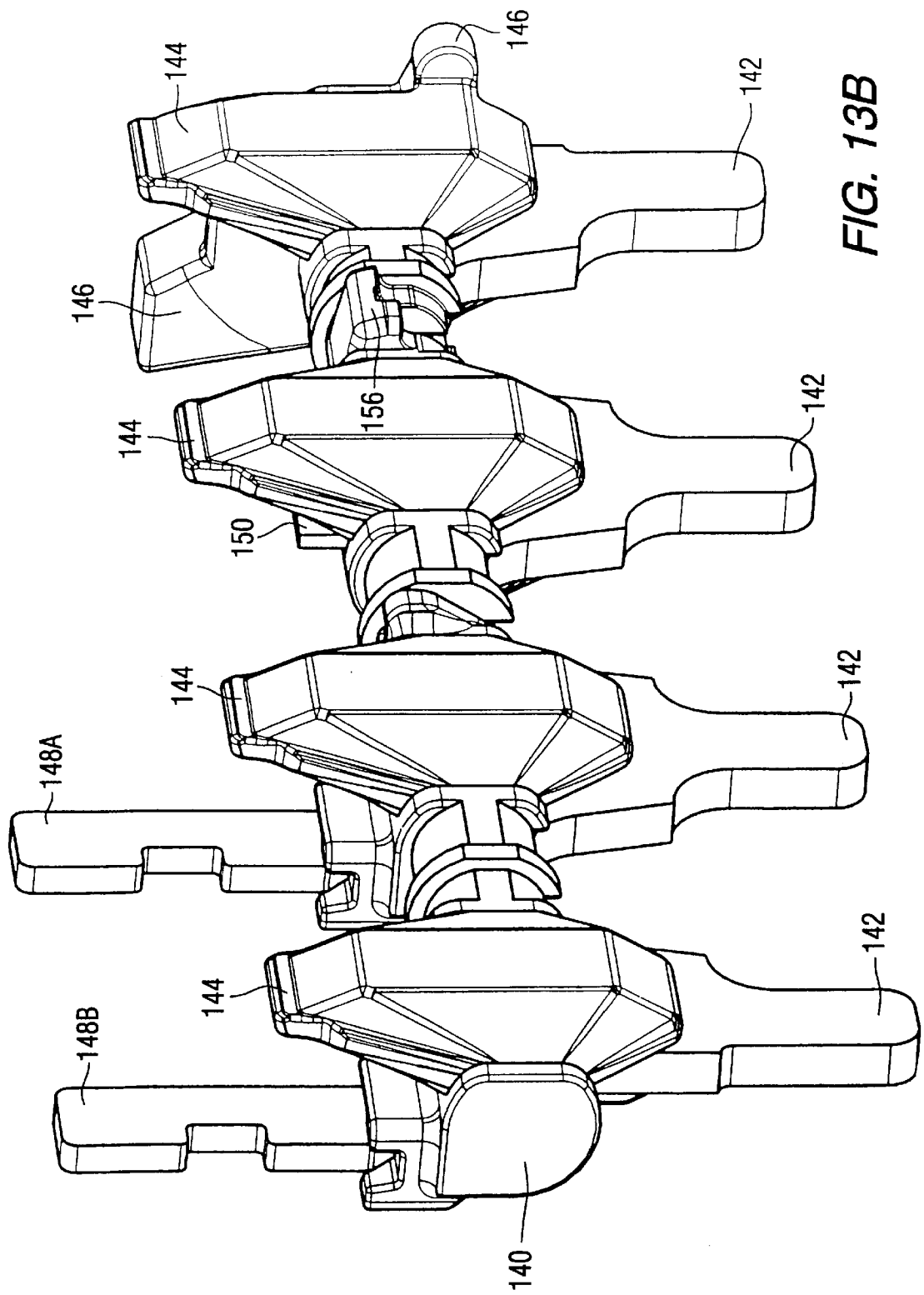
FIG. 13B is another orthogonal view of the trip bar assembly.
Figure 13C:
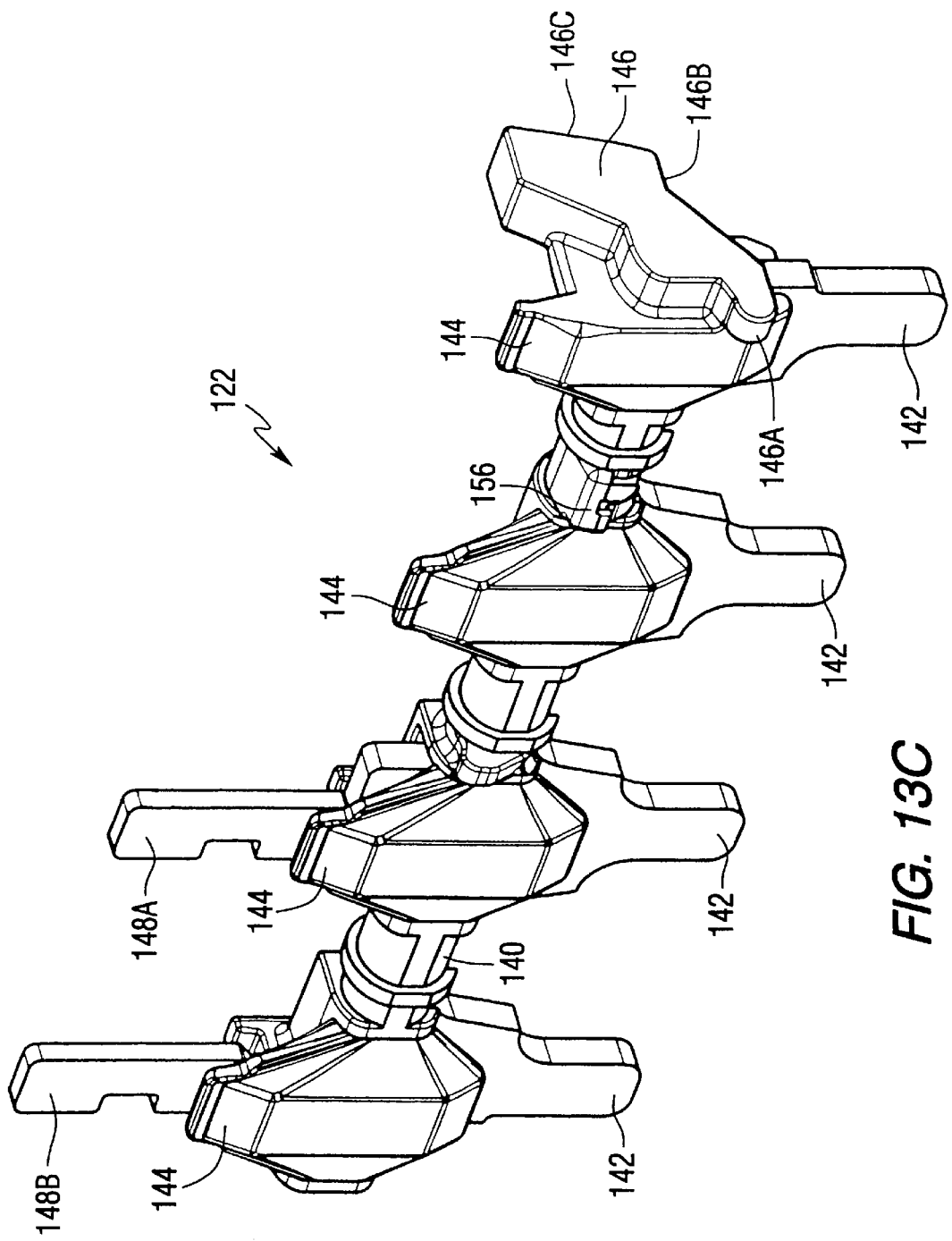
FIG. 13C is another orthogonal view of the trip bar assembly.
Figure 13D:
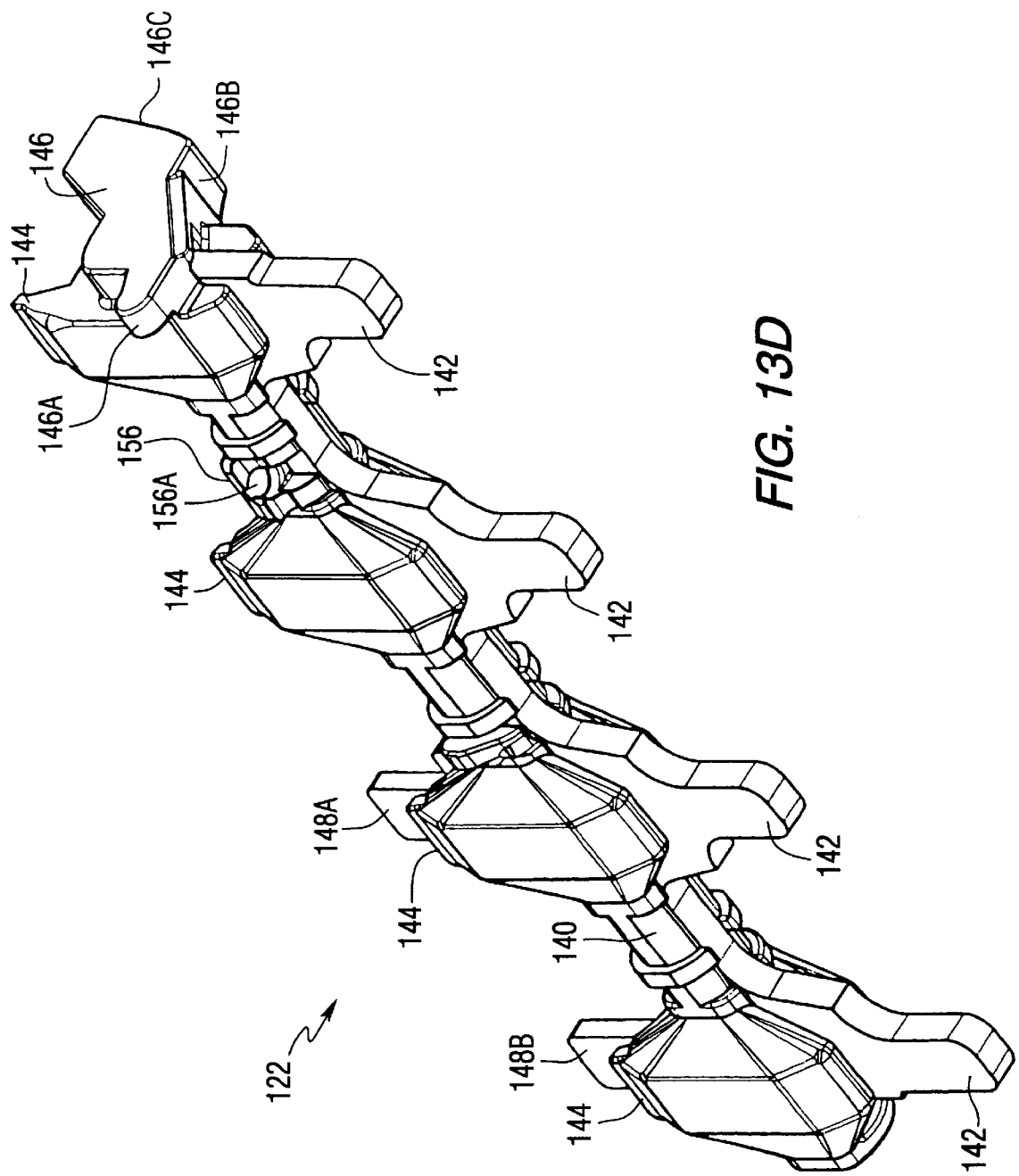
FIG. 13D is another orthogonal view of the trip bar assembly.
Figure 13E:
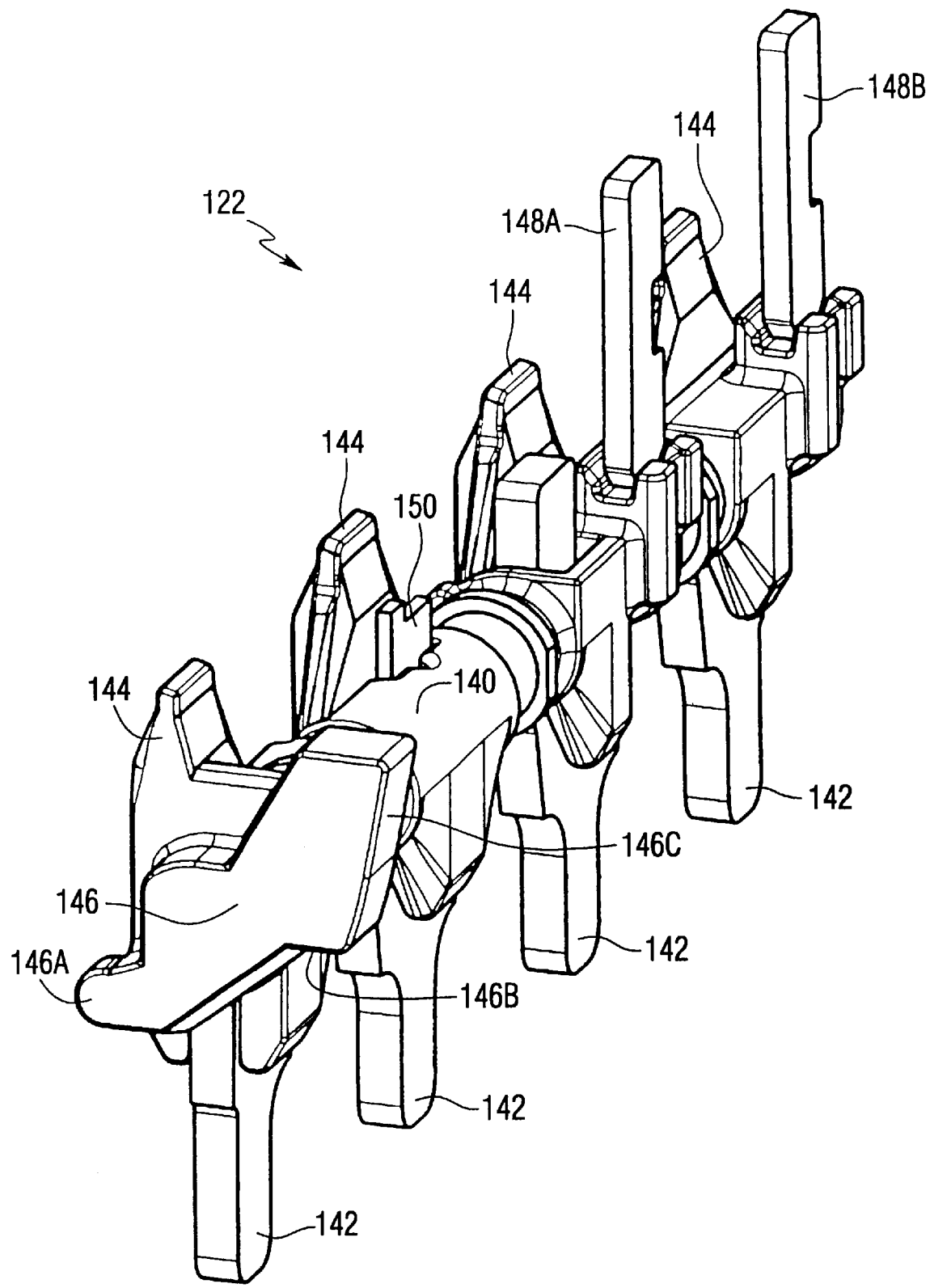
FIG. 13E is another orthogonal view of the trip bar assembly.

Referring now to FIGS. 13A, 13B, 13C, 13D, and 13E, shown is trip bar assembly 122 of trip mechanism 64. Assembly 122 includes a trip bar or shaft 140 to which is connected thermal trip bars or paddles 142, magnetic trip bars or paddles 144, a multi-purpose trip member 146, and accessory trip levers 148A and 148B, the function of each of which is described in detail below. Magnetic trip bars 144 are tapered in shape, and are integrally molded with trip shaft 140. For reasons discussed below, multi-purpose trip member 146 includes, as best seen in FIG. 13E, a push-to-trip actuating protrusion or region 146A, an interlock trip actuating protrusion or region 146B, and a trip interface surface or region 146C. Trip bar assembly 122 also includes, as best seen in FIG. 13A, an intermediate latch interface 150 having a protrusion or stepped-up region 152 and a cutout region or stepped-down region 154 with a surface 154A. Also connected to trip shaft 140 is a contact region 156 that includes a cavity 156A (FIG. 13D) formed in the underside thereof.

Base Structure

Figure 14:
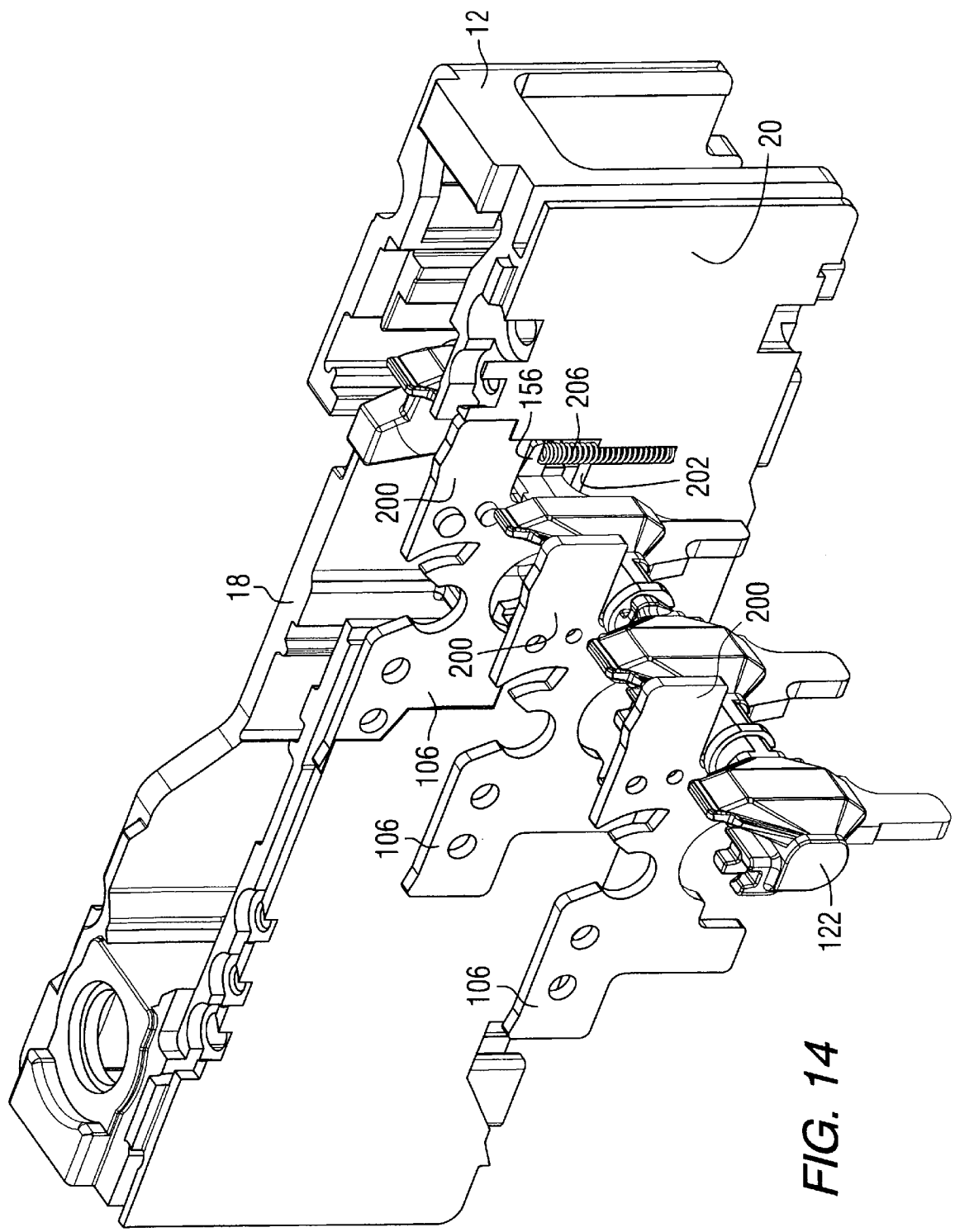
FIG. 14 is an orthogonal, partially broken away view of a portion of the circuit interrupter of FIG. 1 including the trip bar assembly and its bias spring.
Figure 15:
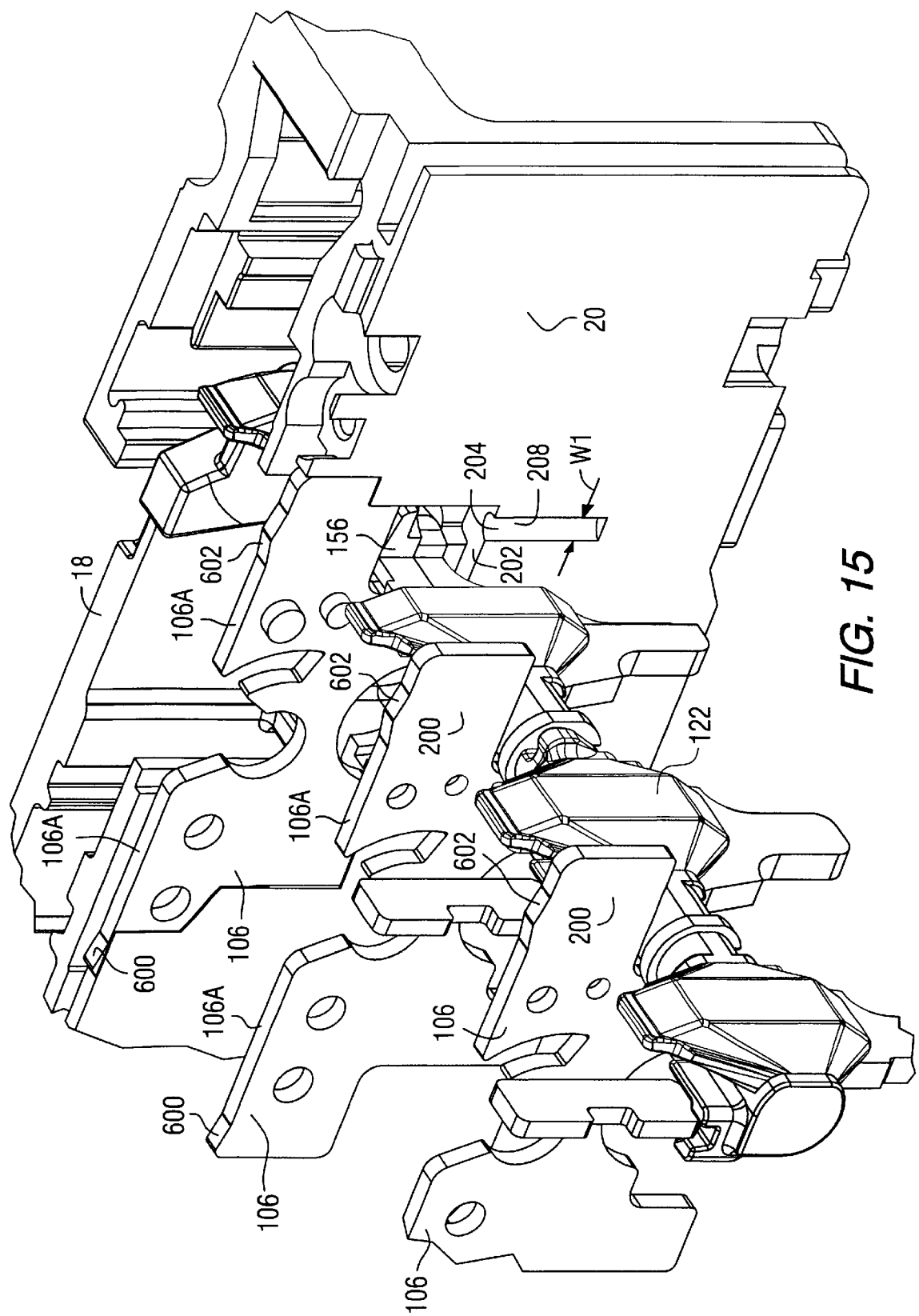
FIG. 15 is an orthogonal view similar to FIG. 14 without the bias spring.
Figure 16:
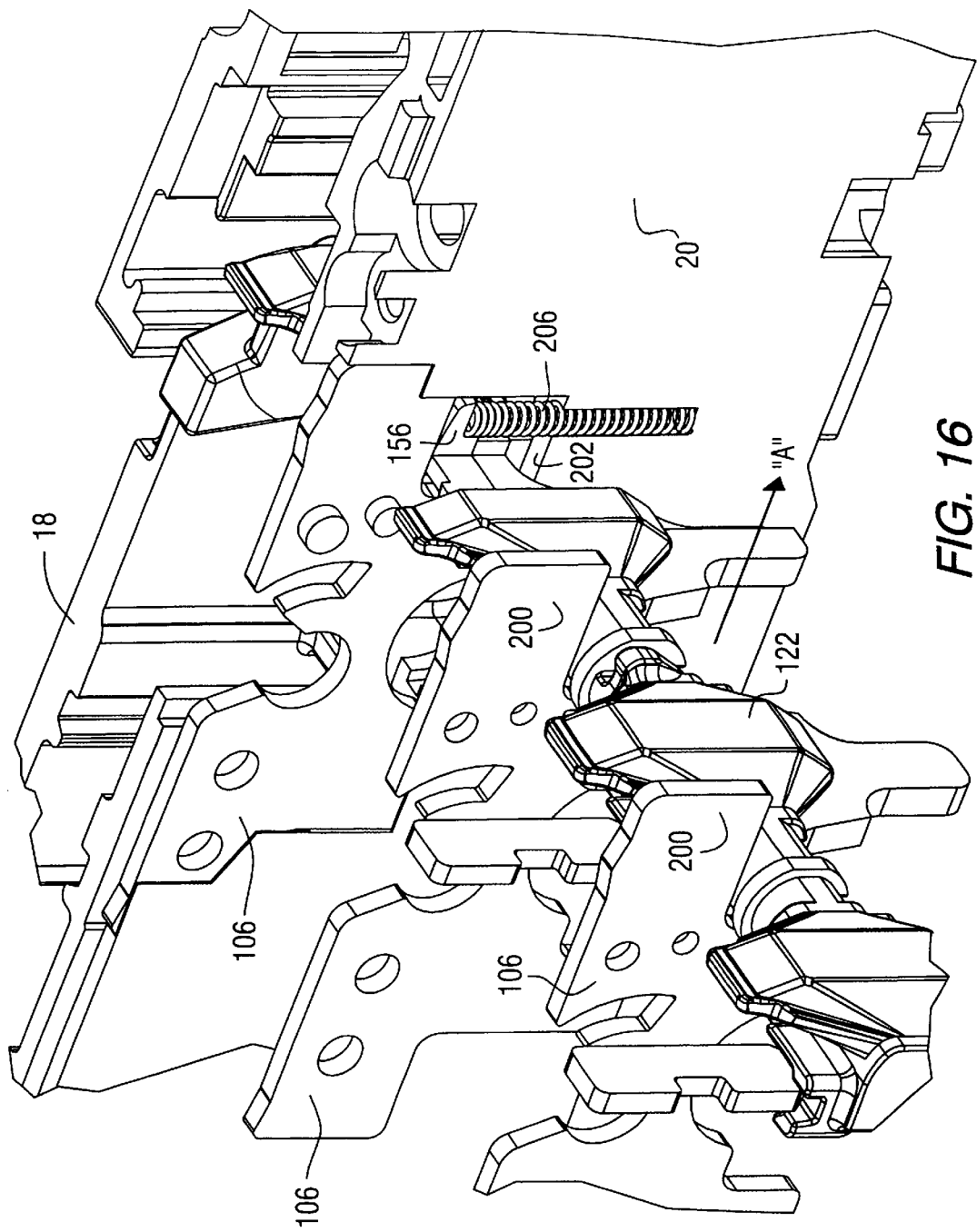
FIG. 16 is an orthogonal view similar to FIG. 15 with the bias spring.

Referring now to FIGS. 14, 15, and 16, shown in FIG. 14 is a portion of base 12 with a portion of the internal components of circuit breaker 10 inserted therein. Trip bar assembly 122, which is rotationally disposed between outer sidewalls 18 and 19 of base 12 (FIG. 2), is shown extending and vertically held between portions 200 of sideplates 106 and ledges 202 of internal phase walls 20, 21, and 22 of base 12 (only phase wall 20, and thus only one ledge 202, is shown for the sake of simplicity). As best shown in FIGS. 15 and 16 wherein a portion of trip bar assembly 122 has been cut away for ease of illustration, a cavity 204 is formed in ledge 202 of internal wall 20 in which is seated one end of a compression spring 206. The other end of spring 206 is shown contacting contact region 156 (partially cut away for ease of illustration) of trip bar assembly 122 wherein it seats into cavity 156A (FIG. 13D) thereof. Positioned as such, spring 206 provides a counter-clockwise and consistent rotational bias force on trip bar assembly 122 for purposes described below. Ledge 202 of wall 20 is positioned sufficiently apart from contact region 156 of trip bar assembly 122 so that ledge 202 does not impede clockwise rotation of assembly 122 (against the bias force provided by spring 206) during a tripping operation as described below. As shown best in FIG. 15, cavity 204 has an elongated opening 208 forming a open-ended side, enabling ledge 202 and cavity 204 to be easily moldable. Opening 208 has a width w1 that is smaller than the diameter of spring 206 so that spring 206 does not become laterally dislodged from cavity 204.

Spring 206 is easily assembled into circuit breaker 10 by vertically sliding it into cavity 204 before trip bar assembly 122 is installed. A "line of sight" assembly is thus provided which beneficially enables assembling personnel to easily see whether or not spring 206 is appropriately positioned. Positioned substantially within internal phase wall 20, spring 206 does not occupy valuable internal space, and is not directly exposed to hot gases that may be generated within circuit breaker 10. Such gases would flow in the direction of arrow "A" (FIG. 16) between the internal phase walls and the sidewalls of base 12, with this direction of movement causing the gases to substantially flow past and not into spring 206. Because spring 206 is a compression spring, it is easy to fabricate, leading to more accurately held tolerances and, thus, a more consistent spring force.

Intermediate Latch Structure

Figure 17:
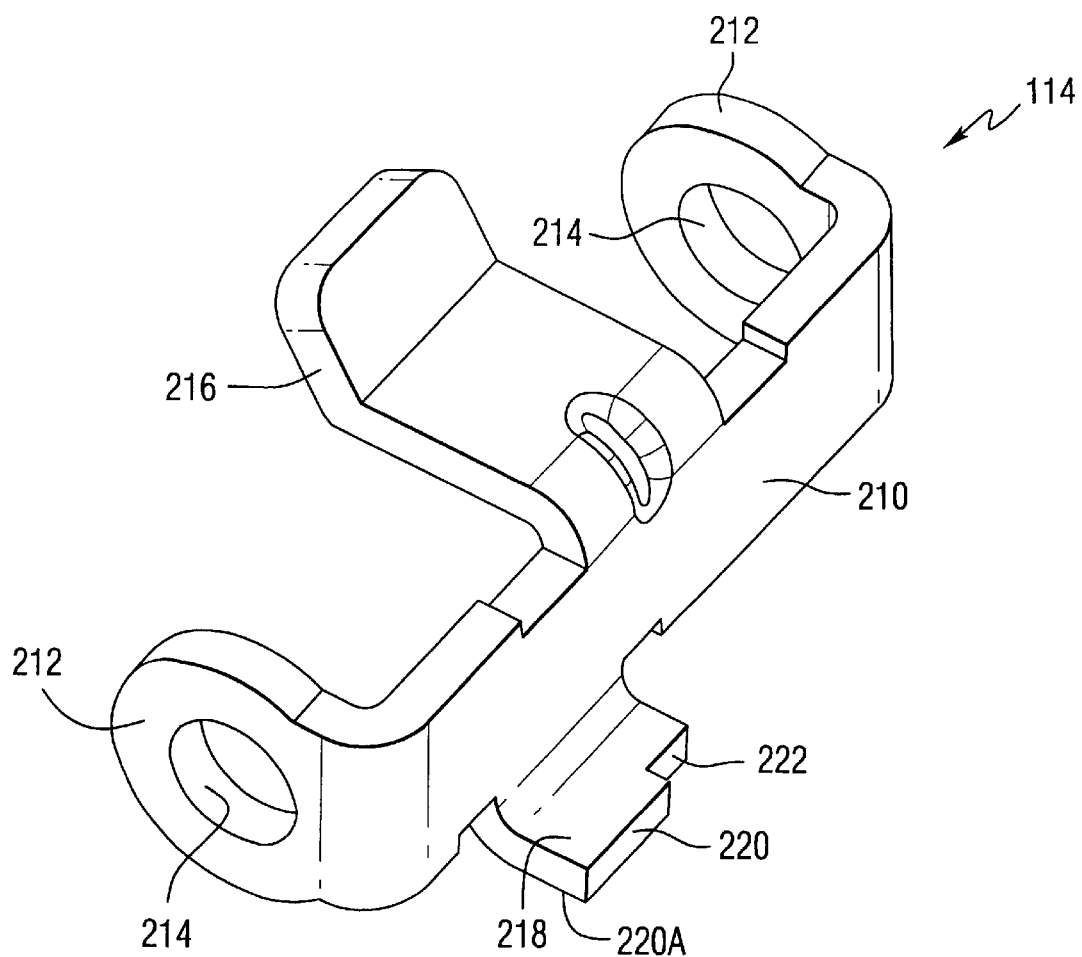
FIG. 17 is an orthogonal view of a latch of the circuit interrupter of FIG. 1.

Referring now to FIG. 17, shown is intermediate latch 114. Latch 114 includes a main member 210 having ends 212 which are bent towards each other and in which are formed holes or openings 214. Extending from main member 210 is an upper latch portion 216 and a lower latch portion 218, the latch portions being linearly offset from each other in the exemplary embodiment. Lower latch portion 218 includes a protruding region 220 with a bottom surface 220A, and a cutout region 222.

Figure 18:
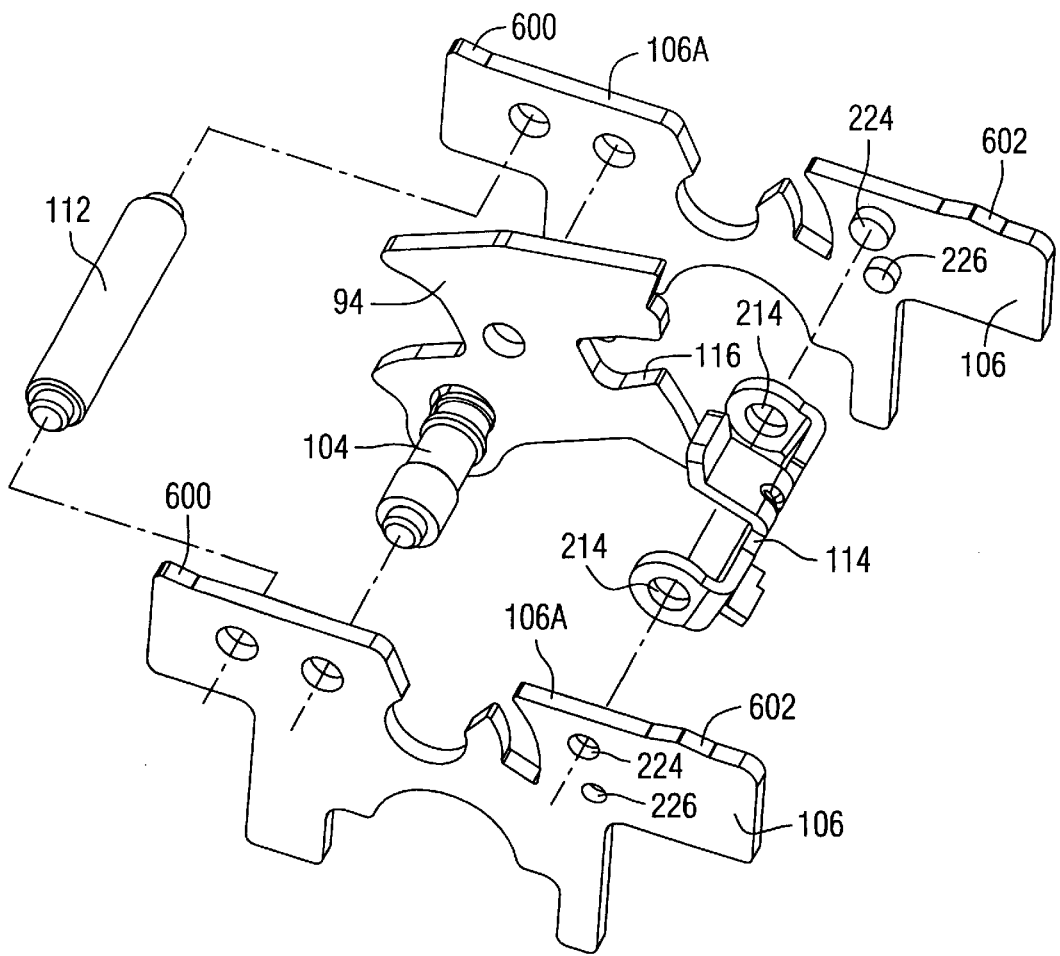
FIG. 18 is an exploded orthogonal view of a sideplate assembly of the circuit interrupter of FIG. 1.
Figure 19:
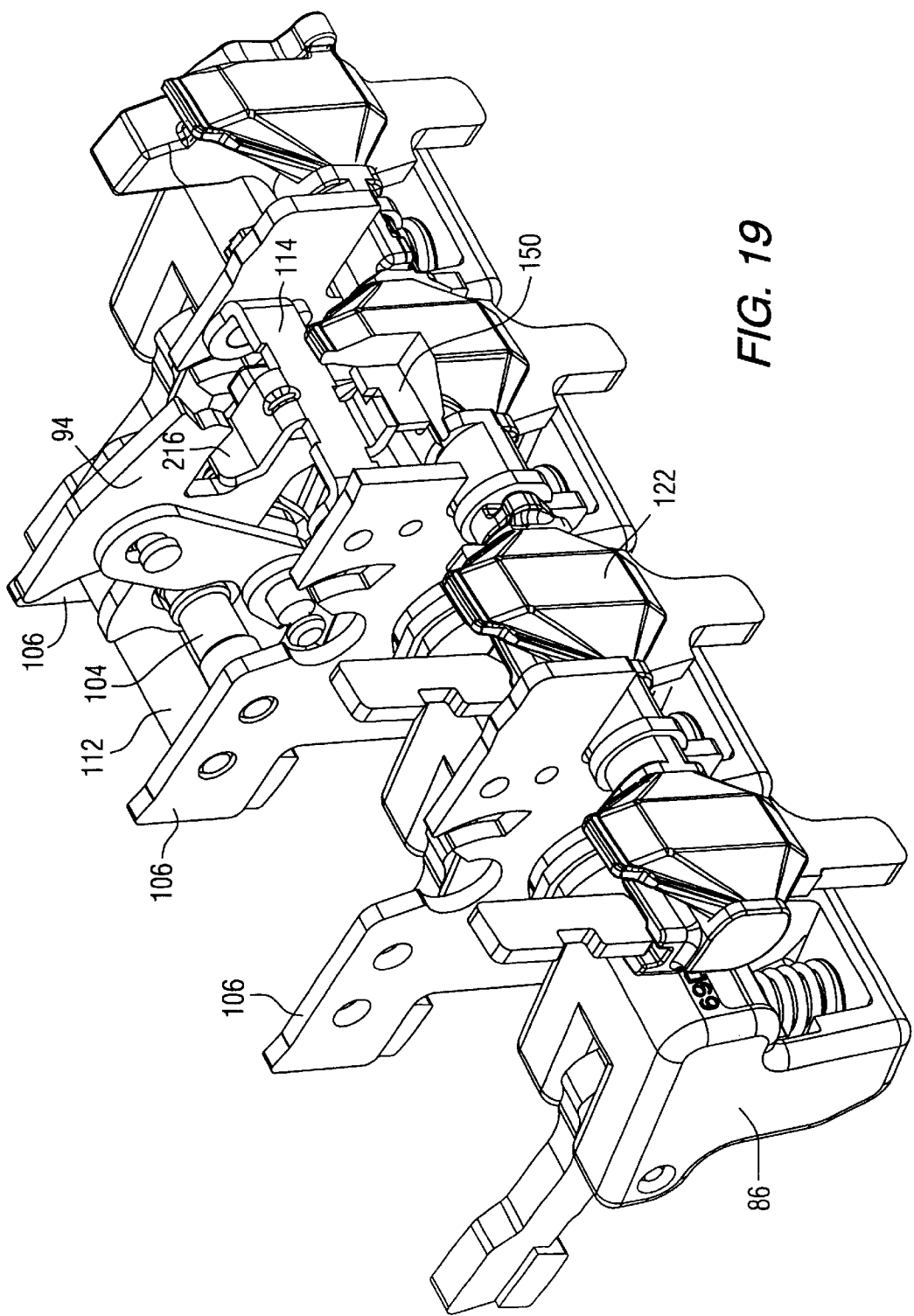
FIG. 19 is an orthogonal view of the sideplate assembly, trip bar assembly, and crossbar assembly of an internal portion of the circuit interrupter of FIG. 1.

Referring now also to FIGS. 18 and 19, shown in FIG. 18 is intermediate latch 114 which is laterally disposed between sideplates 106. Holes or openings 214 of latch 114 are mated with corresponding circular protrusions or indents 224 in sideplates 106, providing a pivot area for rotation of latch 114. Protrusions or indents 226 in sideplates 106 provide a stop for limiting the rotation of latch 114 in the clockwise direction which occurs during a tripping operation as described below.

FIG. 19 shows trip bar assembly 122 in conjunction with a portion of the internal workings of circuit breaker 10 including, in particular, those shown in FIG. 18. As described above, trip bar assembly is laterally and rotationally disposed between outer sidewalls 18 and 19 of base 12, and is rotationally biased in the counter-clockwise direction by spring 206 (FIG. 14). FIG. 19 shows the latching arrangement found in all dispositions of circuit breaker 10 except the TRIPPED disposition. Lower latch portion 218 of latch 114 is shown fixed in place by intermediate latch interface 150 of trip bar assembly 122 (a portion of trip bar assembly 122 being partially cut away for ease of illustration). In particular, cutout region 222 of latch 114 is shown mated with protrusion 152 of interface 150, with bottom surface 220A of protruding region 220 of latch 114 in an abutted, engaged relationship with surface 154A of interface 150. Upper latch portion 216 of latch 114 is shown abutted hard against lower portion 116 of latch cutout region 118 of cradle 94. Because latch 114 is prevented from clockwise rotation due to the engagement of lower latch portion 218 with intermediate latch interface 150, the abutment of upper latch portion 216 with cradle 94 prevents the counter-clockwise rotation of cradle 94, notwithstanding the spring tension (described above) experienced by the cradle in that direction. However, during a tripping operation as described below, trip bar assembly 122 is rotated clockwise (overcoming the spring tension provided by spring 206), causing surface 154A of intermediate latch interface 150 to rotate away from its abutted, engaged relationship with protruding region 220 of intermediate latch 114. This disengagement enables the spring forces experienced by cradle 94 to rotate latch 114 in a clockwise direction, thereby terminating the hard abutment between upper latch portion 216 and cradle 94, and releasing the cradle to be rotated counter-clockwise by the aforementioned springs until operating mechanism 62 is in the TRIPPED disposition described above in connection with FIG. 8.

Tripping Operation

Figure 20:
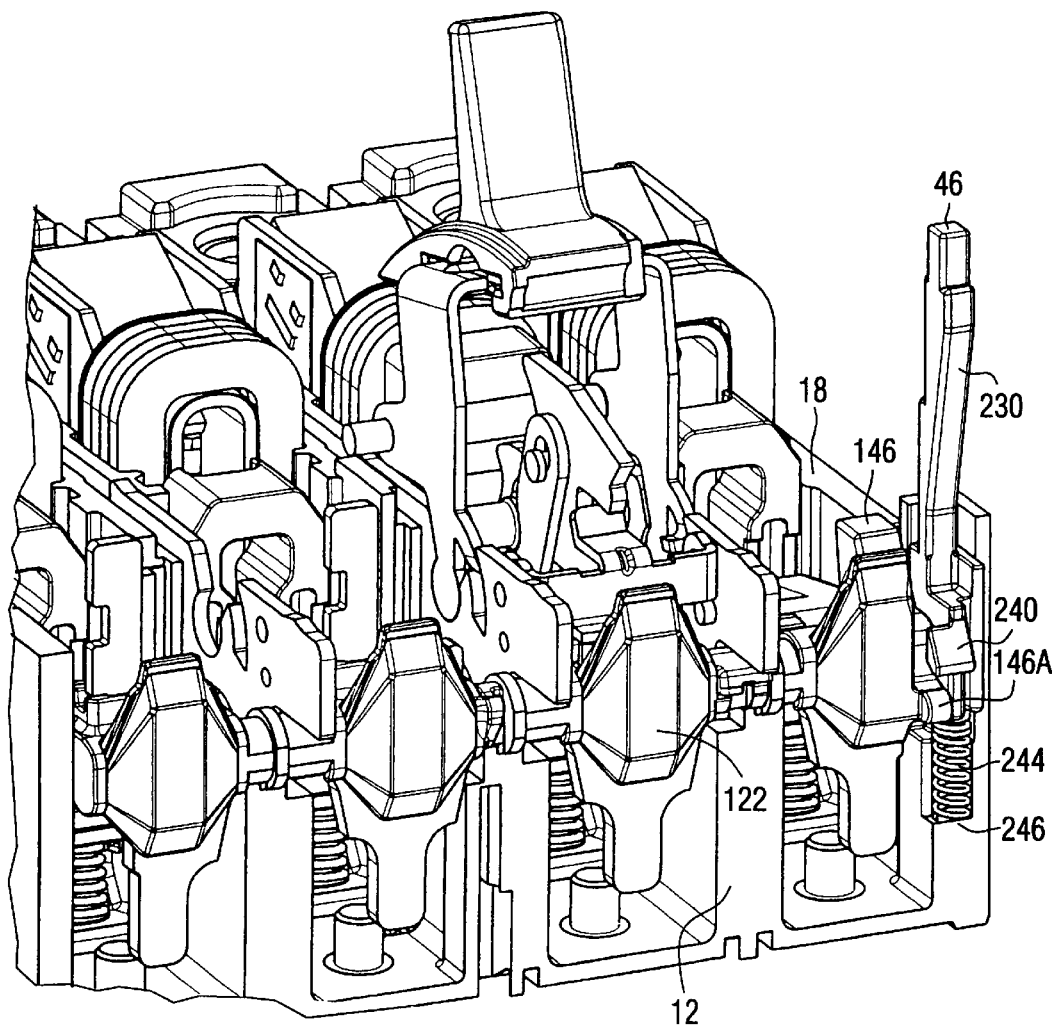
FIG. 20 is an orthogonal, partially broken away view of the trip bar assembly and dual purpose trip actuator of the circuit interrupter of FIG. 1.

There are several types of tripping operations that can cause trip bar assembly 122 to rotate in the clockwise direction and thereby release cradle 94. One type is a manual tripping operation, with the functioning thereof shown in FIG. 20. FIG. 20 shows a portion of the internal workings of circuit breaker 10 within base 12, with base 12 having been partially cut away to provide a better view. Shown is trip bar assembly 122 and multi-purpose trip member 146 thereof. Along the outer sidewall 18 of base 12 is an integrally molded dual purpose trip actuator 230 of trip mechanism 64 that is positioned such that it can be moved upwardly or downwardly.

Dual Purpose Trip Actuator

Figures 21A, 21B:
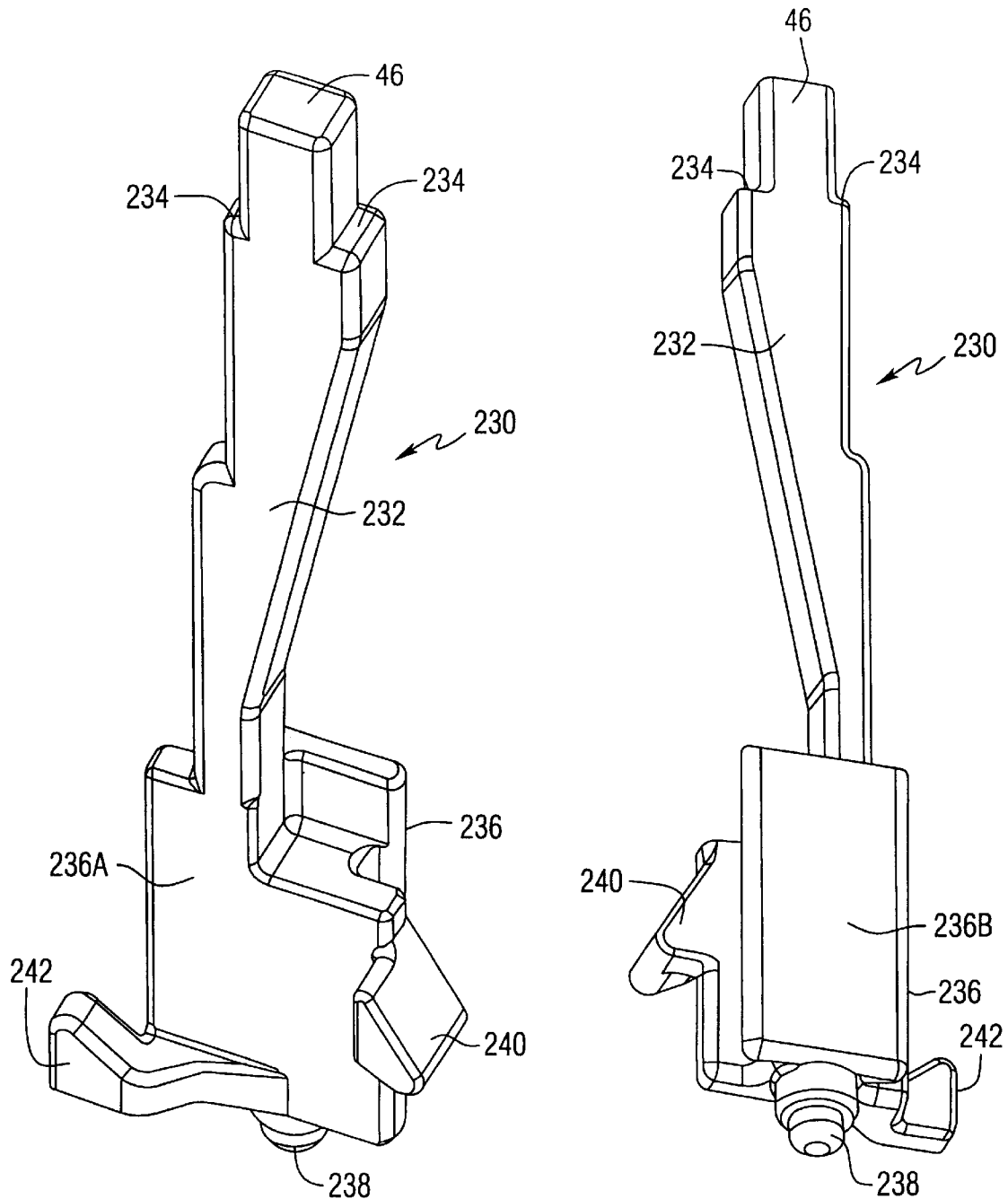
FIG. 21A is an orthogonal view of the dual purpose trip actuator.
FIG. 21B is another orthogonal view of the dual purpose trip actuator.

Referring now also to FIGS. 21A and 21B, dual purpose trip actuator 230 is comprised of a curved bar-like member 232 having shoulders 234 which define a top portion or button 46. Connected to bar-like member 232 is a body member 236 with a first side 236A and a second side 236B. Body member 236 includes a rounded portion 238 on the bottom thereof. Body member 236 also has a first tab member or push-to-trip member 240, and a second tab member or secondary cover interlock member 242. The above-described configuration of dual purpose trip actuator 230 can be advantageously molded without complicated molding processes such as bypass molding or side pull molding.

When dual purpose trip actuator 230 is assembled into circuit breaker (as shown in FIG. 20), an end of a compression spring 244 is in contact with the rounded portion 238 and extends between actuator 230 and a ledge 246 of base 12. Spring 244 thus provides an upward bias force on actuator 230. Button 46 protrudes through rectangular opening 42 of secondary cover 16 (FIGS. 1 and 2), with shoulders 234 abutting upwardly against a bottom surface of cover 16 so as to limit the upward vertical movement of actuator 230. As shown in FIG. 20, dual purpose trip actuator 230 is positioned such that first side 236A of body member 236 is adjacent to multi-purpose trip member 146 of trip bar assembly 122, and second side 236B is adjacent to outer sidewall 18 of base 12. In this position, push-to-trip member 240 is located just above push-to-trip actuating protrusion 146A of multi-purpose trip member 146.

When button 46 is depressed, the resulting downward movement of actuator 230 causes push-to-trip member 240 to contact push-to-trip actuating protrusion 146A and move it downwardly, thereby causing trip bar assembly 122 to rotate in the clockwise direction (when viewed, for example, in FIG. 6). As described above, this rotation of assembly 122 releases cradle 94 and results in the TRIPPED disposition shown in FIG. 8. Spring 244 causes dual purpose trip actuator 230 to return to its initial position when force upon top portion 25A of button 25 is no longer exerted.

Figure 22:
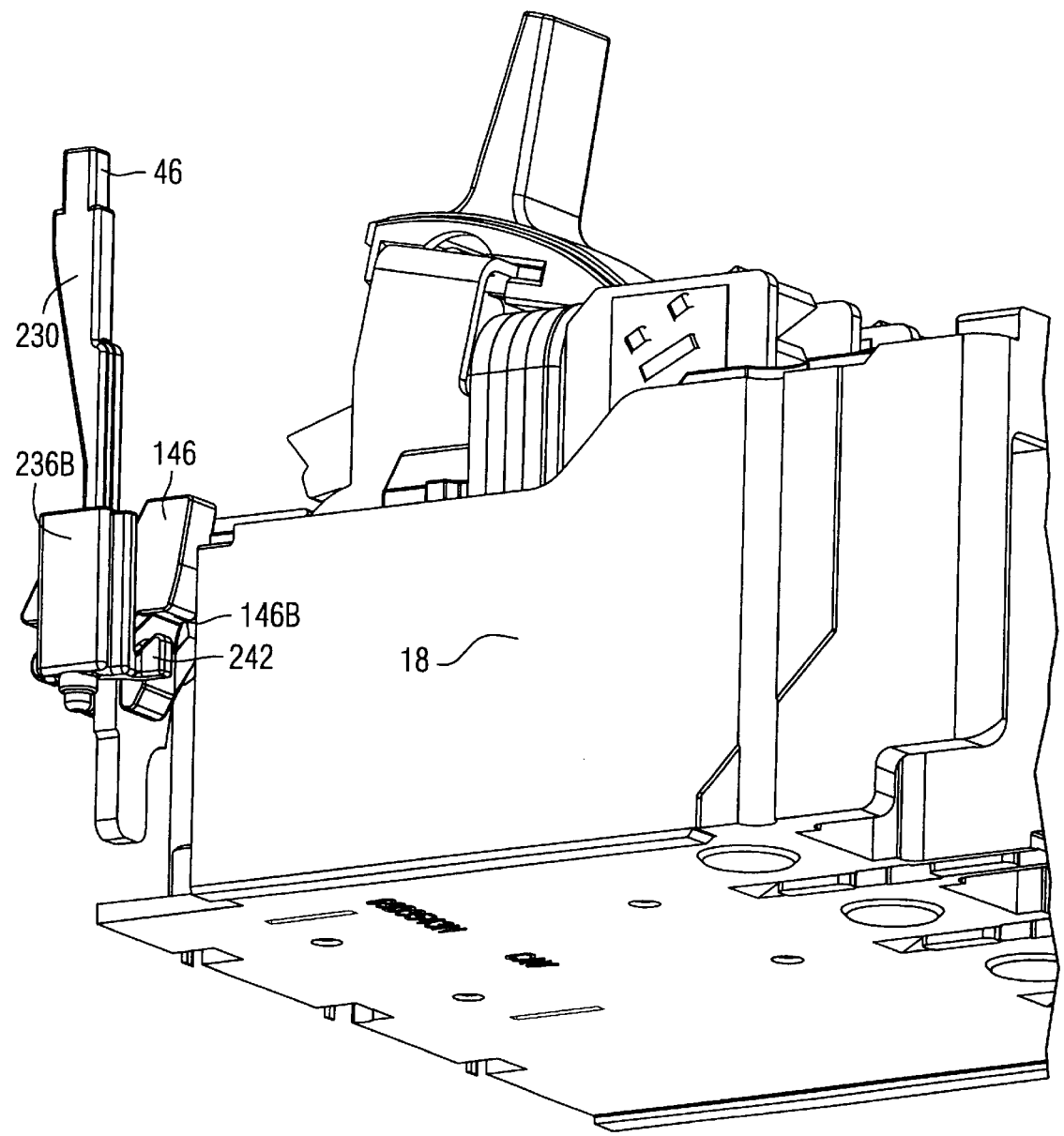
FIG. 22 is an orthogonal, partially broken away view of the trip bar assembly and dual purpose trip actuator of the circuit interrupter of FIG. 1.

In addition to the manual (or push-to-trip) tripping operation described above, dual purpose trip actuator 230 also provides a secondary cover interlock tripping operation, the functioning of which is shown in FIG. 22. FIG. 20 shows a portion of circuit breaker 10 with base 12 having been partially cut away to provide a better view. Actuator 230 is positioned in relation to multi-purpose trip member 146 such that secondary cover interlock member 242 is located just below interlock trip actuating region 146B of multi-purpose trip member 146. If secondary cover 16 is removed, shoulders 234 of actuator 230 have nothing to abut upwards against under the influence of compression spring 244 (not shown in FIG. 22 for the sake of simplicity). This causes actuator 230 to move upwardly, causing secondary cover interlock member 242 to contact interlock trip actuating region 146B and move it upwardly, thereby rotating trip bar assembly 122 in the counter-clockwise direction when viewed in FIG. 22 (or the clockwise direction when viewed, for example, in FIG. 6). As described above, this rotation of assembly 122 releases cradle 94 and results in the TRIPPED disposition shown in FIG. 8.

Automatic Trip Assembly

Circuit breaker 10 includes automatic thermal and magnetic tripping operations which likewise can cause trip bar assembly 122 to rotate in the clockwise direction and thereby release cradle 94. The structure for providing these additional tripping operations can be seen in FIG. 7 which shows circuit breaker 10 in its ON (non-TRIPPED) disposition, with latch 114 abutted hard against lower portion 116 of latch cutout region 118 of cradle 94, and latch 114 held in place by intermediate latch interface 150 (FIG. 13A) of trip bar assembly 122. Also shown is an automatic trip assembly 250 of trip mechanism 64 that is positioned in close proximity to trip bar assembly 122. An automatic trip assembly 250 is provided for each phase of circuit breaker 10, with each assembly 250 interfacing with one of thermal trip bars 142 and one of magnetic trip bars 144 of trip bar assembly 122, as described in detail below.

Figure 23A:
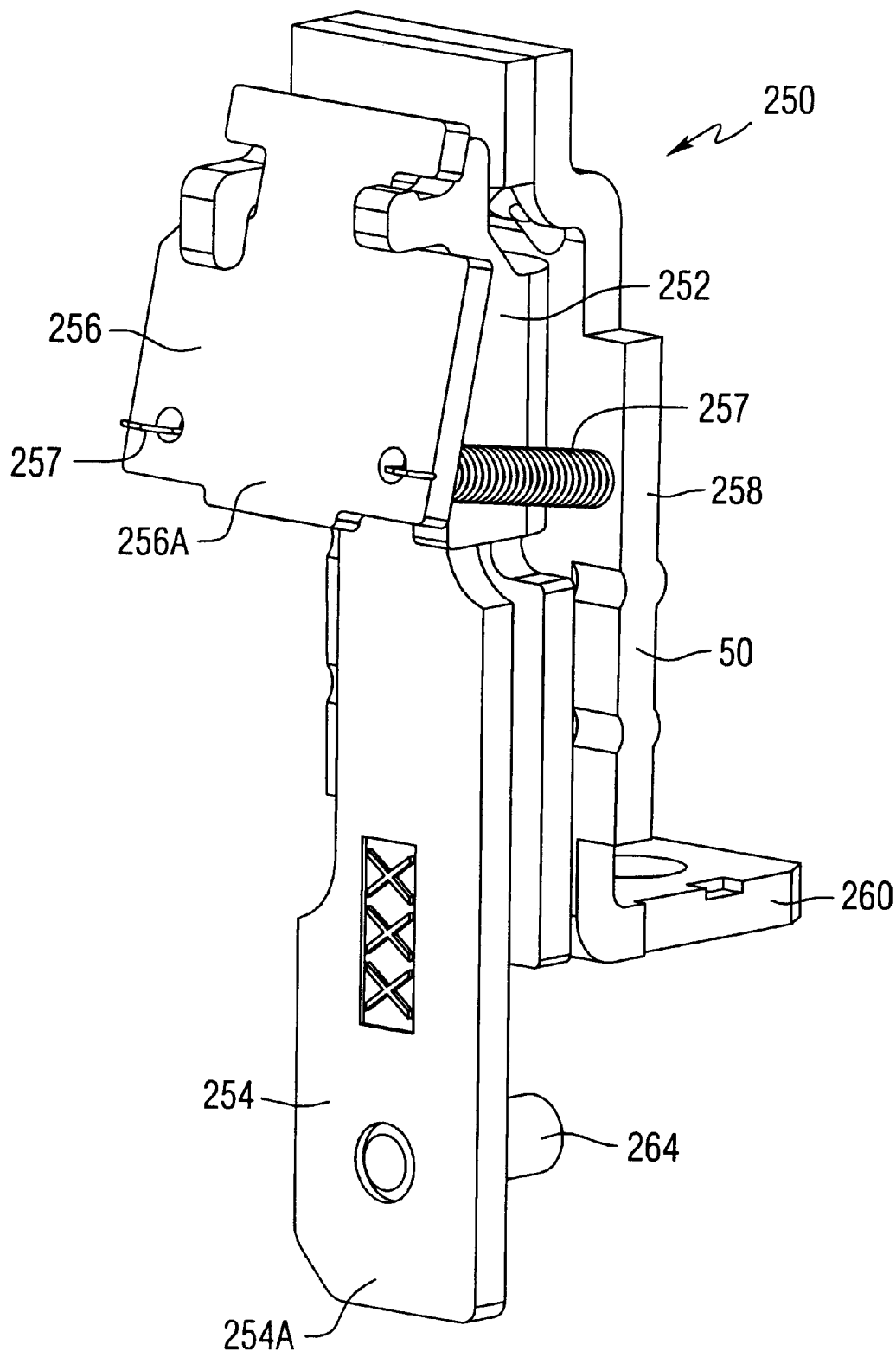
FIG. 23A is an orthogonal view of the automatic trip assembly of the circuit interrupter of FIG. 1.
Figure 23B:
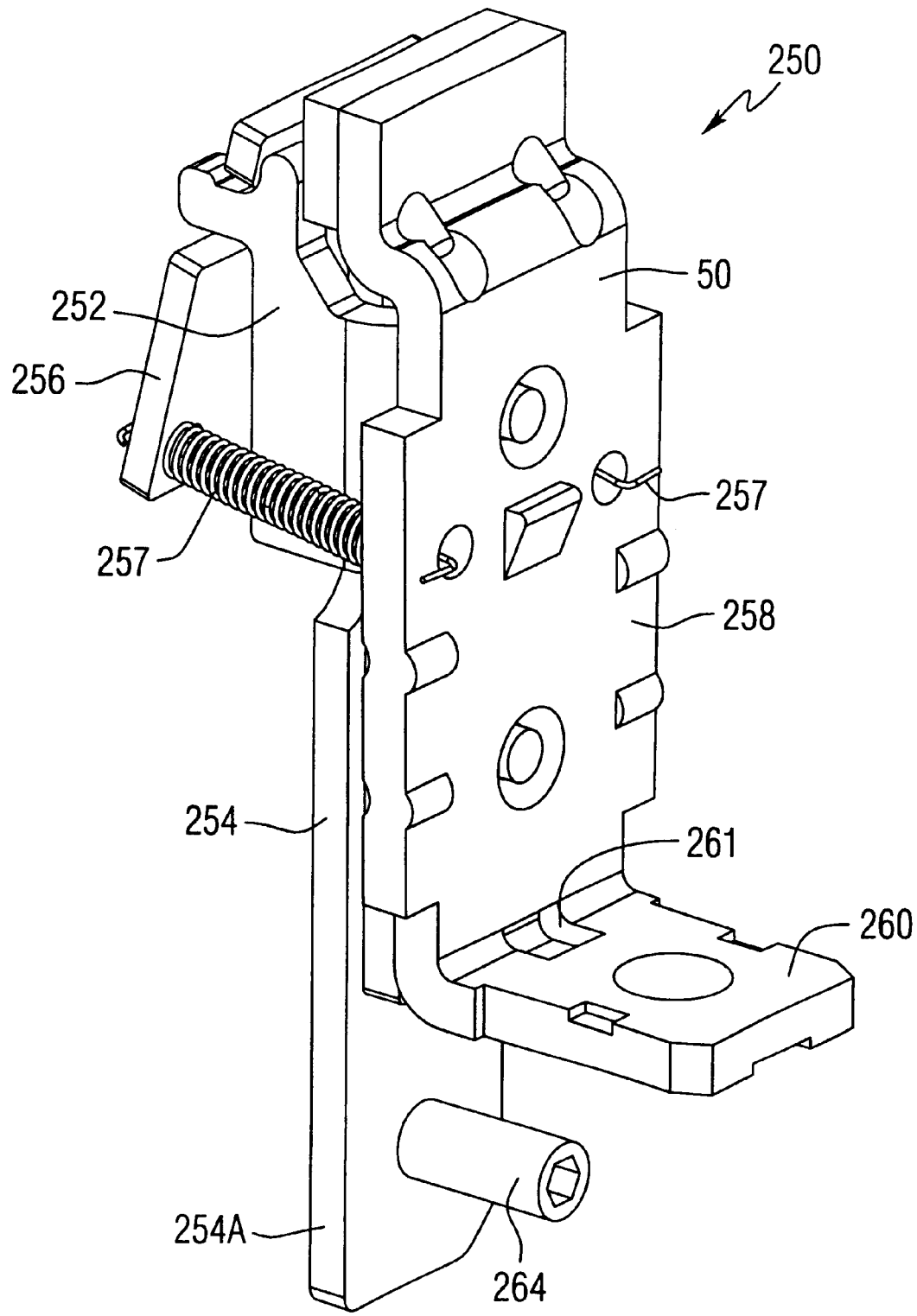
FIG. 23B is another orthogonal view the automatic trip assembly.
Figure 24A:
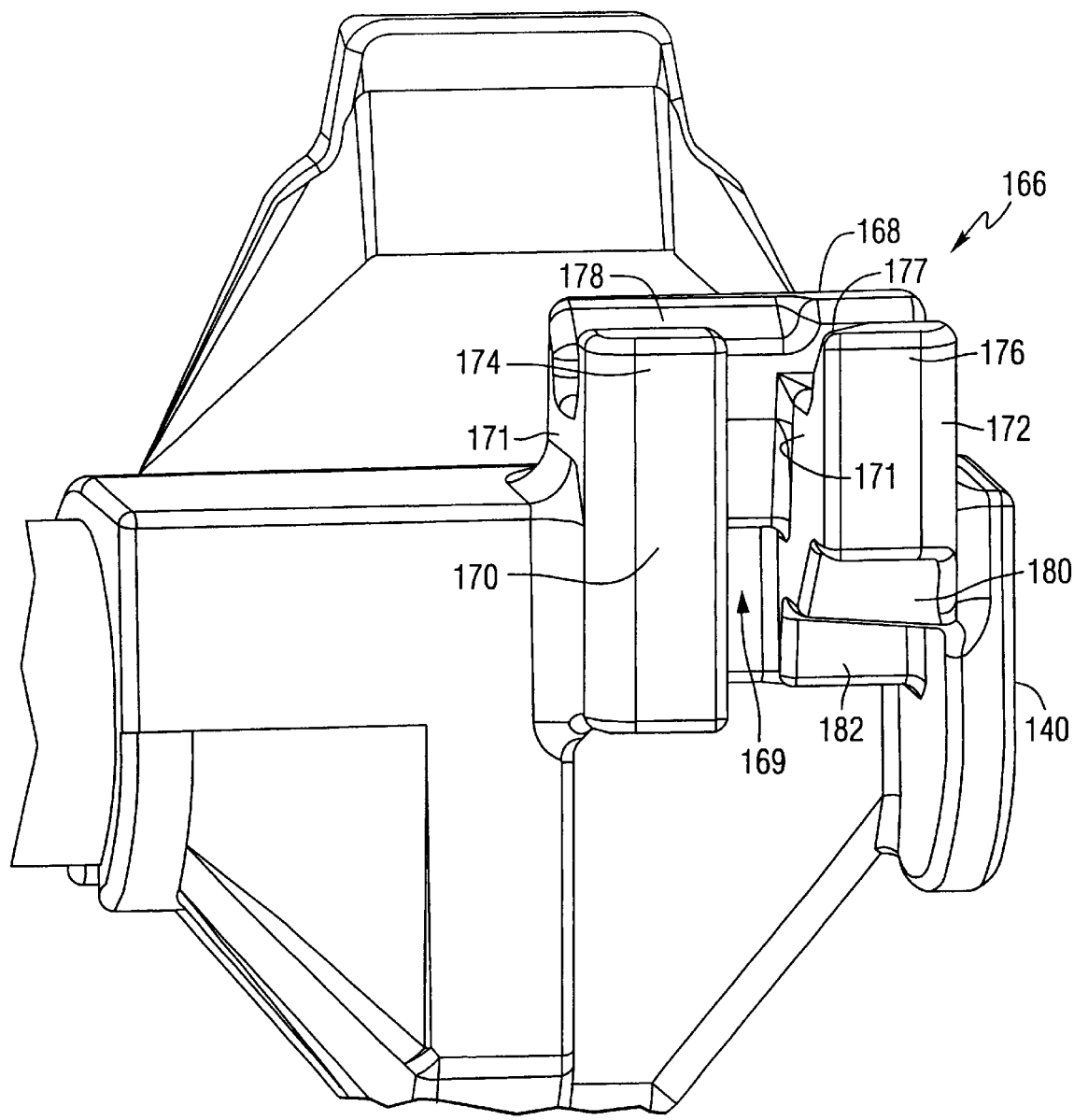
FIG. 24A is an orthogonal view of an attaching structure of the trip bar assembly of the circuit interrupter of FIG. 1.
Figure 24B:
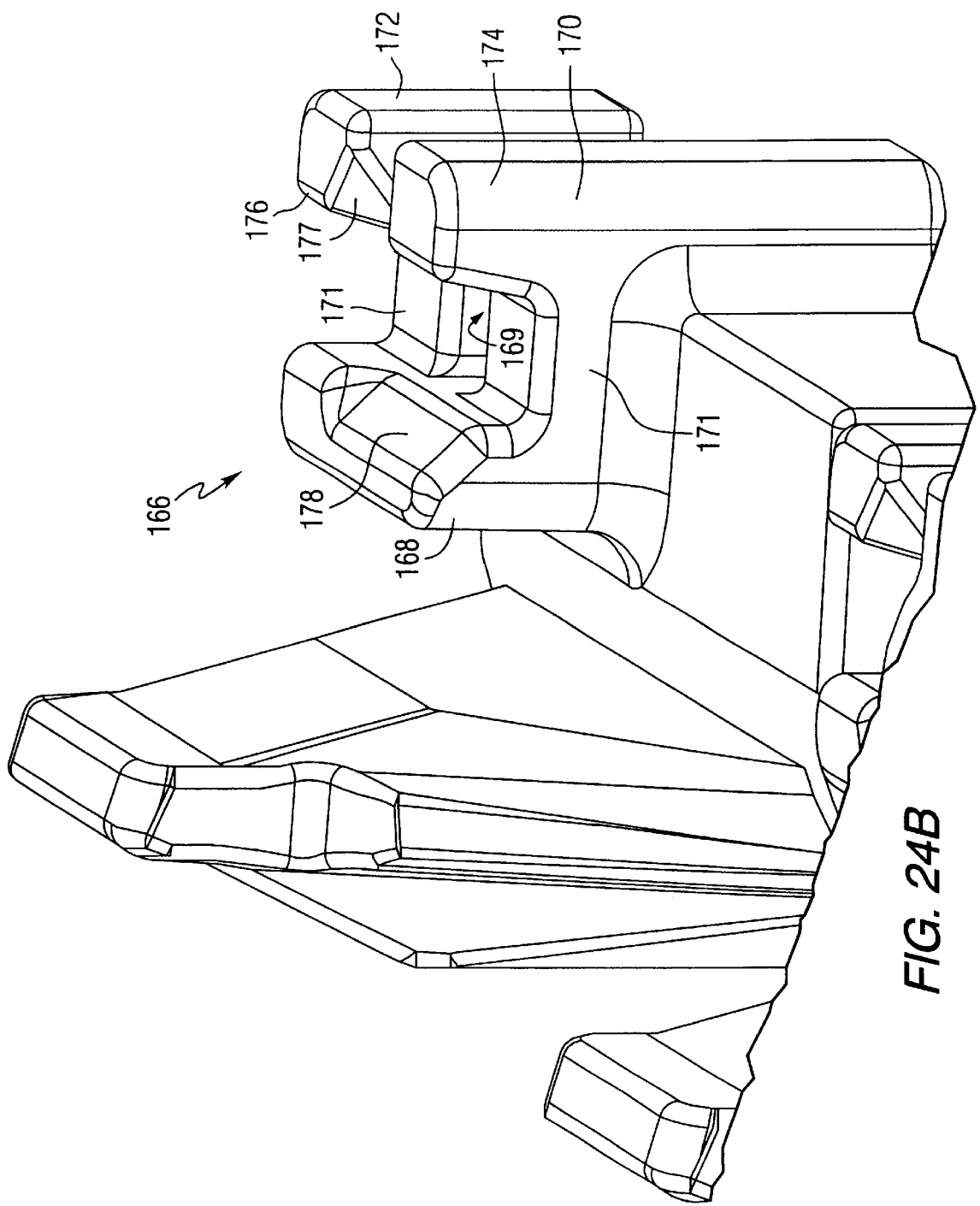
FIG. 24B is another orthogonal view of the attaching structure.
Figure 24C:
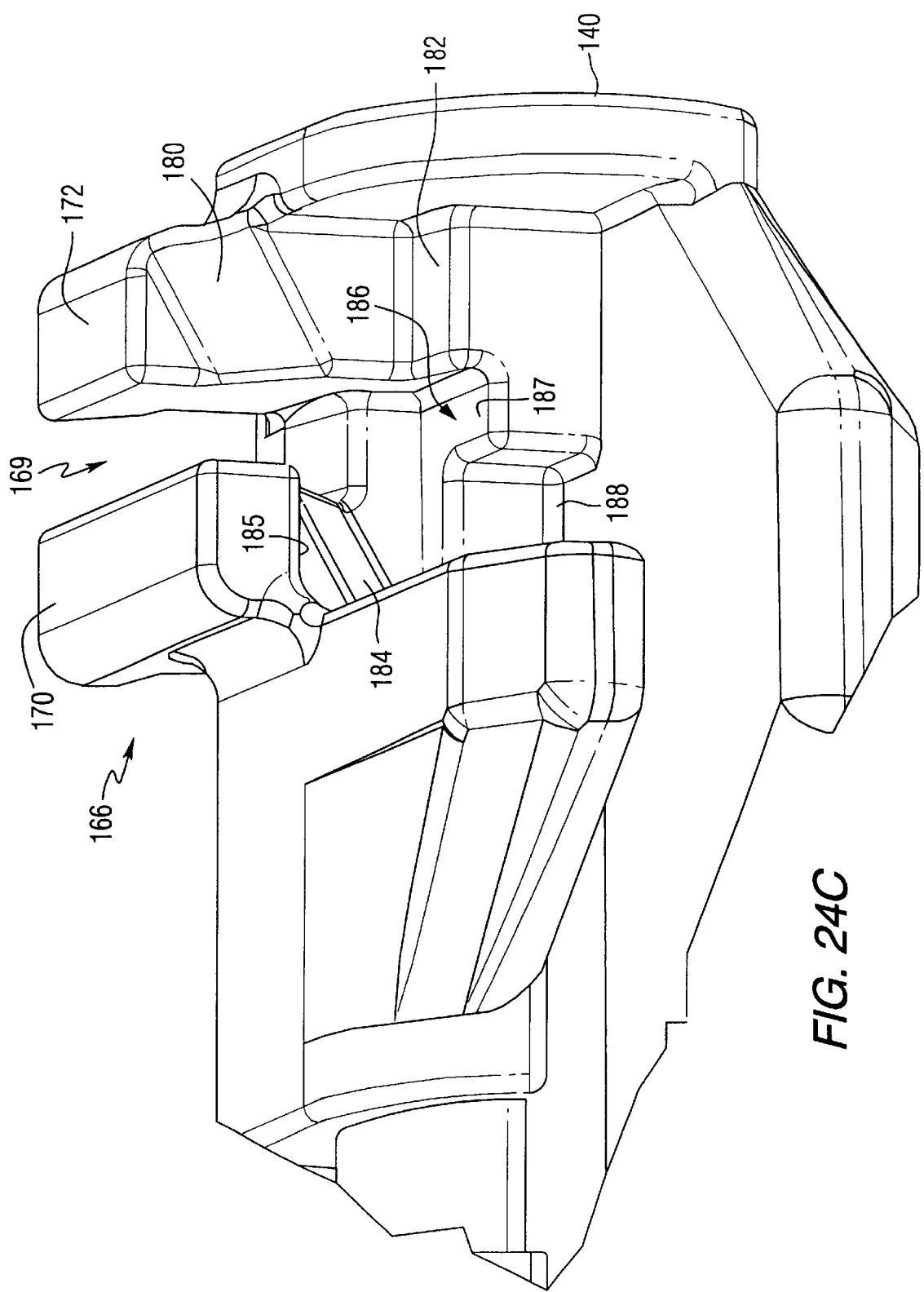
FIG. 24C is another orthogonal view of the attaching structure.
Figure 24D:
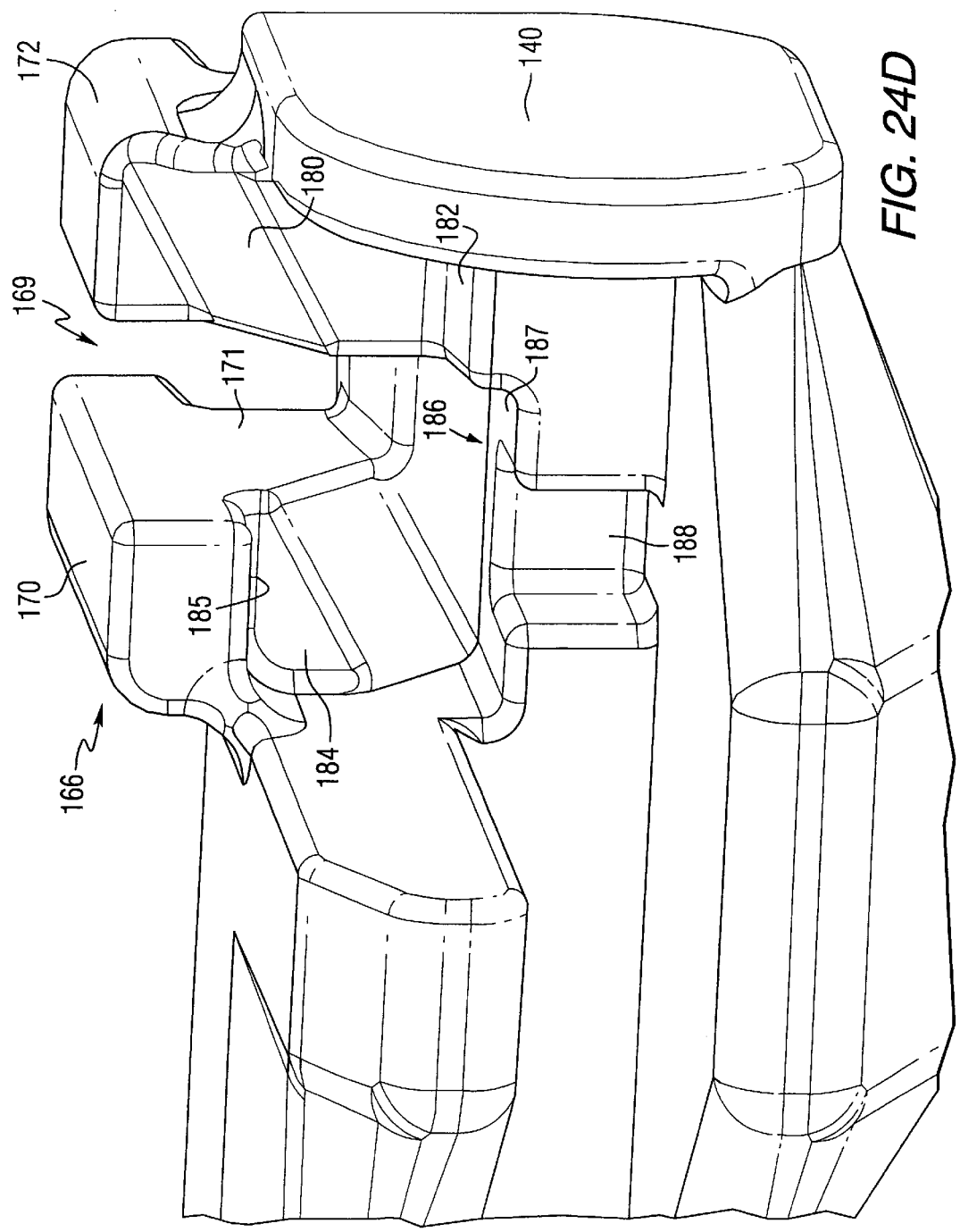
FIG. 24D is another orthogonal view of the attaching structure.

Referring now also to FIGS. 23A and 23B, shown in isolation is an automatic trip assembly 250 and its various components. A thorough description of the structure and operation of automatic trip assembly 250 and its components is disclosed in U.S. patent application Ser. No. 09/384,139, filed Aug. 1999, entitled "Circuit Interrupter With A Trip Mechanism Having Improved Spring Biasing", the entire disclosure of which is incorporated herein by reference. Briefly, assembly 250 includes a magnetic yoke 252, a bimetal 254, a magnetic clapper or armature 256 having a bottom 256A that is separated from yoke 252 by springs 257, and load terminal 50. Load terminal 50 includes a substantially planar portion 258 from which protrudes, in approximately perpendicular fashion, a bottom connector portion 260 for connecting with an external conductor by means of a device such as a self-retaining collar. Connector portion 260 includes a cutout 261 for reasons discussed below.

When implemented in circuit breaker 10 as shown in FIG. 7, an automatic trip assembly 250 operates to cause a clockwise rotation of trip bar assembly 122, thereby releasing cradle 94 which leads to the TRIPPED disposition described above in connection with FIG. 8, whenever overcurrent conditions exist in the ON disposition through the phase associated with that automatic trip assembly 250. In the ON disposition as shown in FIG. 7, electrical current flows (in the following or opposite direction) from load terminal 50, through bimetal 254, from bimetal 254 to movable contact arm 78 through a conductive cord 262 (shown in FIG. 3) that is welded therebetween, through closed contacts 80 and 84, and from stationary contact arm 82 to line terminal 52. Automatic trip assembly 250 reacts to an undesirably high amount of electrical current flowing through it, providing both a thermal and a magnetic tripping operation.

The thermal tripping operation of automatic trip assembly 250 is attributable to the reaction of bimetal 254 to current flowing therethrough. The temperature of bimetal 254 is proportional to the magnitude of the electrical current. As current magnitude increases, the heat buildup in bimetal 254 has a tendency to cause bottom portion 254A to deflect (bend) to the left (as viewed in FIG. 7). When non-overcurrent conditions exist, this deflection is minimal. However, above a predetermined current level, the temperature of bimetal 254 will exceed a threshold temperature whereby the deflection of bimetal 254 causes bottom portion 254A to make contact with one of thermal trip bars or members 142 of trip bar assembly 122. This contact forces assembly 122 to rotate in the clockwise direction, thereby releasing cradle 94 which leads to the TRIPPED disposition. The predetermined current level (overcurrent) that causes this thermal tripping operation can be adjusted in a conventional manner by changing the size and/or shape of bimetal 254. Furthermore, adjustment can be made by selectively screwing screw 264 (FIG. 23B) through an opening in bottom portion 254A such that it protrudes to a certain extent through the other side (towards thermal trip member 194). Protruding as such, screw 264 is positioned to more readily contact thermal trip member 142 (and thus rotate assembly 122) when bimetal 254 deflects, thus selectively reducing the amount of deflection that is necessary to cause the thermal tripping operation.

Automatic trip assembly 250 also provides a magnetic tripping operation. As electrical current flows through bimetal 254, a magnetic field is created in magnetic yoke 252 having a strength that is proportional to the magnitude of the current. This magnetic field generates an attractive force that has a tendency to pull bottom 256A of magnetic clapper 256 towards yoke 252 (against the tension of springs 257). When non-overcurrent conditions exist, the spring tension provided by springs 257 prevents any substantial rotation of clapper 256. However, above a predetermined current level, a threshold level magnetic field is created that overcomes the spring tension, compressing springs 257 and enabling bottom portion 256A of clapper 256 to forcefully rotate counter-clockwise towards yoke 252. During this rotation, bottom portion 256A of clapper 256 makes contact with one of magnetic trip paddles or members 144 which, as shown in FIG. 7, is partially positioned between clapper 256 and yoke 252. This contact moves magnetic trip member 144 to the right, thereby forcing trip bar assembly 122 to rotate in the clockwise direction. This leads to the TRIPPED disposition as described in detail above in connection with FIG. 8. As with the thermal tripping operation, the predetermined current level that causes this magnetic tripping operation can be adjusted. Adjustment may be accomplished by implementation of different sized or tensioned springs 257 that are connected between bottom portion 256A of clapper 256 and load terminal 50.

Accessory Mounting with Trip Bar and Housing

Circuit breaker 10 includes the ability to provide accessory tripping operations which likewise can cause trip bar assembly 122 to rotate in the clockwise direction and thereby release cradle 94. Referring now briefly again to FIG. 2, primary cover 14 includes cavities 32 and 33 into which may be inserted internal accessories for circuit breaker 10. Examples of such conventional internal accessories include an undervoltage release (UVR), and a shut trip. Each of cavities 32 and 33 includes a rightward opening (not shown) that provides access into base 12 and which faces trip mechanism 64. In particular, the opening within cavity 32 provides actuating access to accessory trip lever 148A, and the opening within cavity 33 provides actuating access to accessory trip lever 148B (see FIG. 13A). When an appropriate accessory device, located in cavity 33 for example, operates in a conventional manner whereby it determines that a tripping operation of circuit breaker 10 should be initiated, a plunger or the like comes out of the device and protrudes through the rightward opening in cavity 33 and makes contact with a contact surface 160 of accessory trip lever 148B. This contact causes trip lever 148B to move to the right, thereby causing a clockwise (when viewed in FIG. 7) rotation of trip bar assembly 122 which leads to the TRIPPED disposition as described in detail above in connection with FIG. 8.

Internal components of circuit breaker 10, such as automatic trip 30 assembly 250 or portions of primary cover 14, may obstruct the rotational movement of the top of an accessory trip lever 148 during clockwise rotation of trip bar assembly 122 during any type of tripping operation (push-to-trip, thermal, magnetic, etc.). This is especially true in a circuit breaker having internal space constraints. Such an obstruction can prevent lever 148 from continuing to rotate in the clockwise direction. In a manner described below, circuit breaker 10 of the present invention ensures that trip bar assembly 122 can continue to sufficiently rotate in the clockwise direction during a tripping operation notwithstanding such obstruction of an accessory trip lever 148.

Referring again to FIG. 13A, trip bar assembly includes integrally molded attaching devices or structures 166 that connect accessory trip levers 148A and 148B to trip bar assembly 122. Referring now also to FIGS. 24A, 24B, 24C, and 24D, each of the attaching structures 166 includes a rearward wall member 168 spaced apart from a first frontal support structure 170 and a second frontal support structure 172. Between wall member 168 and each of support structures 170 and 172 is a vertically recessed connecting wall 171. A cavity or cutout region 169 exists between support structures 170 and 172 and between connecting walls 171. The tops of support structures 170 and 172 define protrusions or stops members 174 and 176, respectively. Protrusion 176 includes a cutout or chamfered region 177 on the inner corner thereof. The top of wall member 168 includes an inwardly-facing cutout or chamfered region 178. Near the bottom of second frontal support structure 172 there is a cutout or chamfered region 180 that leads to an abutment surface 182. Underneath first frontal support structure 170 there is another cutout or chamfered region 184, and an abutment surface 185. Adjacent to abutment surface 182 is a clearance or cutout region 186 including a surface 187 and a cutout 188. The above-described configuration of attaching structure 166 can be advantageously molded into trip bar assembly 122 without complicated molding processes such as bypass molding or side pull molding.

Figure 25A:
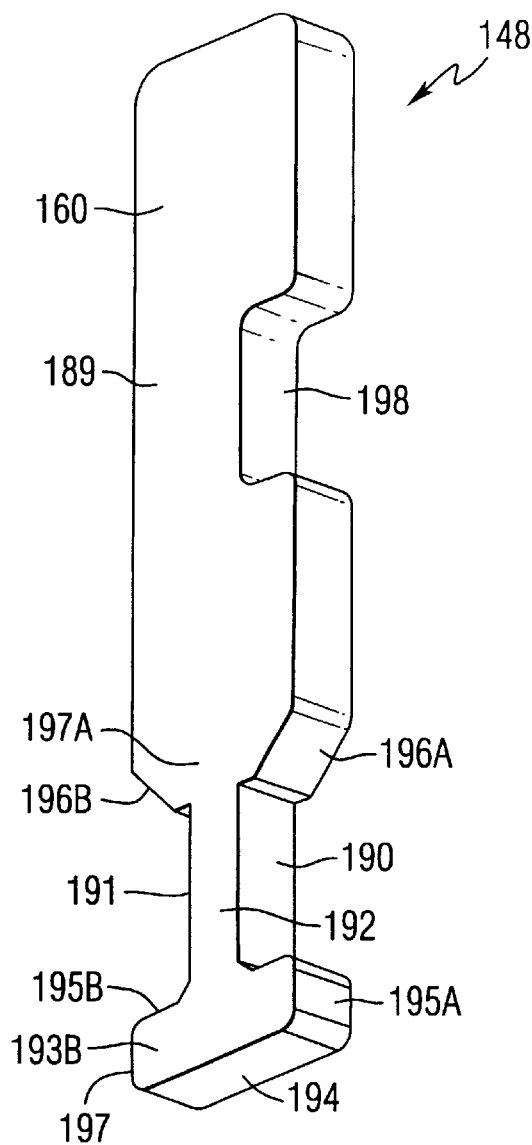
FIG. 25A is an orthogonal view of an accessory trip lever of the circuit interrupter of FIG. 1.
Figure 25B:
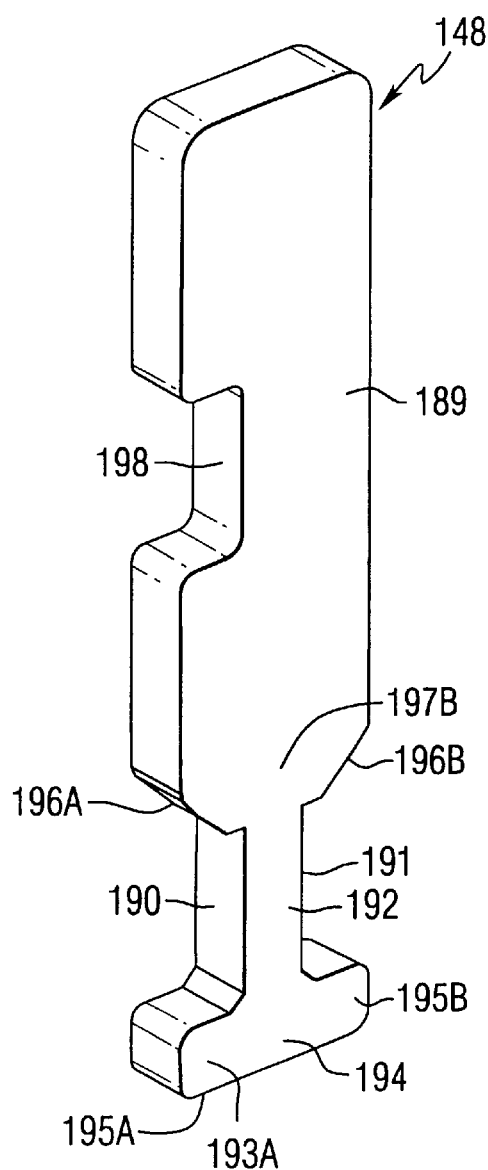
FIG. 25B is another orthogonal view of the accessory trip lever.

Now referring also to FIGS. 25A and 25B, shown is an accessory trip lever 148. Accessory trip lever 148 includes a main body portion 189 with a contact surface 160 (as described above). Lever 148 has cutout regions 190 and 191 that form a neck portion 192 and which define a head portion 194. Head portion 194 includes arms 195A and 195B which, in conjunction with neck 192, form an inverted T shape. Arm 195A has a rear abutment surface 193A, and arm 195B has a front abutment surface 193B. Adjacent to the top of neck portion 192 are cutout or chamfered regions 196A and 196B. In close proximity to chamfered regions 196A and 196B, main body portion 189 includes abutment surfaces 197A and 197B on opposite sides thereof. A cutout 198 exists in one side of body portion 189 for clearance of other internal components.

Figure 26:
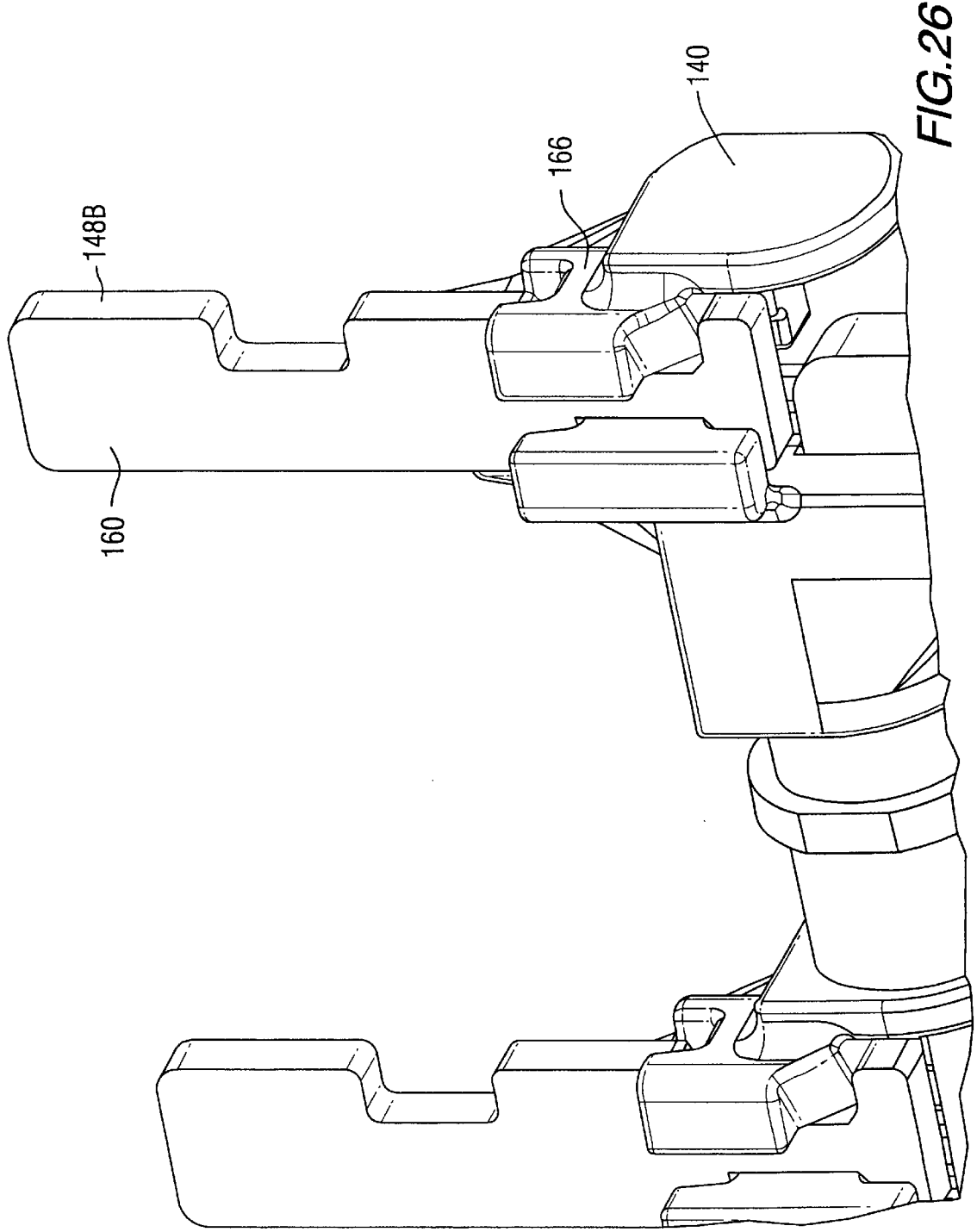
FIG. 26 is an orthogonal view of the accessory trip lever of FIG. 25A connected to the attaching structure of FIG. 24A.

Accessory trip levers 148A and 148B insert into attaching structures 166 in order to be connected to trip bar assembly 122. Referring now also to FIG. 26, the insertion process begins with the insertion of cutout region 191 of trip lever 148 into cavity 169 of attaching structure 166 until neck portion 192 is positioned within cavity 169 and until edge 197 of arm 195B contacts surface 187 of structure 166. Trip lever 148 is then rotated counter-clockwise (when viewed looking down into cavity 169) until arms 195A and 195B are seated adjacent to abutment surface 182 and cutout 188, respectively, at which time chamfered regions 196A and 196B of trip lever 148 are seated on top of connecting wails 171. The result is shown in FIG. 26. Mechanical clearance for the rotational movement of lever 148 is provided by the cooperation of chamfered regions 196A and 196B of lever 148 with chamfered regions 177 and 178, respectively, of attaching structure 166. In addition, chamfered region 180 provides clearance for arm 195A to rotate into place, and chamfered region 184 along with cutout region 186 provide clearance for arm 195B to rotate into place. The aforementioned positioning of accessory trip lever 148 provides a relatively secure engagement of lever 148 with attaching structure 166, and provides for limited pivotal movement therebetween in a manner described below.

The attachment of an accessory trip lever 148 to an attaching structure 166 enables lever 148 to move to the right (when viewed in FIG. 7) and thereby cause a clockwise rotation of trip bar assembly 122 when an accessory tripping operation is initiated by one of the above-described accessory devices. When contact surface 160 is first moved by such an accessory device, trip lever 148 is positioned whereby abutment surface 193B of arm 195B is substantially in contact with abutment surface 185 of attaching structure 166. In addition, abutment surface 197B of trip lever 148 is substantially in contact with wall member 168 of attaching device 166. The contact of these components causes movement of trip lever 148 to be directly converted into movement of trip bar assembly 122.

Figure 27A:
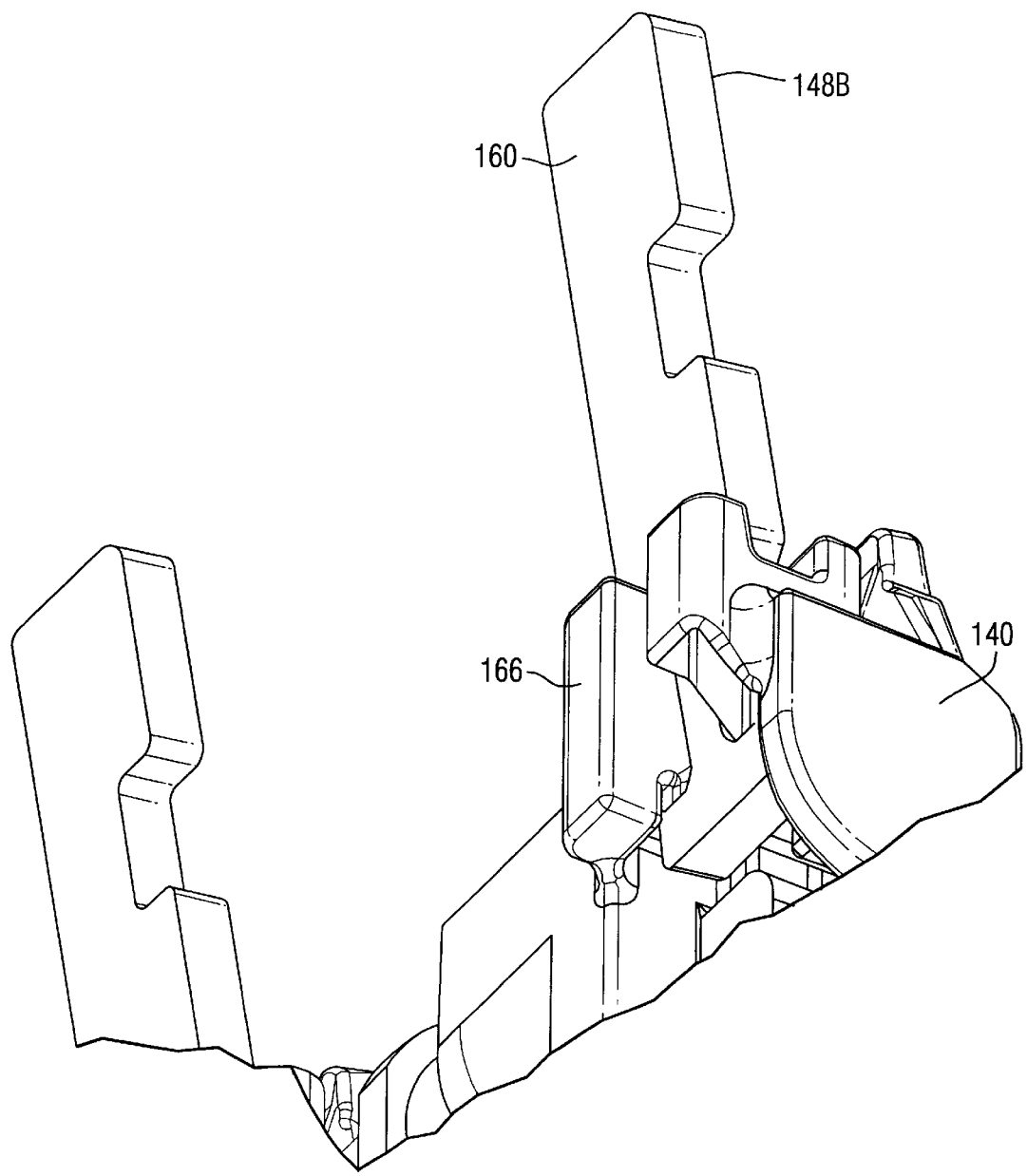
FIG. 27A is an orthogonal view similar to FIG. 26 with the accessory trip lever tilted.
Figure 27B:
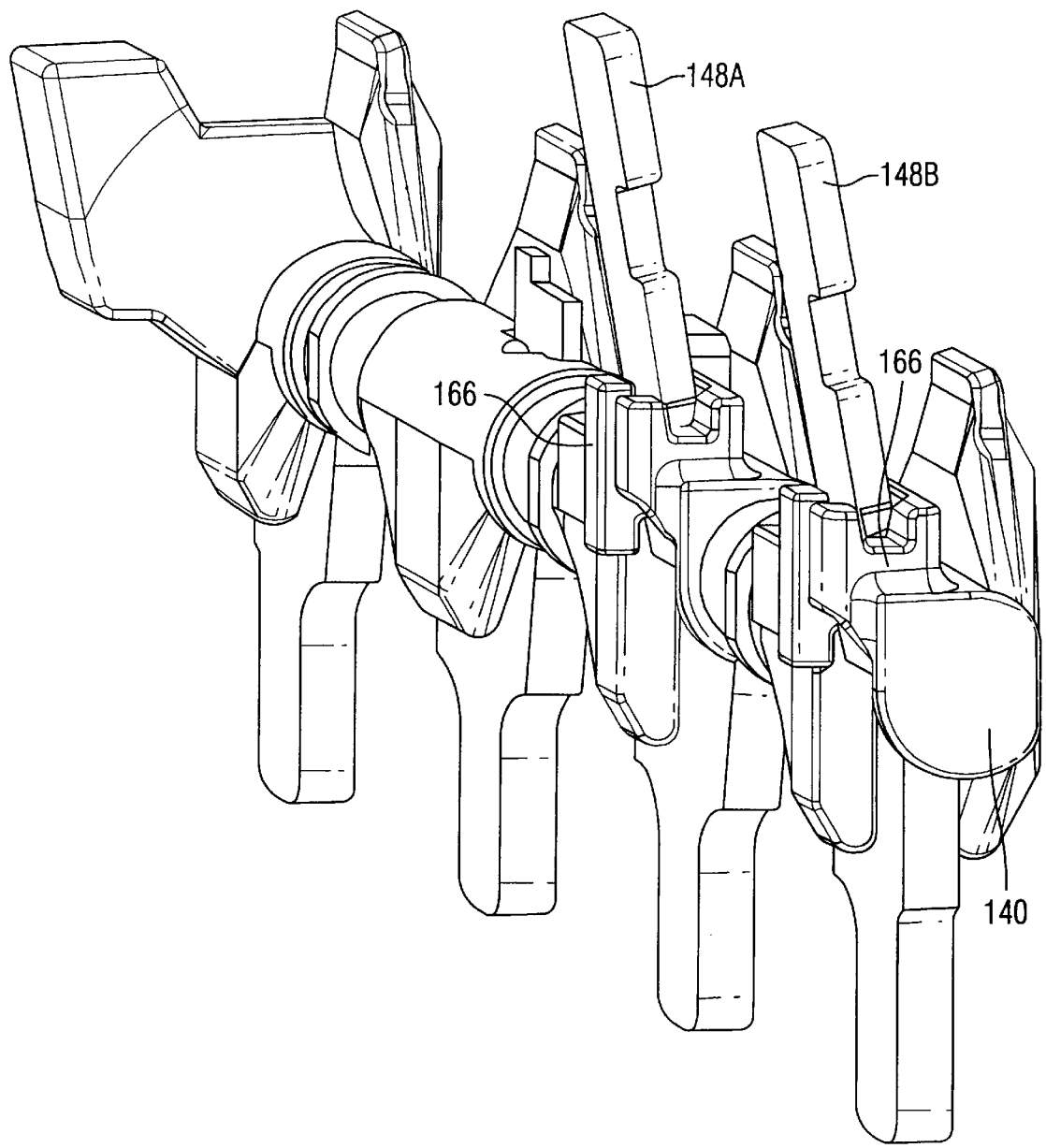
FIG. 27B is an orthogonal view showing the trip bar assembly with accessory trip levers tilted.

Reference is now made to FIGS. 27A and 27B. In order to accommodate for an aforementioned obstruction of an accessory trip lever 148, and yet enable trip bar assembly 122 to continue to sufficiently rotate in the clockwise direction, the attachment of trip lever 148 to attaching structure 166 enables limited pivotal movement therebetween. If an obstruction occurs, abutment surface 185 of attaching structure 166 pivots away from abutment surface 193B of arm 195B, and wall member 168 of attaching structure 166 pivots away from abutment surface 197B of trip lever 148. Attaching structure 166 (and thus trip bar assembly 122) can then pivot until abutment surface 182 thereof substantially contacts abutment surface 193A of arm 195A, and stop members 174 and 176 of attaching structure 166 substantially contact abutment surface 197A of trip lever 148, as shown in FIG. 27A. The dimensions of trip member 148 and attaching device 166 are selected so that the aforementioned range of pivoting translates into sufficient additional clockwise rotational movement of trip bar assembly 122 notwithstanding the obstruction of trip member 148. For the sake of illustration, FIG. 27B shows the interconnection of attaching devices 166 and accessory trip members 148A and 148B when full pivoting has occurred with respect to both interconnections due to an obstruction (no obstruction is shown).

In addition to the accessory tripping operations associated with internal accessories that may be positioned within cavities 32 and 33 of primary cover 14, circuit breaker 10 includes the ability to conveniently provide a tripping operation associated with an external accessory device. An example of such an external accessory device is a residual current device (RCD) which typically uses a toroid in order to externally monitor the current flowing through a circuit interrupter and determine whether or not current leakage exists. Circuit interrupter 10 enables such an accessory device to cause a rotation of trip bar assembly 122 and thereby generate a tripping operation.

Housing Base & Cover

Figure 28:
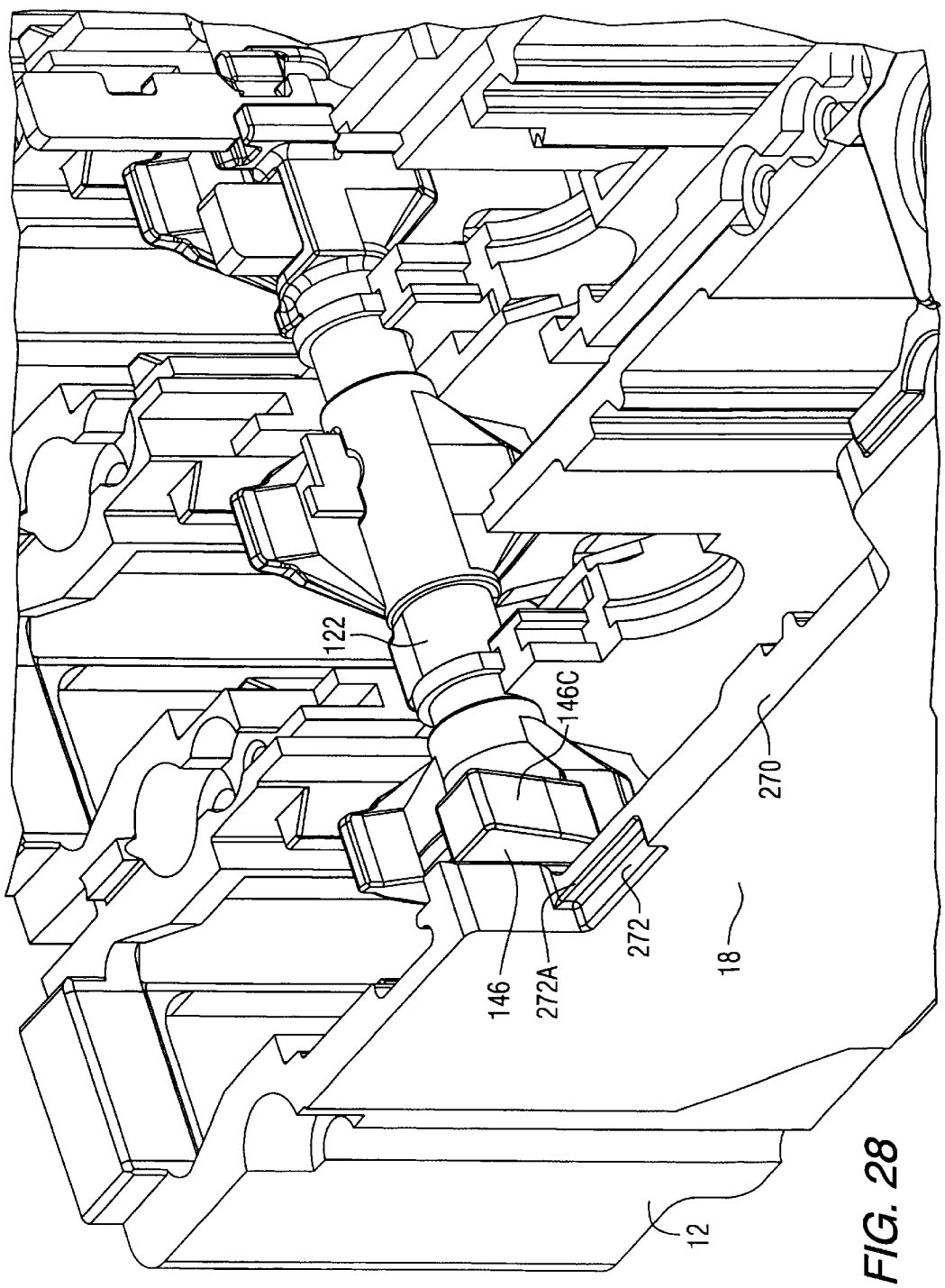
FIG. 28 is an orthogonal, partially broken away view of a groove in the base of the circuit interrupter of FIG. 1.
Figure 29:
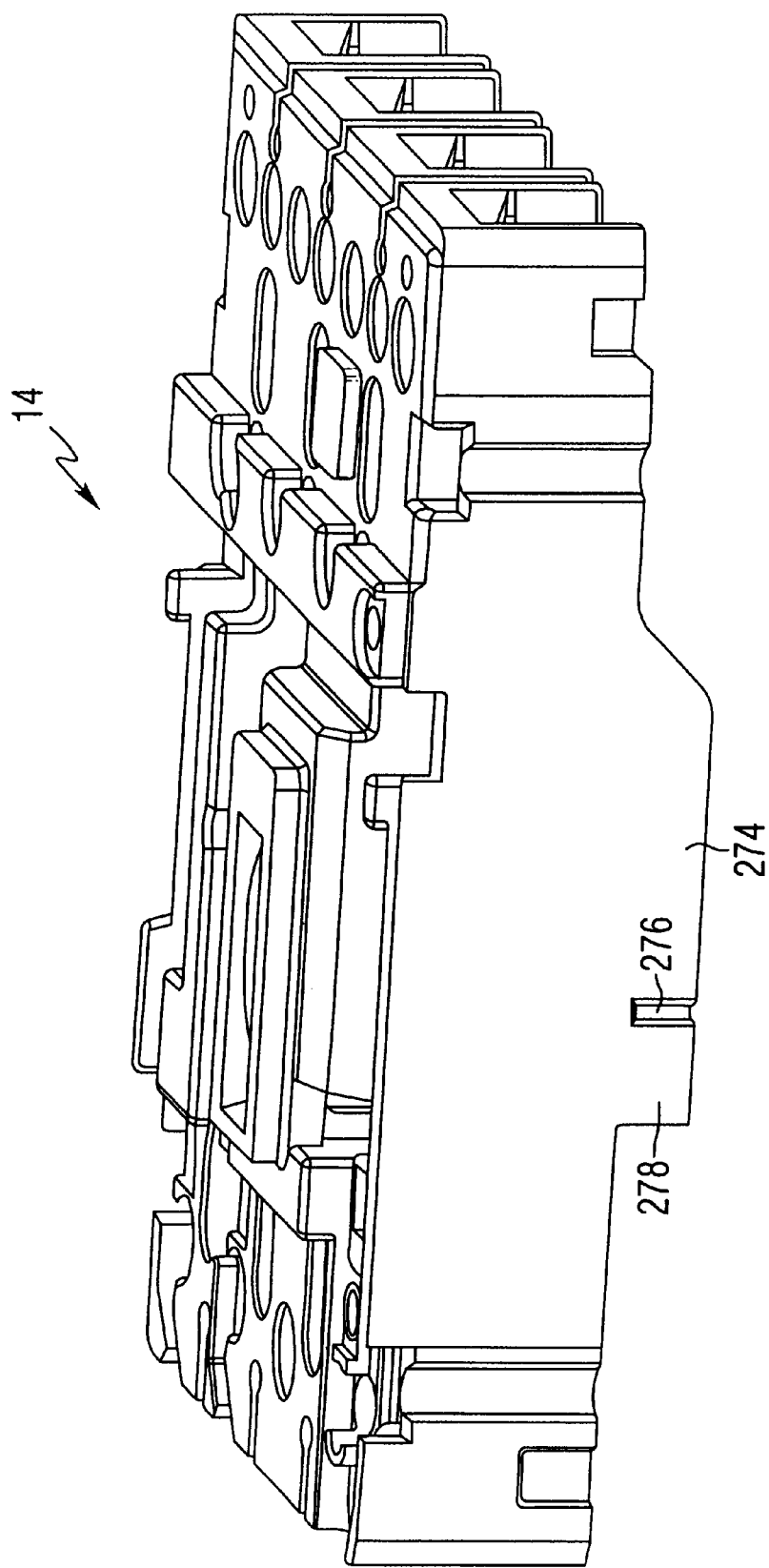
FIG. 29 is an orthogonal view of the primary cover of the circuit interrupter of FIG. 1 showing a break-away region.
Figure 30:
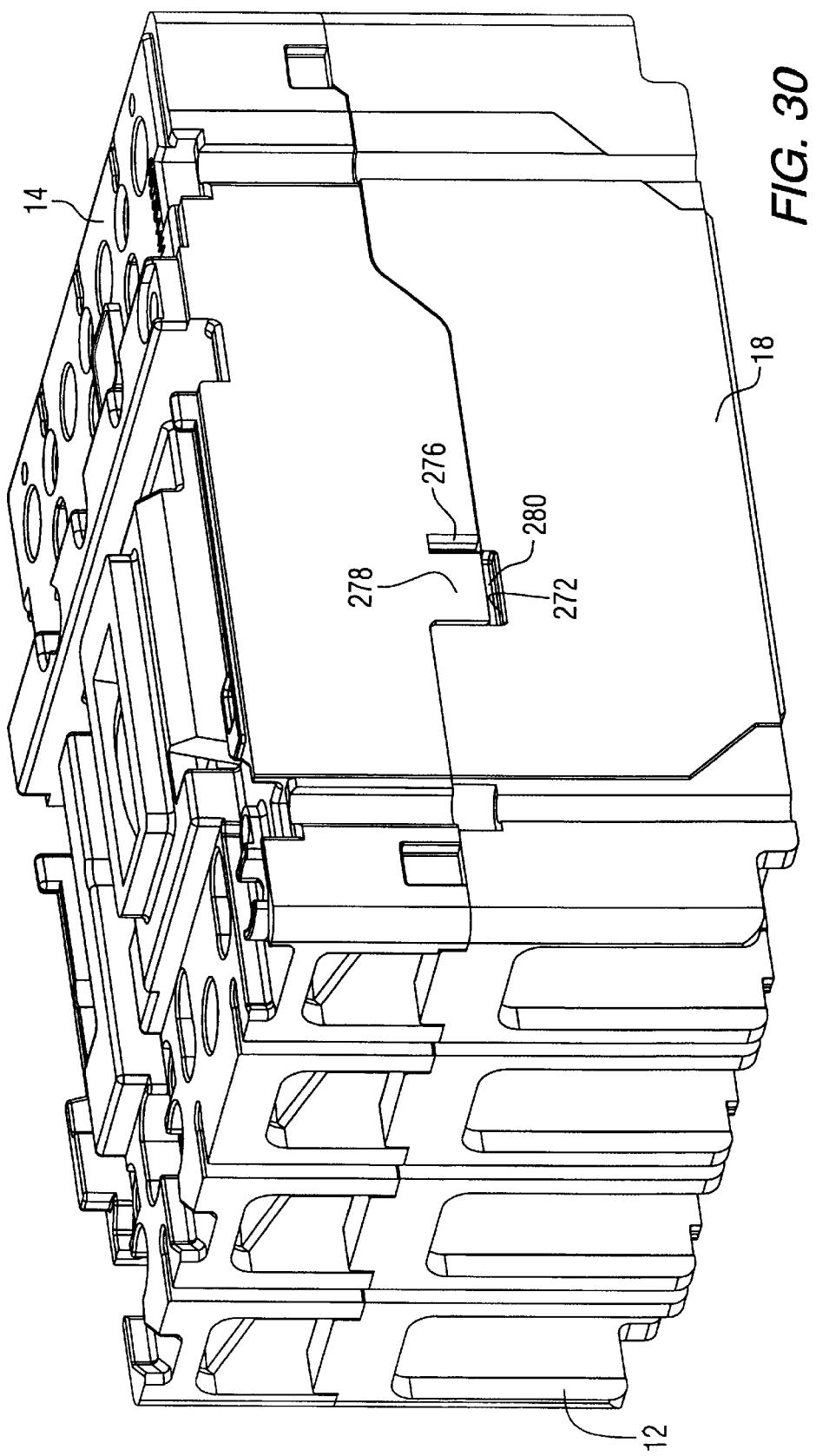
FIG. 30 is an orthogonal view of the primary cover and base of the circuit interrupter of FIG. 1.

Referring now to FIGS. 28–33, shown in FIG. 28 is a portion of outer sidewall 18 of base 12 and a portion of trip bar assembly 122 positioned within base 12. Sidewall 18 includes a recessed portion 270 into which is formed a groove or stepped-in portion 272 having a rear ledge 272A. Stepped-in portion 272 is in close proximity to the position of multi-purpose trip member 146 and, in particular, trip interface region 146C thereof. Shown in FIG. 29 is primary cover 14 including a protruding region 274 into which is formed an aperture or cutout 276 which defines a break-away region 278. When primary cover 14 is assembled on top of base 12 as shown in FIG. 30, protruding region 274 mates with recessed portion 270, with break-away region 278 thereby positioned above stepped-in portion 272. An opening 280 remains between the bottom of stepped-in portion 272 and the bottom of break-away region 278.

Figure 31:
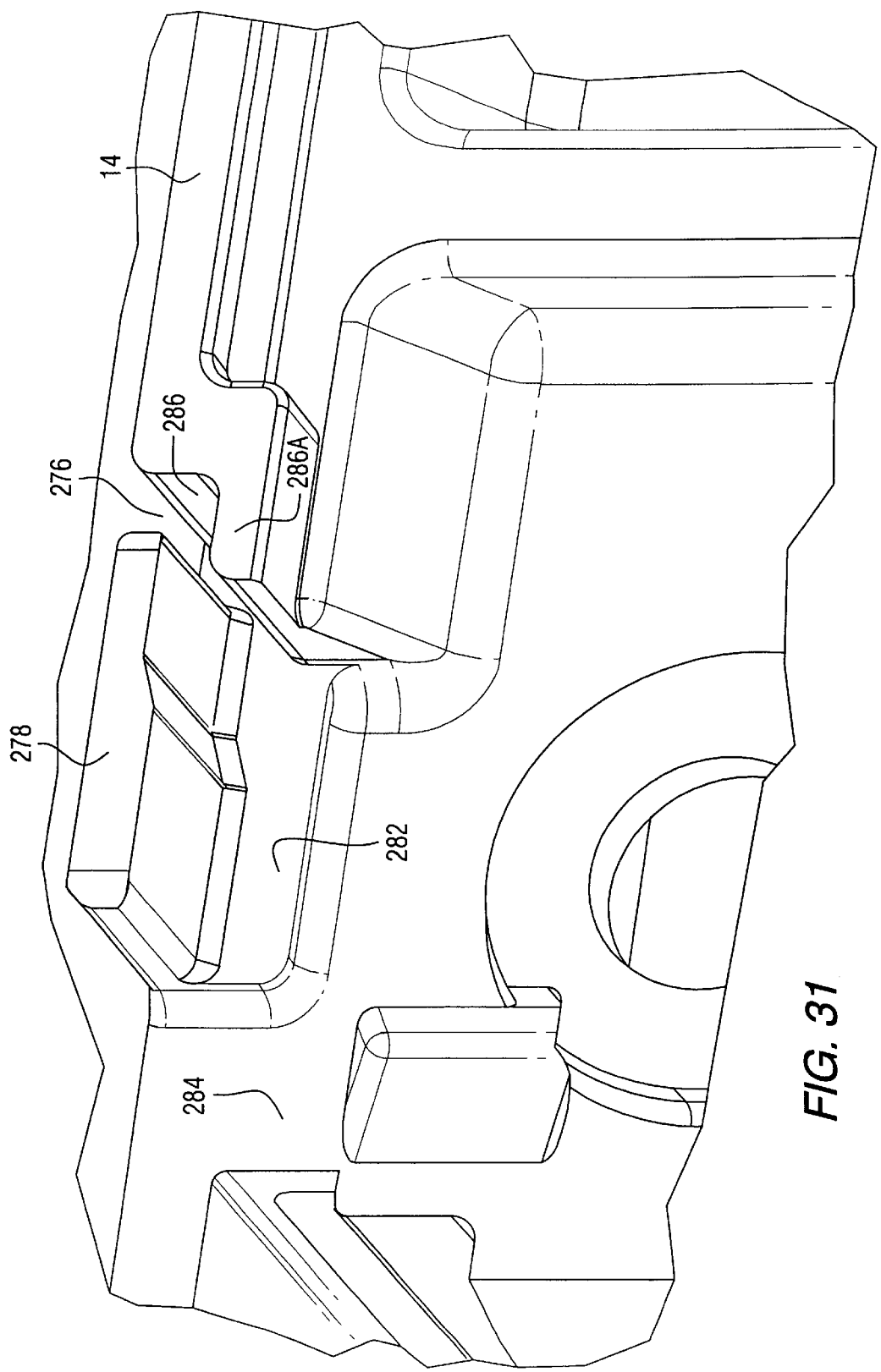
FIG. 31 is an orthogonal, partially broken away view of the break-away region of FIG. 29.
Figure 32:
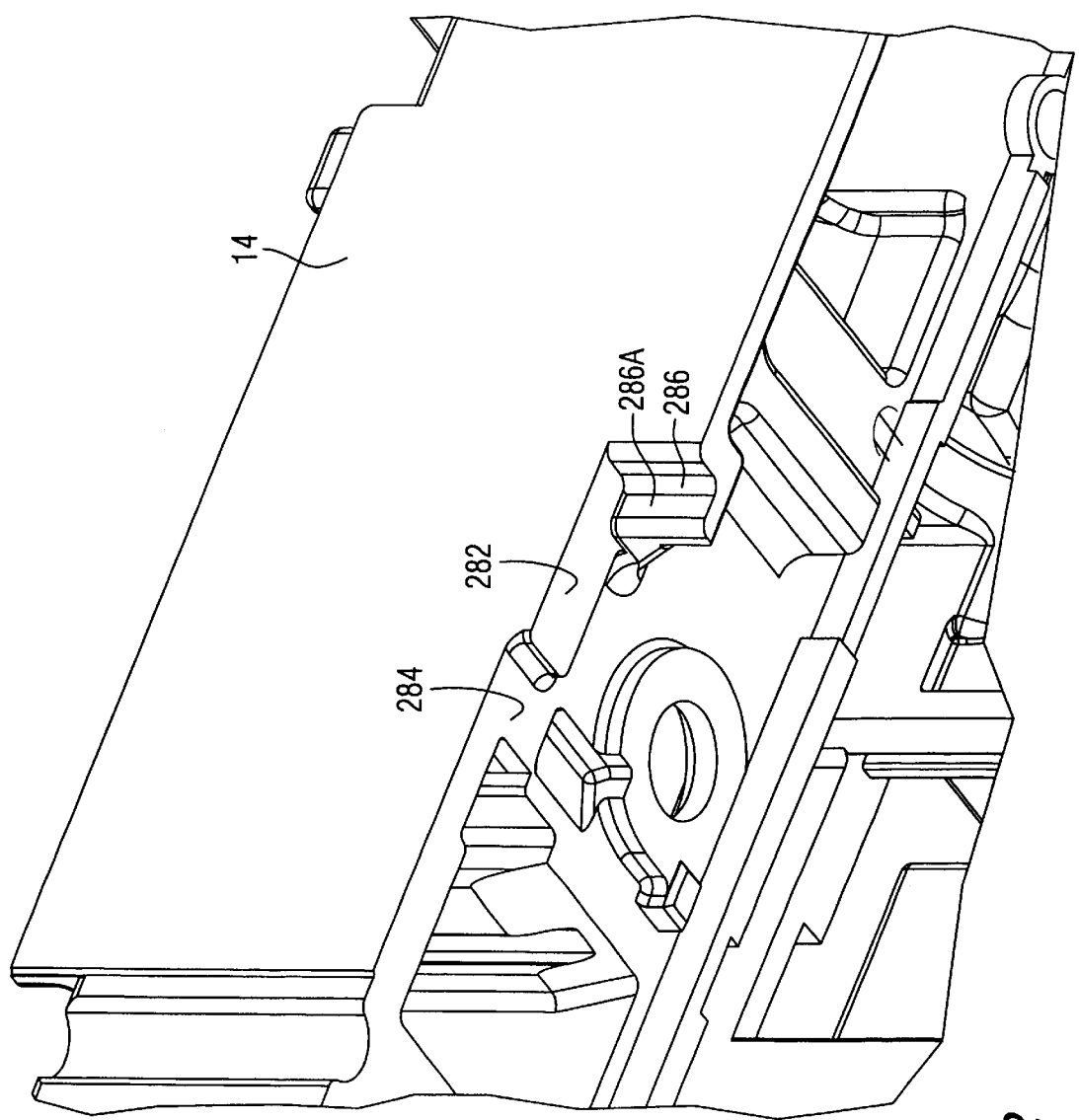
FIG. 32 is an orthogonal, partially broken away view of the break-away region broken off.

FIG. 31 shows an underside view of primary cover 14 in the vicinity of break-away region 278 and cutout 276 thereof. As shown, break-away region 278 is formed upon a raised surface 282 that, in turn, is formed on an inner surface 284 of primary cover 14. A curved wall portion 286, with a rear portion 286A, is likewise formed upon raised surface 282 and which partially defines cutout 276.

When an external accessory device, such as an RCD, is desired to be connected to an assembled circuit breaker 10 in order to provide an additional tripping operation, a tool such as a screwdriver is inserted into opening 280 (FIG. 30). The tool is then used to pry behind break-away region 278, causing region 278 to flex outwardly and eventually break off, with the result shown in FIG. 32 (showing primary cover 14 in isolation). Rear ledge 272A and rear portion 286A of wall 286 provide leverage for this prying process, and cooperate with the outward prying force to cause a snapped-off break-away region 278 to be deposited outside of circuit breaker 10 and not within. Ledge 272A and rear portion 286A also help to prevent the tool from inadvertently entering the main internal portions of circuit breaker 10 during the prying process. In the exemplary embodiment, break-away region 278 is molded of the same material as the rest of primary cover 14. Break-away region 278 is molded sufficiently thin and with sharp corners (to create stress areas) so as to facilitate this breakage without causing damage to surrounding areas of primary cover 14 or base 12.

Figure 33:
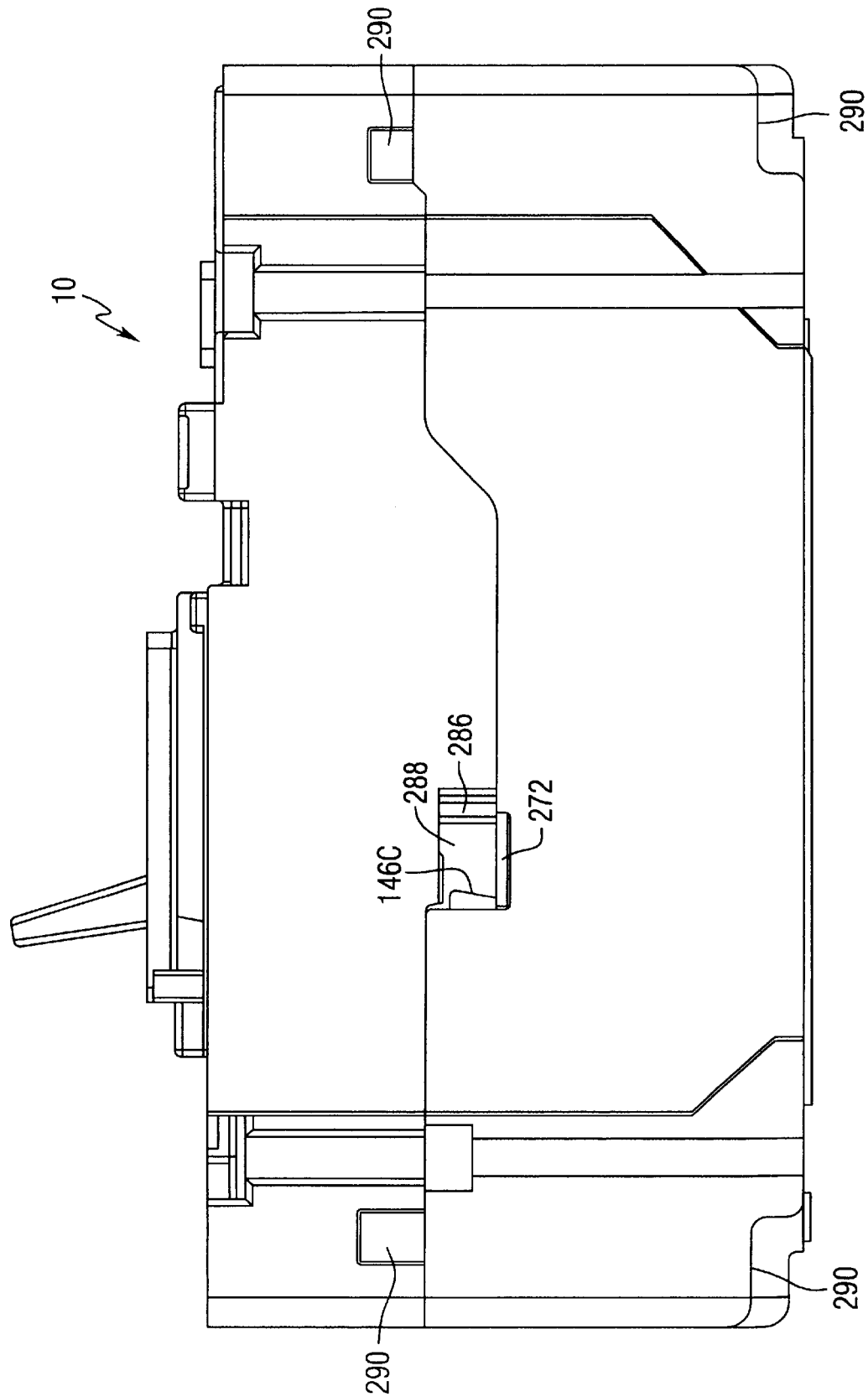
FIG. 33 is side elevational view of the base and primary cover of the circuit interrupter of FIG. 1 showing the break-away region broken off.

As shown in FIG. 33, the breaking off of break-away region 278 creates an opening 288 in an assembled circuit breaker 10 that provides convenient access to trip interface surface 146C. Thereafter, the external accessory device (not shown) can be mounted onto circuit breaker 10, the device preferably including mounting portions that mate with mounting areas 290 (FIG. 33) in order to ensure appropriate positioning. An appropriate tripping member or shaft (not shown) of the external accessory device can thereby be inserted into opening 288 and positioned adjacent to trip interface surface 146C. Such a tripping member is enabled to move horizontally into trip interface surface 146C when a tripping operation is determined to be desirable (such as when current leakage is detected). Opening 288 is sized so as to be large enough to accommodate this horizontal movement of the tripping member. Such contact with surface 146C causes trip bar assembly 122 to be rotated counter-clockwise when viewed in FIG. 28 (clockwise when viewed in FIG. 7) to thereby release cradle 94 and generate a tripping operation to separate contacts 80 and 84.

Because trip interface region 146C is a portion of member 146 that also provides push-to-trip and interlock tripping operation, internal space is conserved within circuit breaker 10. Also, break-away region 278 enables circuit breaker 10 to be adapted for use with an external accessory device only if desired. In addition, break-away region 278 and trip interface region 146C are positioned so that circuit breaker 10 can effectively and conveniently interface with an external accessory device in DIN rail installation situations.

Circuit breaker 10 also enables convenient adaptation thereof for implementation of a walking beam wherein the closing of the contacts of one circuit breaker can be more precisely synchronized with the opening of the contacts of another. Circuit breaker 10 can conveniently serve as either the initially "ON" breaker or the initially "OFF" breaker of the walking beam setup.

Figure 34:
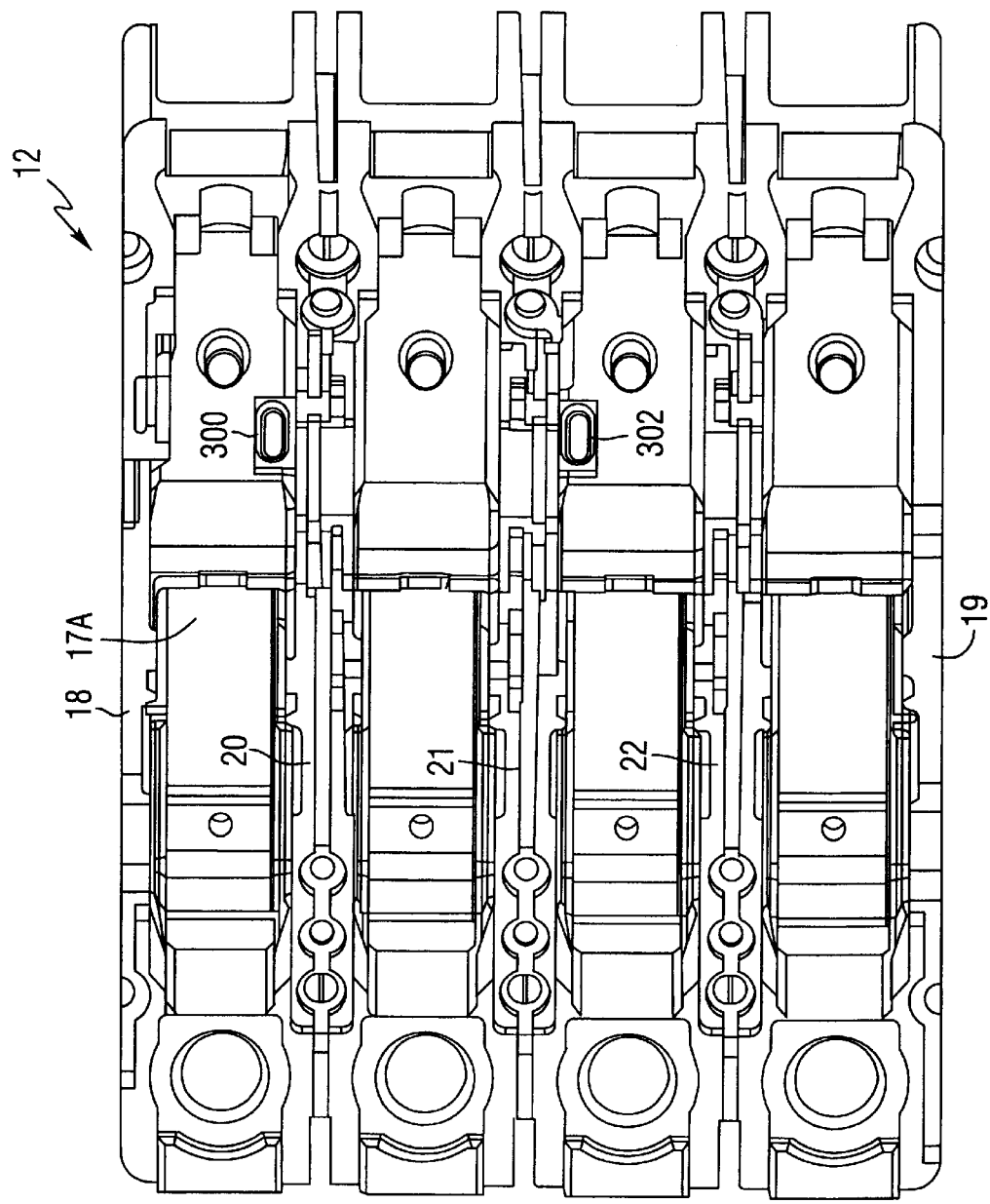
FIG. 34 is an orthogonal view of the internal portions of the base of the circuit interrupter of FIG. 1.
Figure 35:
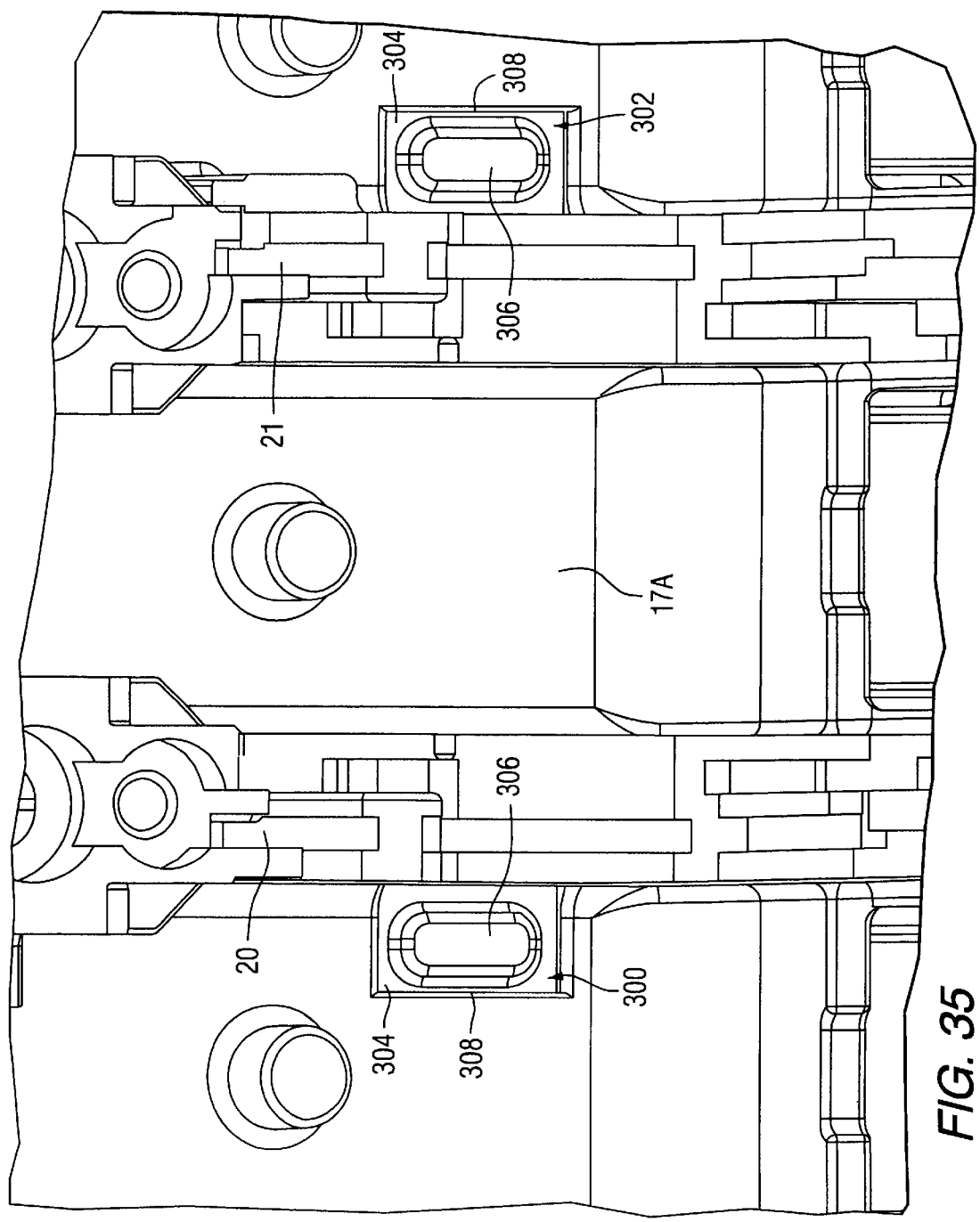
FIG. 35 is an orthogonal view of break-away regions of the circuit interrupter of FIG. 1.

Referring now to FIGS. 34 and 35, shown are overhead views of base 12 without internal components therein. Formed on the inner surface 17A of the bottom 17 of base 12 are break-away regions 300 and 302 that are adjacent to internal phase walls 20 and 21, respectively. As shown in FIG. 35, each of break-away regions 300 and 302 includes a recessed floor region 304 that is thinner than the rest of bottom 17. Raised portions 306, which provide a thickness to base 17 at that location that is approximately the same as those portions of bottom 17 surrounding break-away regions 300 and 302, are provided in the middle of each recessed floor region 304 and have sharp corners (to create stress areas). Each of break-away regions 300 and 302 also includes an elongated aperture 308 extending along one of its sides. In the exemplary embodiment, apertures 308 are very thin in width.

Figure 36:
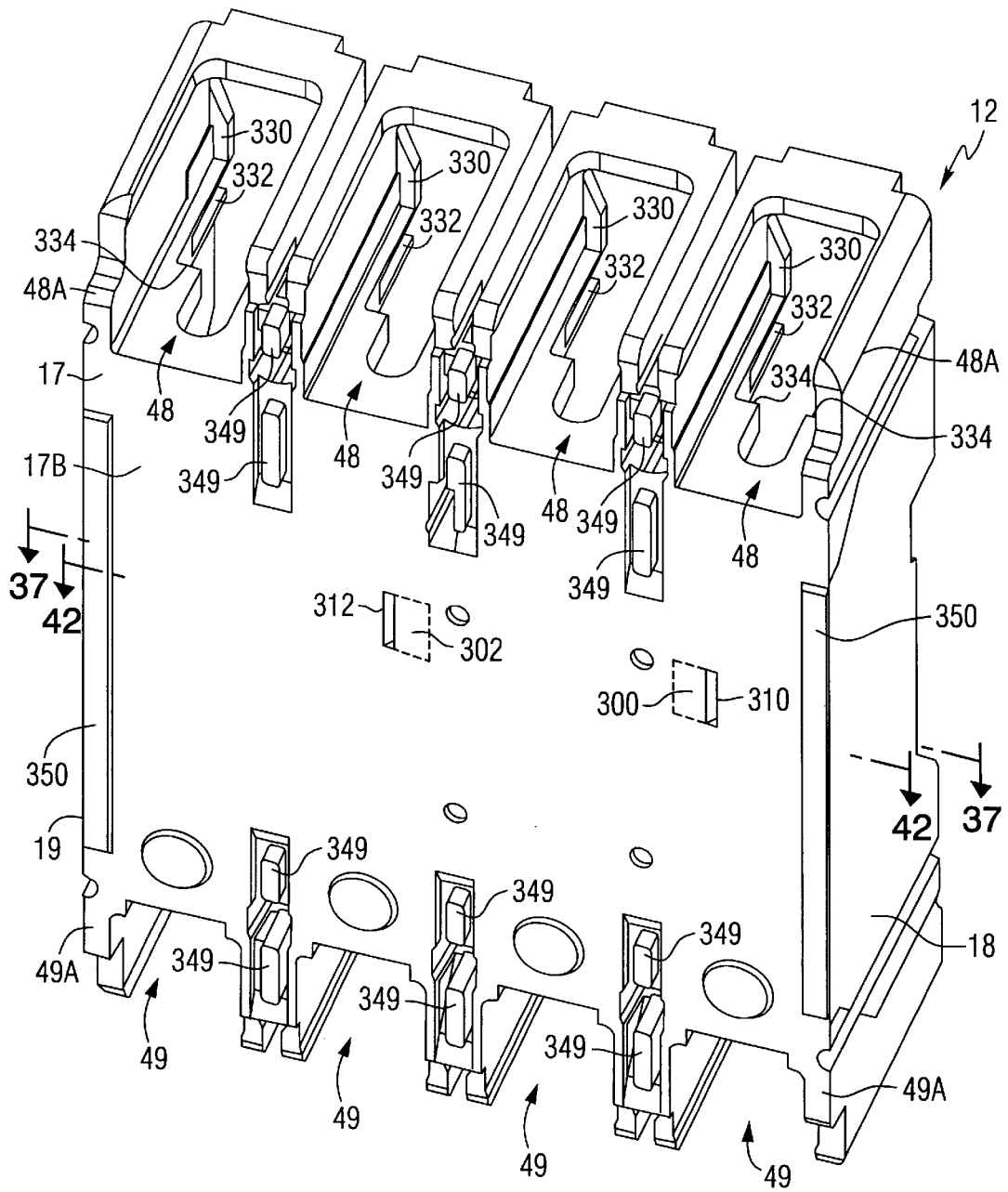
FIG. 36 is an orthogonal view of the underside of the base of the circuit interrupter of FIG. 1.
Figure 37:
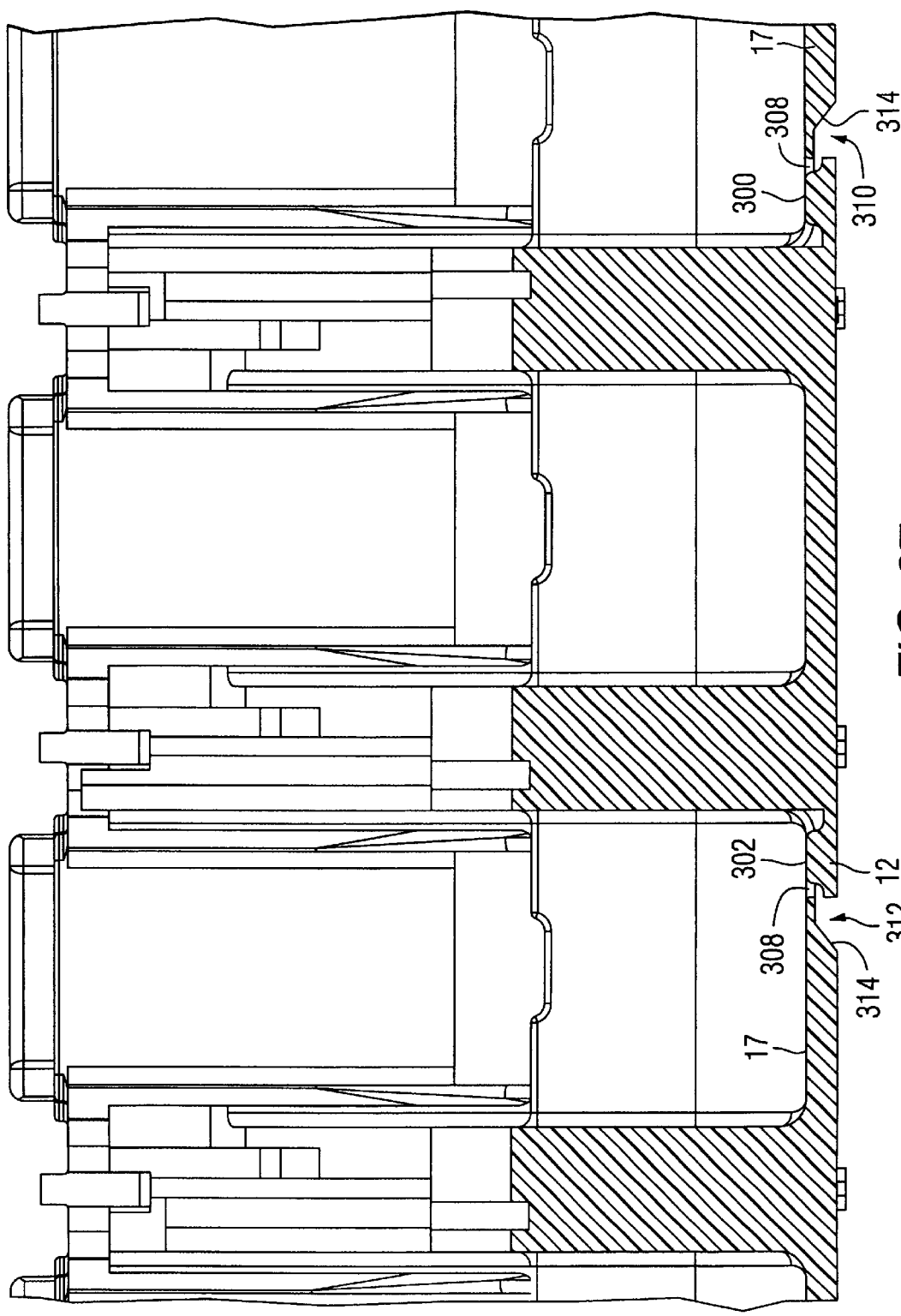
FIG. 37 is a cross-sectional view taken along the line 37—37 of FIG. 36 showing cutouts in the base.
Figure 38:
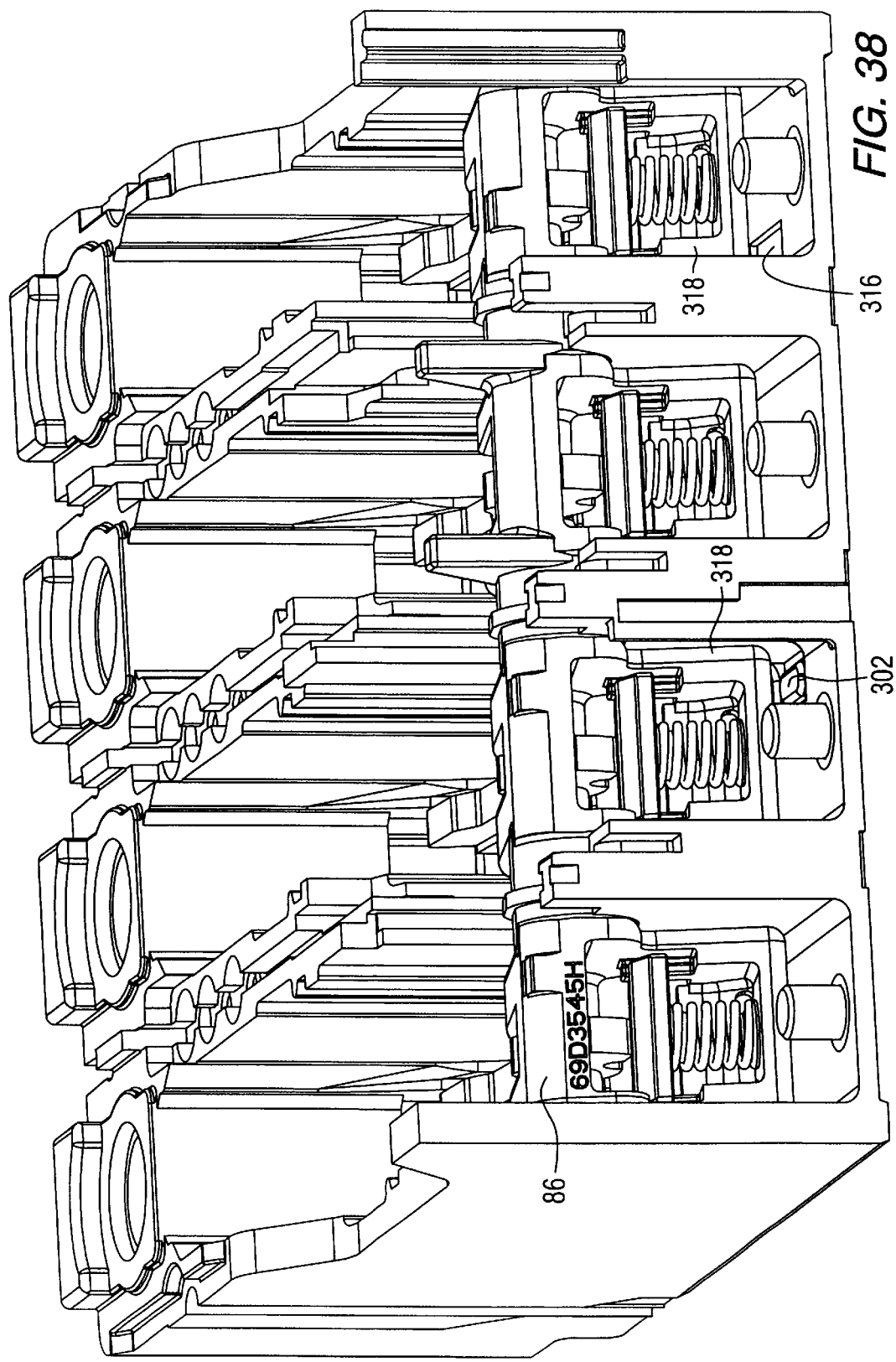
FIG. 38 is an orthogonal view of an internal portion of the circuit interrupter of FIG. 1 showing the positioning of the break-away regions of FIG. 35.

Referring also now to FIGS. 36–38, shown in FIG. 36 is the underside of base 12. Outer surface 17B of bottom 17 includes elongated cutouts 310 and 312 which, as described below, are positioned substantially adjacent to break-away regions 300 and 302, respectively. As shown in the cross-sectional view of FIG. 37 taken along the line 37—37 of FIG. 36, cutout 310 tapers inwards into bottom 17 until elongated aperture 308 of break-away region 300 is formed. Cutout 312 similarly tapers inwards into bottom 17 until elongated aperture 308 of break-away region 302 is formed. In the exemplary embodiment, each of cutouts 310 and 312 have a slanted tapering region 314 that is oppositely configured from that of the other. Each slanted tapering region 314 slants inwardly in the direction of its associated break-away region.

If a walking beam application is desired, a tool such as a screwdriver is inserted into one of cutouts 310 and 312. The choice of cutout depends on the positioning of circuit breaker 10 that is necessary in order to provide access for an end of the walking beam. In the case where, for example, break-away region 300 would provide the best access for the walking beam, the tool is inserted into cutout 310 and forced into aperture 308 wherein it is used to pry break-away region 300 away and outwardly from bottom 17 of base 12. This causes break-away region 300 to break or snap off, with the result as shown in FIG. 38. As shown, the breaking off of break-away region 300 creates an opening 316 in bottom 17 of base 12, with the size of opening 316 sufficient to allow an end of the walking beam to be inserted therethrough. Slanted tapering region 314 provides leverage for this prying process, and channels the tool in the proper direction whereby outward expulsion of break-away region 300 occurs. In the exemplary embodiment, break-away regions 300 and 302 are molded of the same thermoset material as the rest of base 12. Break-away regions 300 and 302 are molded sufficiently thin and with stress areas in order to facilitate this breakage without causing damage to other areas of base 12.

As shown in FIG. 38, where base 12 is partially cut away for the sake of illustration, break-away regions 300 (broken off in this view) and 302 are positioned adjacent to the bottom rear of crossbar assembly 86 in an assembled circuit breaker 10. Positioned as such, the opening provided by the breaking off of one of regions 300 and 302, for example opening 316, is correctly located for proper application of the walking beam whether circuit breaker 10 is the initially "ON" breaker or the initially "OFF" breaker of the walking beam setup. If circuit breaker 10 is the initially "OFF" breaker of the walking beam setup, then the end of the walking beam is vertically inserted into opening 316 when circuit breaker 10 is in the OFF disposition as shown in FIG. 6. This insertion causes the end of the walking beam to abut the back 318 (see FIG. 10) of one of the cam housings 88 of crossbar assembly 86. This abutment prevents crossbar assembly 86, in its rotated disposition as shown in FIG. 6, from rotating counter-clockwise and closing contacts 80 and 84, even when a closing operation of handle 40 is subsequently performed. The initiation of such a closing operation, though, will put the rest of operating mechanism 62 in the ON disposition whereby circuit breaker 10 is desirably on the brink of such contact closing. Thereafter, if the walking beam is removed (normally by operation of the other initially "ON" circuit interrupter of the walking beam setup), crossbar assembly 86 will quickly rotate counter-clockwise and close contacts 80 and 84. The quick closing afforded in this situation enables the closing of the contacts of circuit breaker 10 to be more closely synchronized with the opening of the contacts of the initially "ON" circuit interrupter forming the other half of the walking beam setup.

If circuit breaker 10 is the initially "ON" circuit breaker of the walking beam setup, then crossbar assembly 86 is in its ON disposition and rotated as shown in FIG. 7, with the bottom 88A (FIG. 10) of one of cam housings 88 preventing the insertion of an end of the walking beam into opening 316. However, when contacts 80 and 84 of this initially "ON" circuit breaker are opened due to either an opening operation of handle 40 or a TRIPPING operation, then crossbar assembly 86 rotates clockwise and enables the end of the walking beam to be inserted into opening 316 and to abut the back 318 (see FIG. 10) of the particular cam housing 88 of crossbar assembly 86 (as described above). As known to one of skill in the art, this insertion of the walking beam into the initially "ON" circuit breaker of the walking beam setup causes the other end of the walking beam to be removed from the opening in the other initially "OFF" circuit breaker of the setup, thereby quickly closing the contacts of the initially "OFF" circuit breaker as described above.

Now referring again to FIG. 36, shown are load conductor openings or cavities 48 formed in molded base 12. Each cavity 48 includes a pair of locking surfaces or abutment walls 330, each one of the pair located on the opposite side of the cavity 48 from the other (only one, or the left, abutment wall 330 is viewable in FIG. 36). Also shown in FIG. 36 are grooves or channels 332 into which the sides of load terminals 50 are inserted in an assembled circuit breaker 10, with the bottom connector portion 260 (FIG. 23B) of each load terminal 50 seated on ledges 334 formed in base 12 for each cavity 48.

Figure 39:
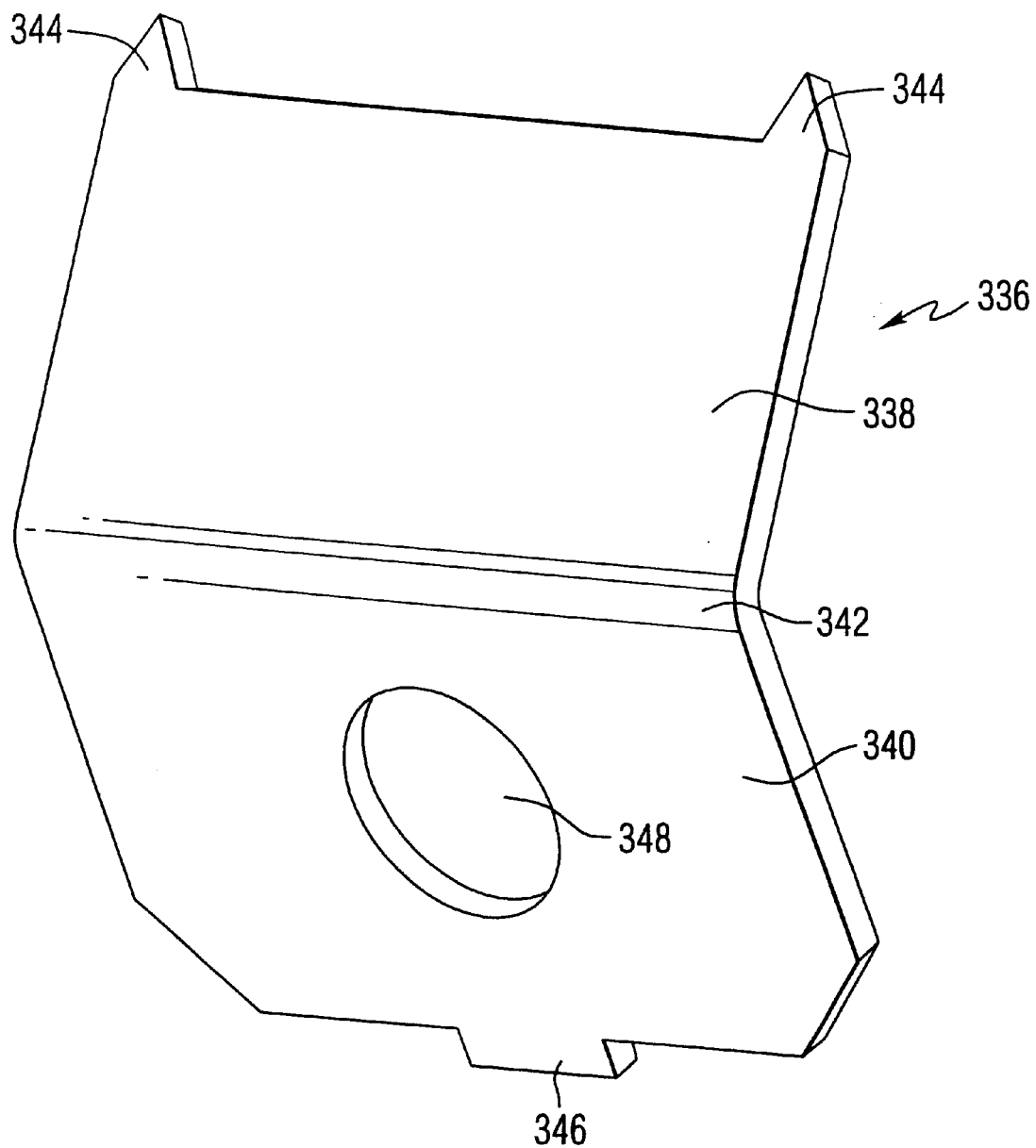
FIG. 39 is an orthogonal view of a locking plate of the circuit interrupter of FIG. 1.
Figure 40:
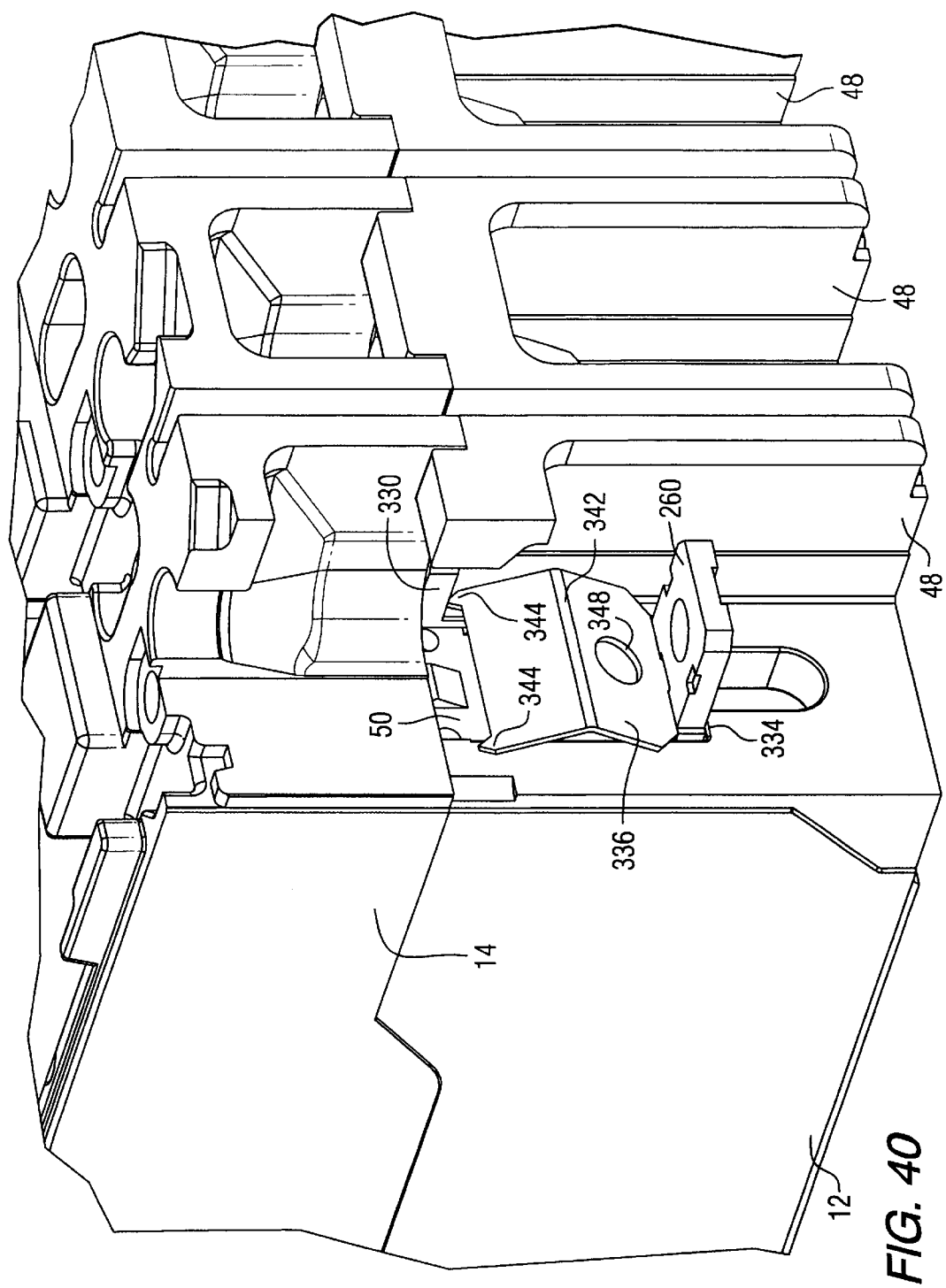
FIG. 40 is an orthogonal, partially broken away view of the locking plate in connection with the base and primary cover of the circuit interrupter of FIG. 1.
Figure 41:
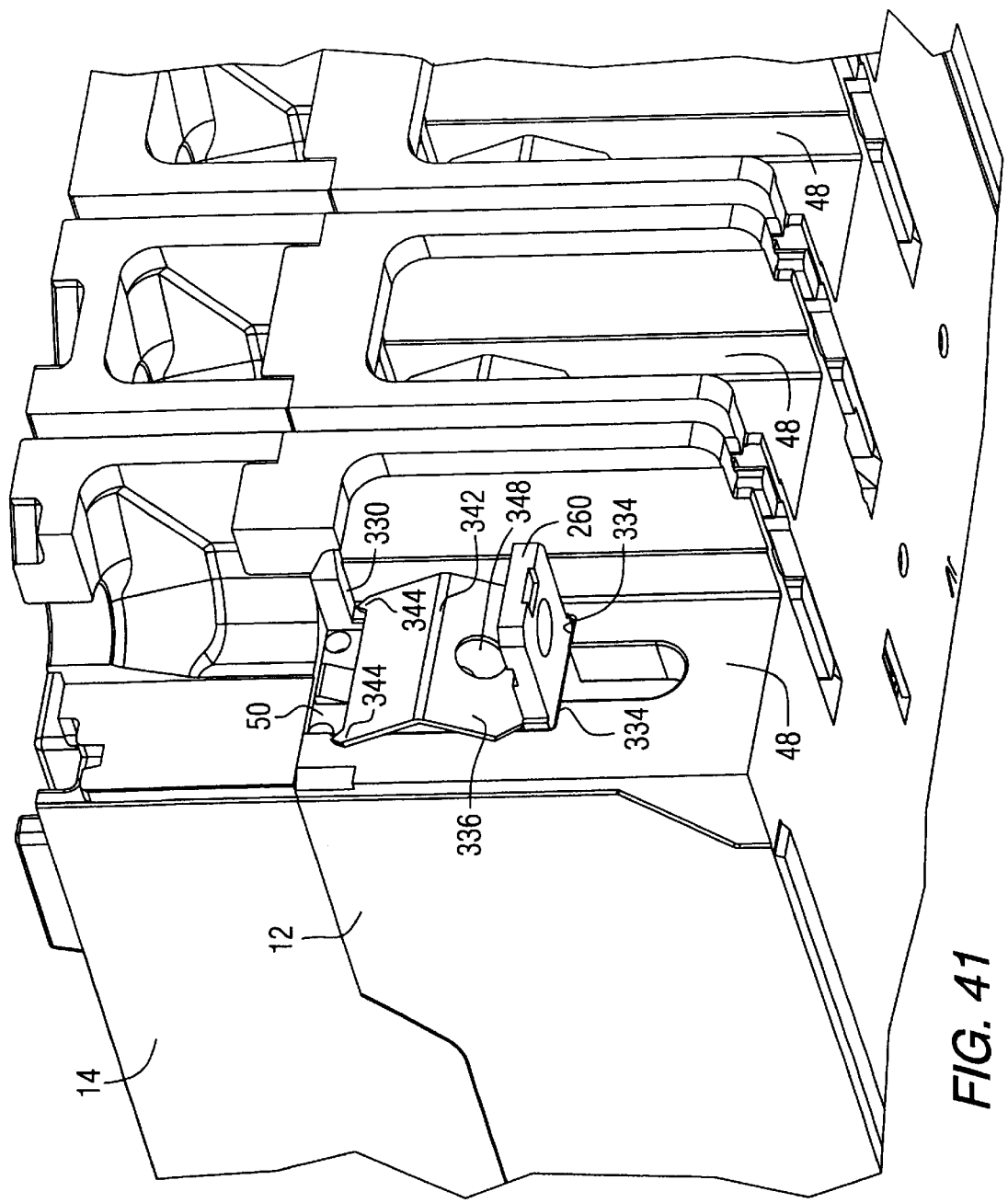
FIG. 41 is an orthogonal, partially broken away view similar to FIG. 40.

Referring also now to FIGS. 39–41, shown in FIG. 39 is a load terminal locking plate or clip 336. Plate 336 includes an upper region 338 connected to a lower region 340 by way of a bent or curved region 342. Upper region 338 includes two pointed regions 344 positioned on opposite sides thereof. Lower region 340 includes an insertion region or tab 346 centered on the bottom thereof, and an opening 348. Locking plate 336 is made of steel in the exemplary embodiment. A locking plate 336 is used to hold a load terminal 50 within base 12, as described below.

Load Terminal Locking Plate & Clip

In FIGS. 40 and 41, wherein portions of base 12 and primary cover 14 have been partially broken away, the implementation of a locking plate 336 in circuit breaker 10 can be seen. A load terminal 50 is shown inserted into base 12 as described above. A locking plate 336 is shown with its insertion tab 346 inserted into and engaging cutout 261 (FIG. 23B) of connector portion 260 of load terminal 50. Pointed regions 344 are shown located beneath and in close proximity to abutment walls 330 (only one, or the right, abutment wall 330 of the cavity 48 is shown in the cut-away view). With locking plate 336 in this position, bent region 342 can then be pushed inwards, causing plate 336 to substantially straighten thereby causing pointed regions 344 to pierce and engage abutment walls 330. The resulting interconnection of locking plate 336 with base 12 (via pointed regions 344) and with terminal 50 (via insertion tab 346) conveniently and effectively holds or locks load terminal 50 within channels 334 of base 12. Locking plate 336 also serves to help shield terminal 50 from the external environment.

Locking plates 336 can be conveniently inserted into load conductor cavities 48 in order to be positioned as shown in FIGS. 40 and 41. This insertion can be achieved even when circuit breaker 10 is in assembled form with primary cover 14 and secondary cover 16 positioned atop base 12. In order to remove a locking plate 336 if so desired, a hook or other tool can be inserted into cavity 48 and into opening 348 of plate 336. After the tool is worked behind plate 336 and a sufficient engagement is made, the tool can be pulled outwards whereby pointed regions 344 become disengaged from abutment walls 330. Locking plate 336 can then be easily removed from cavity 48. Opening 348 may also be used to screw or otherwise secure locking plate 336 to load terminal 50.

Housing Support Walls & Controlling Arc Cases

Figure 42:
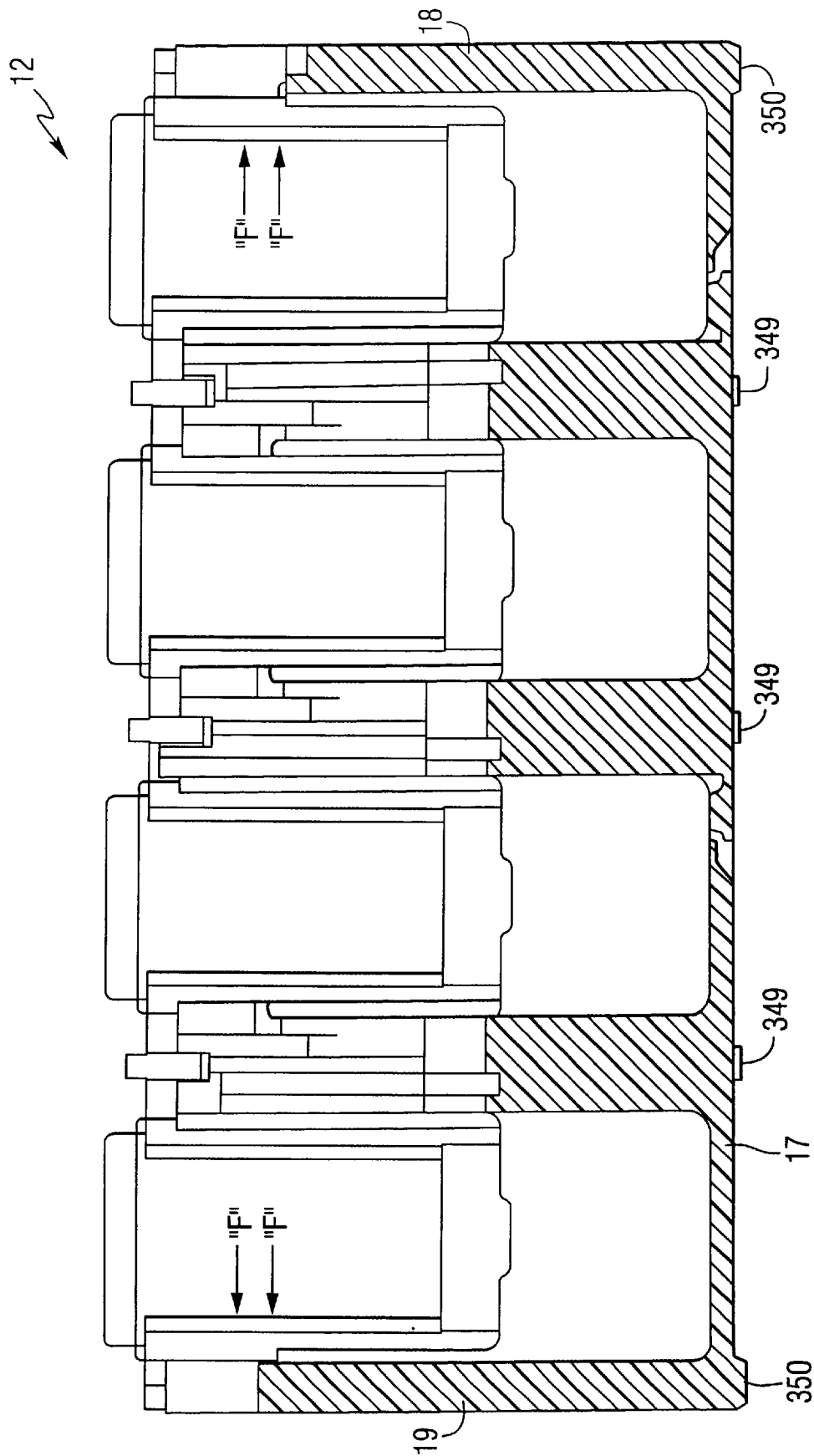
FIG. 42 is a cross-sectional view taken along the line 42—42 of FIG. 36 showing support members of the circuit interrupter of FIG. 1.

Referring again to FIG. 36, and also now to FIG. 42 (which is a side cross-sectional view taken along the line 42—42 of FIG. 36), base 12 is shown as including feet or seating members 349 that are formed on the outer surface 17B of bottom 17. Seating members 349 advantageously provide precise areas of contact for base 12 for appropriate and stable mounting of circuit interrupter 10. Bottom 17 of base 12 is also shown as including support members or ribs 350 that extend along and beneath outer sidewalls 18 and 19. In the exemplary embodiment, support members 350 are integrally formed in molded base 12 of the same molded material, and are approximately the same height as seating members 349.

When interruption of high electrical currents occurs, hot gases are formed that can exert significant pressure on the housing of circuit interrupter 12. In particular, such pressure can exert significant outward forces on sidewalls 18 and 29 of molded base 12, as shown with the arrows labeled "F" in FIG. 42. These outward forces also have a tendency to put downward pressure on those portions of sidewalls 18 and 19 that connect with bottom 17 of base 12 (the bottom "corners" areas shown in FIG. 42). Substantially in contact with the mounting surface of circuit interrupter 10, support members 350 provide underneath support for sidewalls 18 and 19, thereby substantially preventing the bottom "corner" areas from being unduly stressed and bent by the aforementioned forces. This prevents cracking in those areas that could cause structural failure of base 12.

As shown in the exemplary embodiment, support members 350 do not extend underneath outer walls 48A of load conductor cavities 48 or outer walls 49A of line conductor cavities 49, and do not extend underneath those portions of sidewalls 18 and 19 that are immediately adjacent to outer walls 48A and 49A. As such, an air gap exists between the bottom of those areas and the mounting surface of circuit interrupter 10. These air gaps advantageously provide increased electrical insulation in those areas.

Figure 43A:
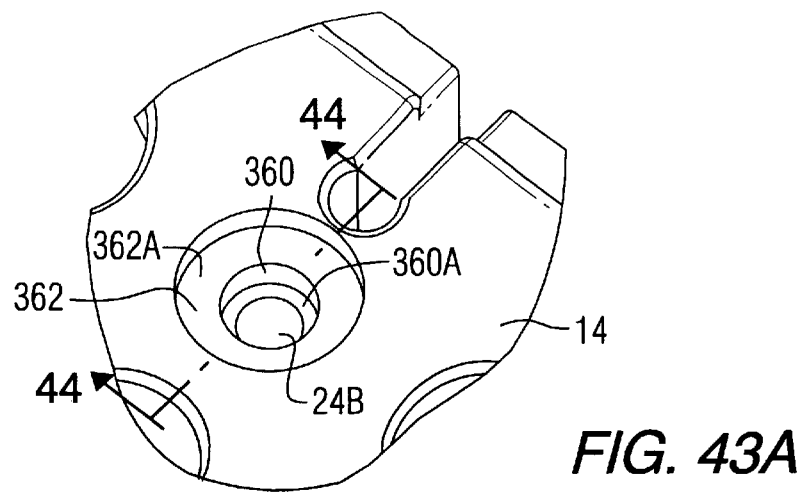
FIG. 43A is an orthogonal, partially broken away view of a hole and recessed regions in the primary cover of the circuit interrupter of FIG. 1.

Referring again now to FIG. 2, secondary cover 16 includes holes 24A for accepting screws or other attaching devices that enter corresponding holes 24B in primary cover 14 for fastening secondary cover 16 to primary cover 14, as described above. Referring now also to FIGS. 43A, 43B, 43C, 44A, and 44B, shown in FIG. 43A is an overhead and enlarged view of one of holes 24B in primary cover 14. As can also be seen in the cross-sectional views of FIGS. 44A and 44B taken along the line 44—44 of FIG. 43A, hole 24B is formed in a circular recess 360 having a bottom surface 360A. Recess 360, in turn, is formed in a larger circular recess 362 having a bottom surface 362A.

Retaining Device & Mounting

Figure 43B:
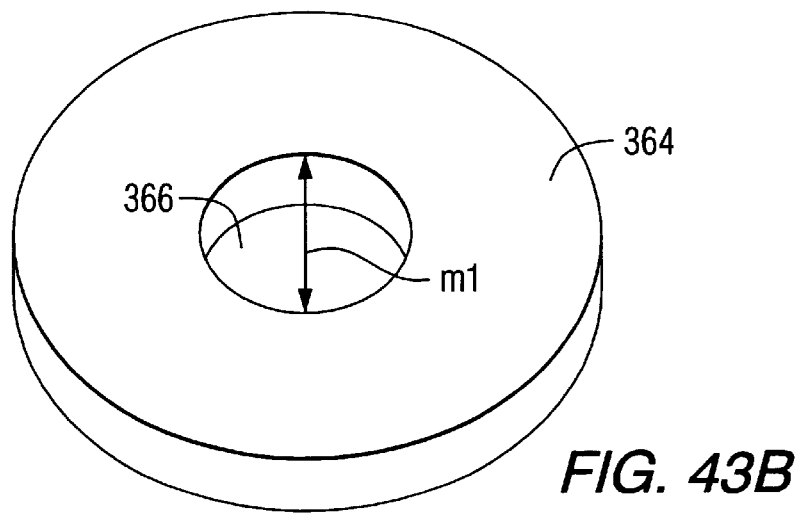
FIG. 43B is an orthogonal view of a retaining device of the circuit interrupter of FIG. 1.
Figure 43C:
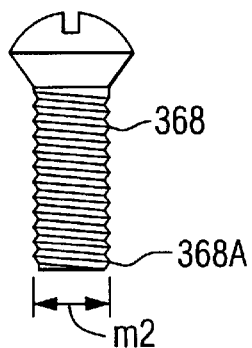
FIG. 43C is a side elevational view of a secondary cover mounting screw of the circuit interrupter of FIG. 1.

FIG. 43B shows a retaining device or washer 364 having an opening 366 with a diameter m1. Diameter m1 is selected to be smaller than the diameter m2 of the threads of a secondary cover mounting screw 368 (FIG. 43C), and yet still enable screw 368 to be threaded therethrough. Diameter m2 of screw 368 is larger than the diameter of hole 24B (to provide for threading action therein) but, in the exemplary embodiment, is smaller than the diameter of hole 24A in secondary cover 16 (to not provide for threading action therein). In the exemplary embodiment, screw 368 does not have any non-threaded portions. During the assembly process when secondary cover 16 is fastened to primary cover 14, washer 364 is rotated onto the threads of screw 368 after screw 368 has been inserted through one of holes 24A in secondary cover 16. Screw 368 is then completely threaded into hole 24B, as shown in FIG. 44A. In this disposition, washer 364 is positioned within circular recess 362 and abuts against the bottom surface 370 of secondary cover 16.

When secondary cover 16 is to be subsequently removed from primary cover 14, screw 368 is threaded out of hole 24B. As this occurs, the upward force generated by the threading out" interaction between screw 368 and hole 24B propels screw 368 upward. As screw 368 is moved upward, washer 364 abuts against bottom surface 370 of secondary cover 16, causing washer 364 to be threaded downward on screw 368. However, when screw 368 is completed unthreaded from hole 24B such that its bottom 368A enters smaller circular recess 360, as shown in FIG. 44B, then the upward "threading out" force acting on screw 368 ceases (screw 368 does not unthread through hole 24A in secondary cover 16). At this point, further normal turning of screw 368 will cause screw 368 and washer 364 to just spin, with washer 364 remaining a particular distance away from the bottom 368A of screw 368. This distance is largely determined by the height of smaller recess 360. When all secondary cover mounting screws 368 are unthreaded from their associated holes 24B, secondary cover 16 can then be separated from primary cover 14, with screw 368 effectively and conveniently retained through hole 24A of secondary cover 16 by the abutment between washer 364 and bottom surface 370 of cover 16. In order to be removed, screw 368 must be pulled upwards and rotated in order to cause washer 364 to thread off. In the exemplary embodiment wherein washer 364 is made of nylon, vulcanized fiber material, or rubber, the snug fit engagement between screw 368 and washer 364 can also be terminated by simply forcibly pulling screw 368 through hole 24A.

Although the screw retainment structure is described above with respect to one screw 368 and one hole 24B in primary cover 14, it is preferably implemented with respect to all secondary cover mounting screws 368 and their associated holes 24B. In an embodiment wherein washer 364 is made of nylon, washer 364 has a thickness of approximately 0.032 inches.

Figure 45:
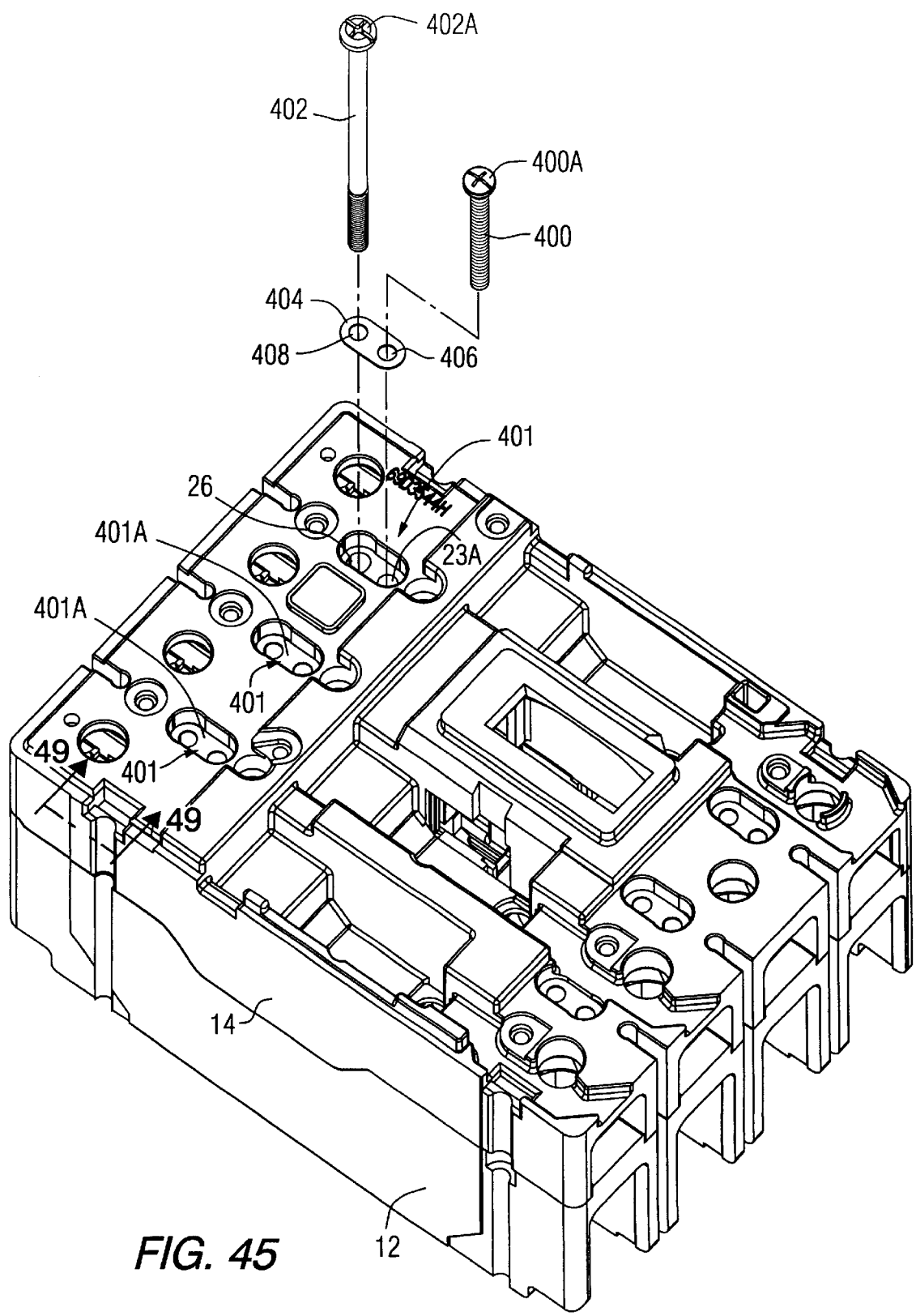
FIG. 45 is an exploded orthogonal view of the base and primary cover of the circuit interrupter of FIG. 1 along with a screw retainment plate.
Figure 46:
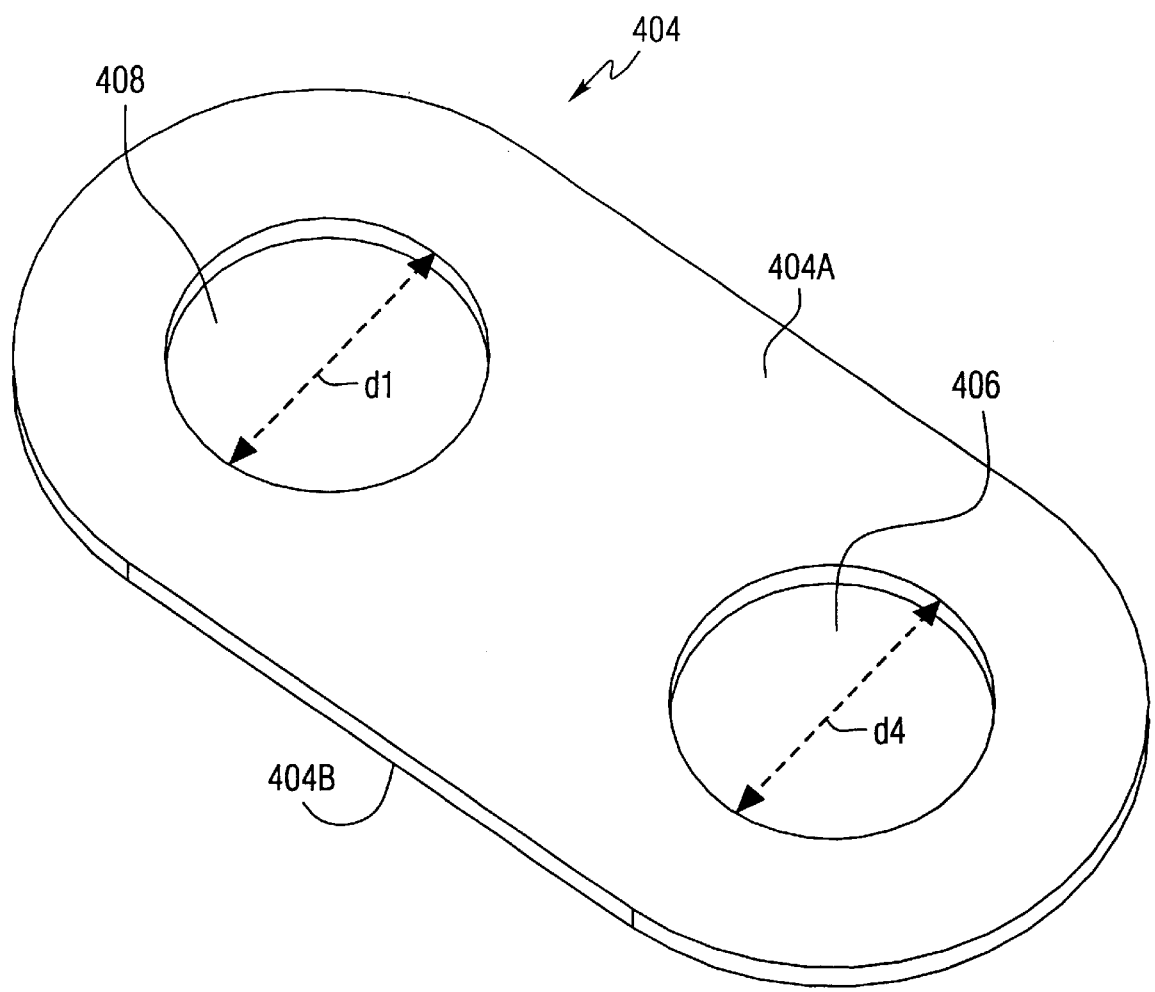
FIG. 46 is an orthogonal view of the screw retainment plate.
Figure 47:
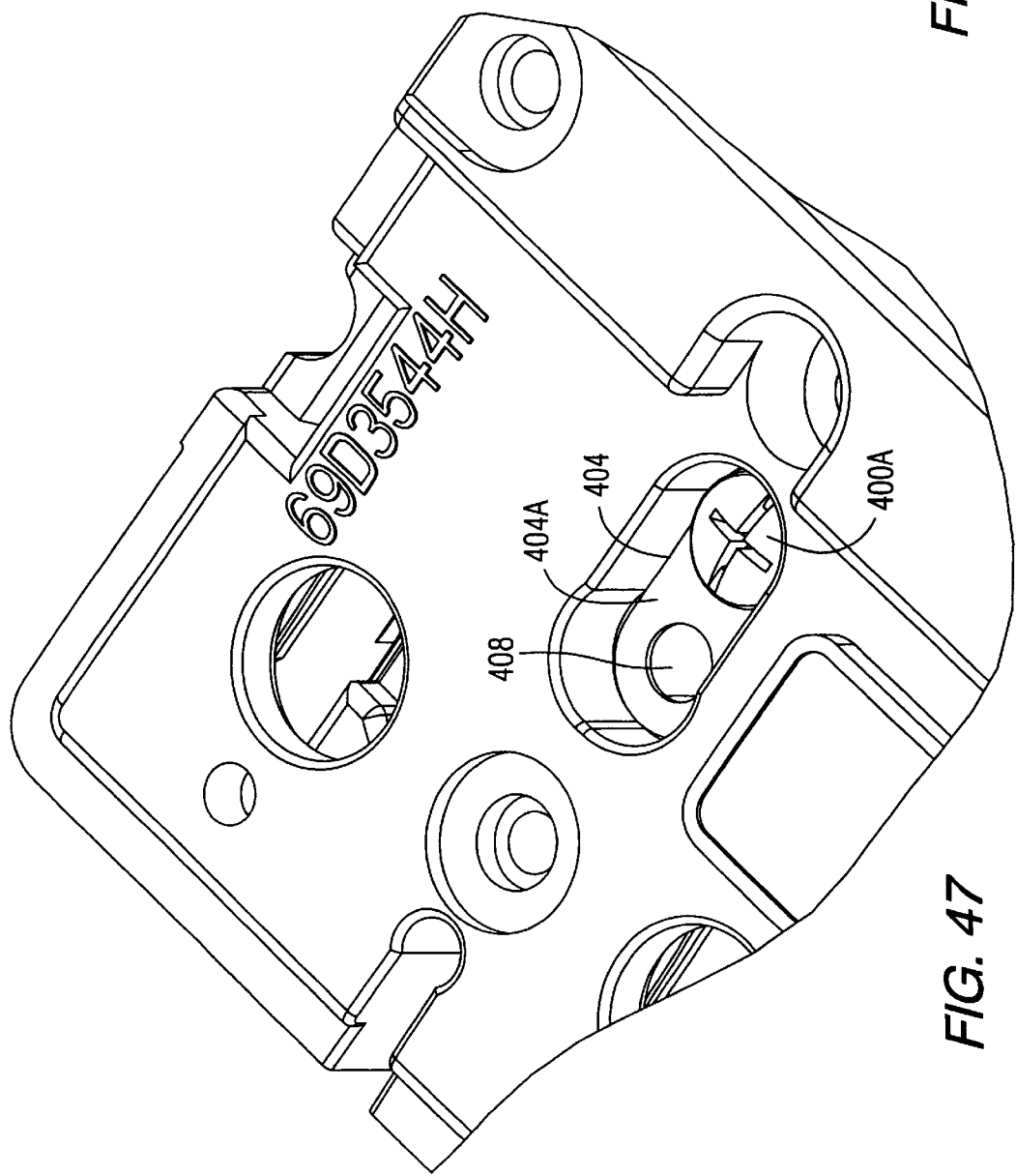
FIG. 47 is an orthogonal, partially broken away view of the screw retainment plate positioned within a recessed region of the primary cover of the circuit interrupter of FIG. 1.

Referring now to FIGS. 45–47, shown in FIG. 45 is base 12 with primary cover 14 positioned on top. Within recessed regions 401 of primary cover 14 are holes 23A for receiving a screw such as screw 400 for fastening primary cover 14 to base 12. Also within recessed regions 401 are holes 26, which extend through primary cover 14 and base 12. Holes 26 correspond to holes 26A of secondary cover 16 (see FIG. 2), and are for receiving a mounting screw such as screw 402 for mounting the entire circuit breaker 10 to a wall or DIN rail back panel or the like. In the exemplary embodiment, head 402A of mounting screw 402 has a diameter that is smaller than the diameter of holes 26A of secondary cover 16, but larger than the diameter of holes 26 within primary cover 14.

Also shown in FIG. 45 is a screw retainment plate 404 that may be conveniently implemented within one or more recessed regions 401. As best seen in FIG. 46, screw retainment plate 404 includes a first opening 406 and a second opening 408, with second opening 408 having a diameter d1. Screw retainment plate 404 is inserted into recessed region 401 whereby the bottom surface 404B is in contact with surface 401A and openings 406 and 408 are positioned above holes 23A and 26, respectively, of primary cover 14. When screw 400 is used to fasten primary cover 14 to base 12, screw 400 is threaded into opening 406 and into hole 23A of primary cover 14, with head 400A of screw 400 abutted against top surface 404A of plate 404, as shown in FIG. 47. This abutment secures plate 404 within recessed region 401.

Figure 48:
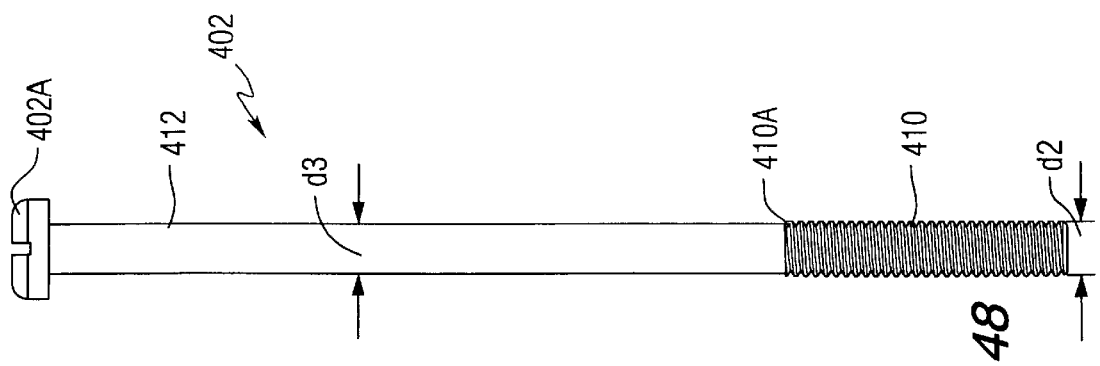
FIG. 48 is a side elevational view of a mounting screw of the circuit interrupter of FIG. 1.

Referring now also to FIG. 48, shown is mounting screw 402 of the exemplary embodiment. Screw 402 includes a threaded portion 410, and a non-threaded portion 412. Threaded portion 410 has a diameter d2, and non-threaded portion 412 has a diameter d3. For purposes discussed below, diameter d2 of threaded portion 410 is selected to be larger than diameter d1 of opening 408 and yet still enable portion 410 to be threaded through opening 408. Diameter d3 of non-threaded portion 412 is selected to be smaller than diameter d1 of opening 408. The diameter of hole 26 is selected to be greater than each of diameters d2 and d3.

Figure 49:
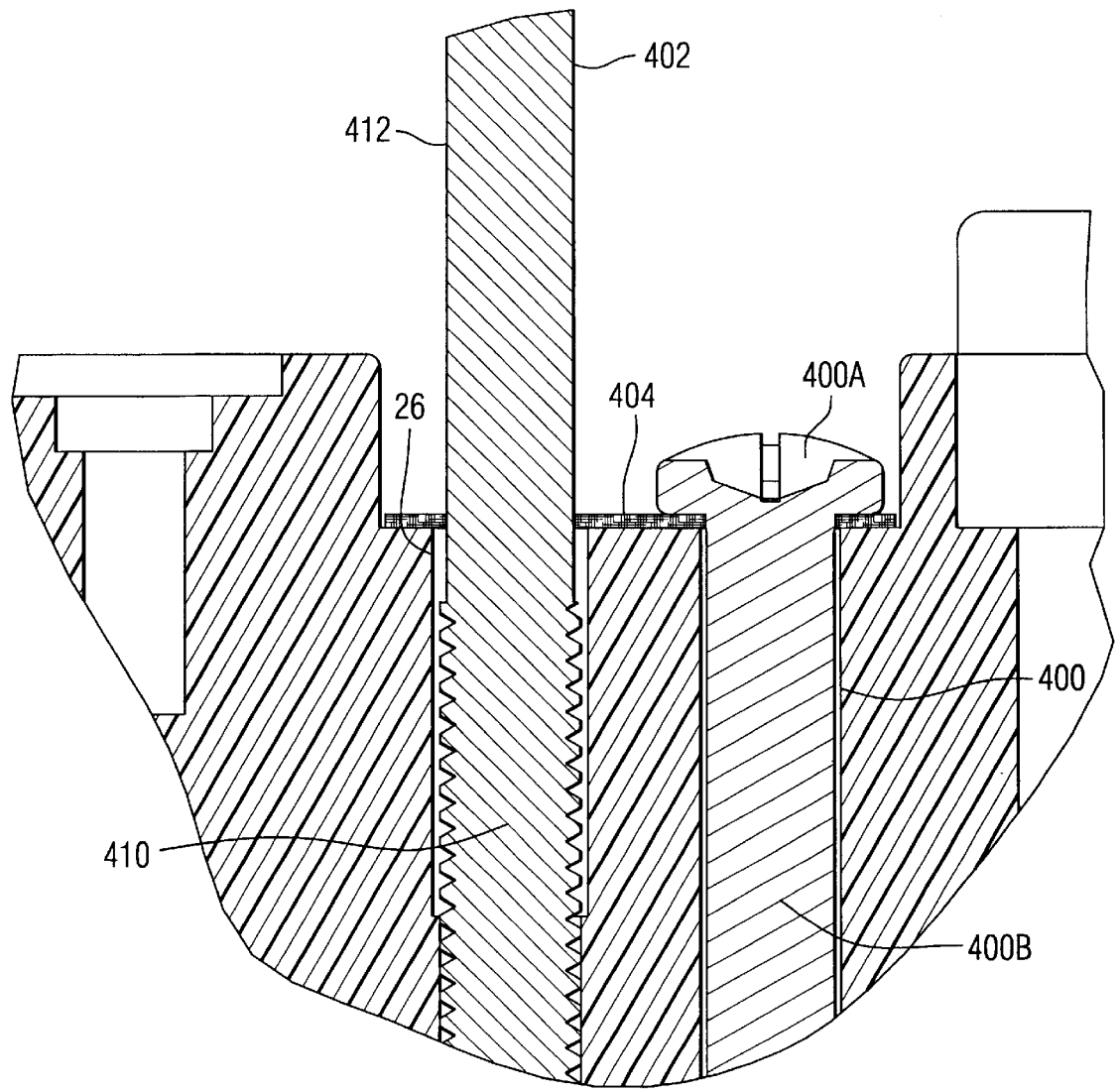
FIG. 49 is a cross-sectional, partially broken away view taken along the line 49—49 of FIG. 45 showing the screw retainment plate and the mounting screw of the circuit interrupter of FIG. 1.

Referring now also to FIG. 49, shown is a side cross-sectional and partially cut-away view taken along the lines 4949 of FIG. 45. When mounting circuit breaker 10 to a surface, mounting screw 402 is inserted into opening 408 of plate 404. Threaded portion 410 of screw 402 (with a diameter d2 that is larger than diameter d1 of opening 408) is threaded completely through opening 408, after which screw 402 easily slides downward through hole 26 until its bottom reaches the mounting surface. A tool such as a screwdriver is then used to rotate screw 402 until head 402A abuts surface 404A of plate 404, whereby threaded portion 410 is threaded into the mounting surface.

Plate 404 advantageously provides for convenient, cost-efficient, and effective retainment of a mounting screw 402 within circuit breaker 10 when the breaker is not mounted to a surface. Such retainment is particularly desirable during shipment of circuit breaker 10 to a customer so that mounting screws 402 can be positioned in their appropriate holes and yet cannot be lost. When screw 402 is in the above-described disposition where threaded portion 410 has been threaded through opening 408, it cannot fall out of circuit breaker 10. In particular, upwards vertical movement of screw 402 is prevented by the abutment of the top 410A (FIG. 48) of threaded portion 410 against the bottom surface 404B of plate 404, as shown in FIG. 49. Downward vertical movement of screw 402 is, of course, prevented by abutment of head 402A (not shown in FIG. 49) with surface 404A of plate 404. In order to be removed, screw 402 must be rotated until threaded portion 410 is threaded upwards and out of opening 408.

Plates 404, and the retainment feature they provide, have the flexibility to be easily implemented within or easily removed from circuit breaker 10, depending on the circumstances. In the exemplary embodiment, retainment plate or device 404 is formed of bonded fibrous material such as vulcanized 30 fiber sheet, (sometimes referred to as "fish paper"), and is approximately 0.015 inches thick. Such material has good insulating properties, and is strong enough to maintain its shape even after having screws threaded in and out thereof. Also, in the exemplary embodiment, the diameter d4 of opening 406 of plate 404 is the same as diameter d1 of opening 408, and the diameter of threaded shaft portion 400B (FIG. 49) of screw 400 is the same as diameter d2 of threaded portion 410 of mounting screw 402.

Figure 50:
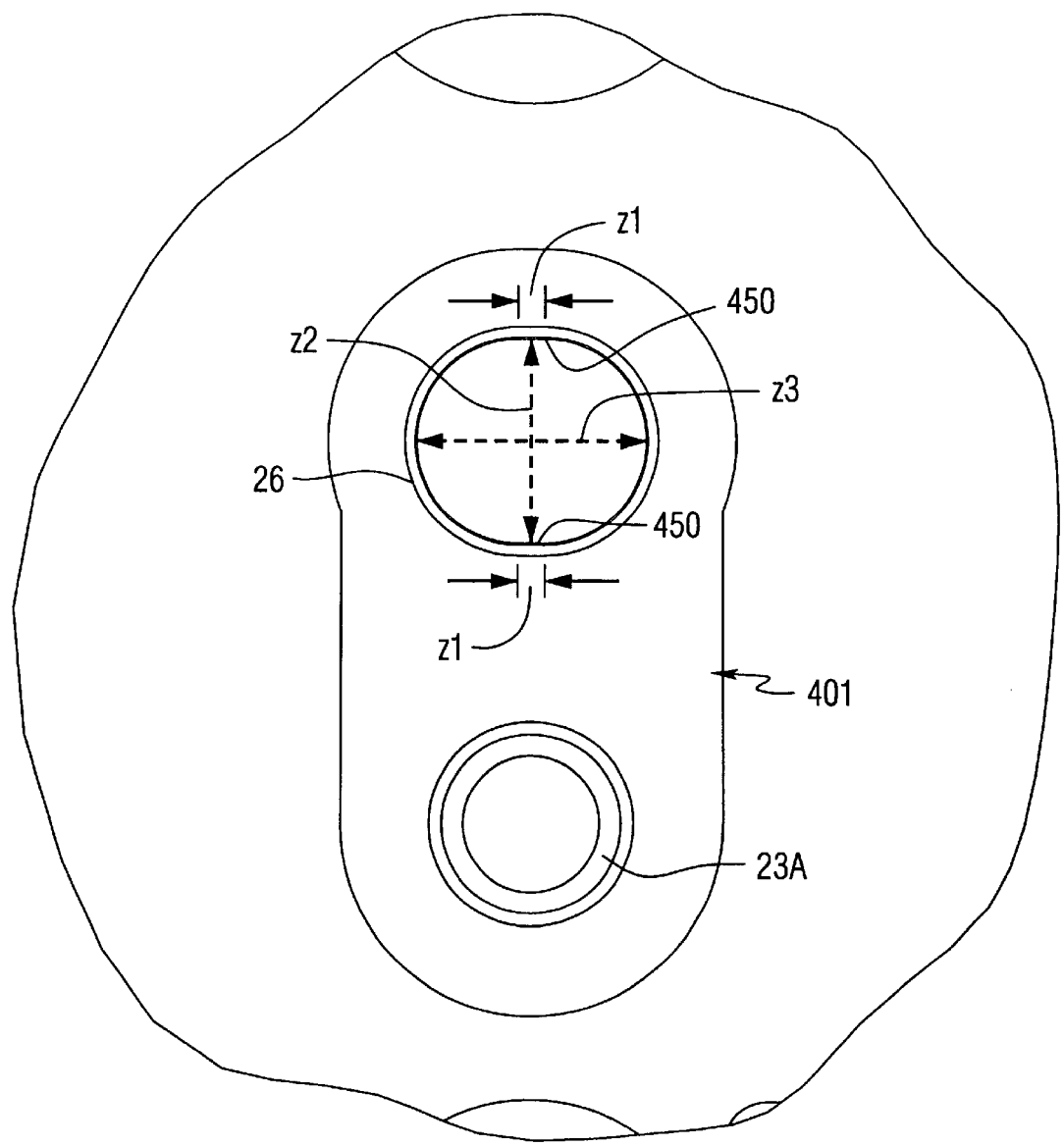
FIG. 50 is an overhead view of a recessed region of the primary cover of the circuit interrupter of FIG. 1.

Referring now to FIG. 50, shown is an overhead and enlarged view of one of recessed regions 401 of primary cover 14. As described above, hole 23A thereof is for receiving a screw for fastening primary cover 14 to base 12 (together with the other holes 23A). Hole 26, which extends through primary cover 14 and base 12, is for receiving a mounting screw, such as screw 402 shown in FIG. 48, for mounting the entire circuit breaker 10 to a mounting surface (together with the other holes 26). As shown in FIG. 50, each hole 26 is purposely made to not be perfectly round. In particular, hole 26 is elongated or stretched in the lateral direction, creating small flat or straight zones 450 with each having a length z1. This elongated shape of hole 26 extends through primary cover 14 and base 12. Configured as such, hole 26 can accommodate mounting screws 402 with different sized diameters. This flexibility is often useful, for example, when circuit breaker 10 may be used in either an environment where English measuring units are used, or in an environment where metric measuring units are used. In such a situation, an "English" mounting screw 402 may have a threaded portion 410 with a diameter d2 (see FIG. 48) that is either slightly larger or slightly smaller than the diameter d2 of the threaded portion 410 of a "metric" mounting screw 402. Hole 26 advantageously enables either such screw 402 to be effectively implemented.

The elongated distance z3 (FIG. 50) provided by flat zones 450 provides additional room for the larger sized diameter screw 402 to be inserted, with the distance z2 between flat zones 450 selected so that it just enables the larger screw to fit. As such, the larger sized diameter screw 402 would have virtually no vertical "play" between flat zones 450 (in the z2 direction), but would have some horizontal "play" (in the z3 direction) due to the elongated shape of hole 26 in that direction. The smaller sized diameter screw 402 can, of course, fit within hole 26 as well, and would have slightly more vertical "play" (although still minimal) and horizontal "play" than the larger sized diameter screw 402.

While beneficially and conveniently accommodating different sized diameter screws 402, hole 26 advantageously keeps vertical "play" of such screws to a minimum. The horizontal "play" afforded to both the larger and smaller sized diameter mounting screws 402 by holes 26 is advantageous in that conveniently enables screws 402 to be variably positioned whereby circuit breaker 10 can be mounted to surfaces having mounting surface hole spacings (in the horizontal or z3 direction) that differ. Again, this flexibility is often useful, for example, when circuit breaker 10 may be used in either an English measuring unit environment or a metric measuring unit environment.

In one embodiment, hole 26 is configured such that distance z2 is by approximately 0.168 inches, distance z3 is approximately 0.188 inches, and length z1 is approximately 0.020 inches. In this exemplary embodiment, a larger mounting screw 402 with a diameter d2 (FIG. 48) of approximately 0.164 inches can be effectively implemented, and a smaller mounting screw 402 with a diameter d2 of approximately 0.157 inches can be effectively implemented.

Figure 51:
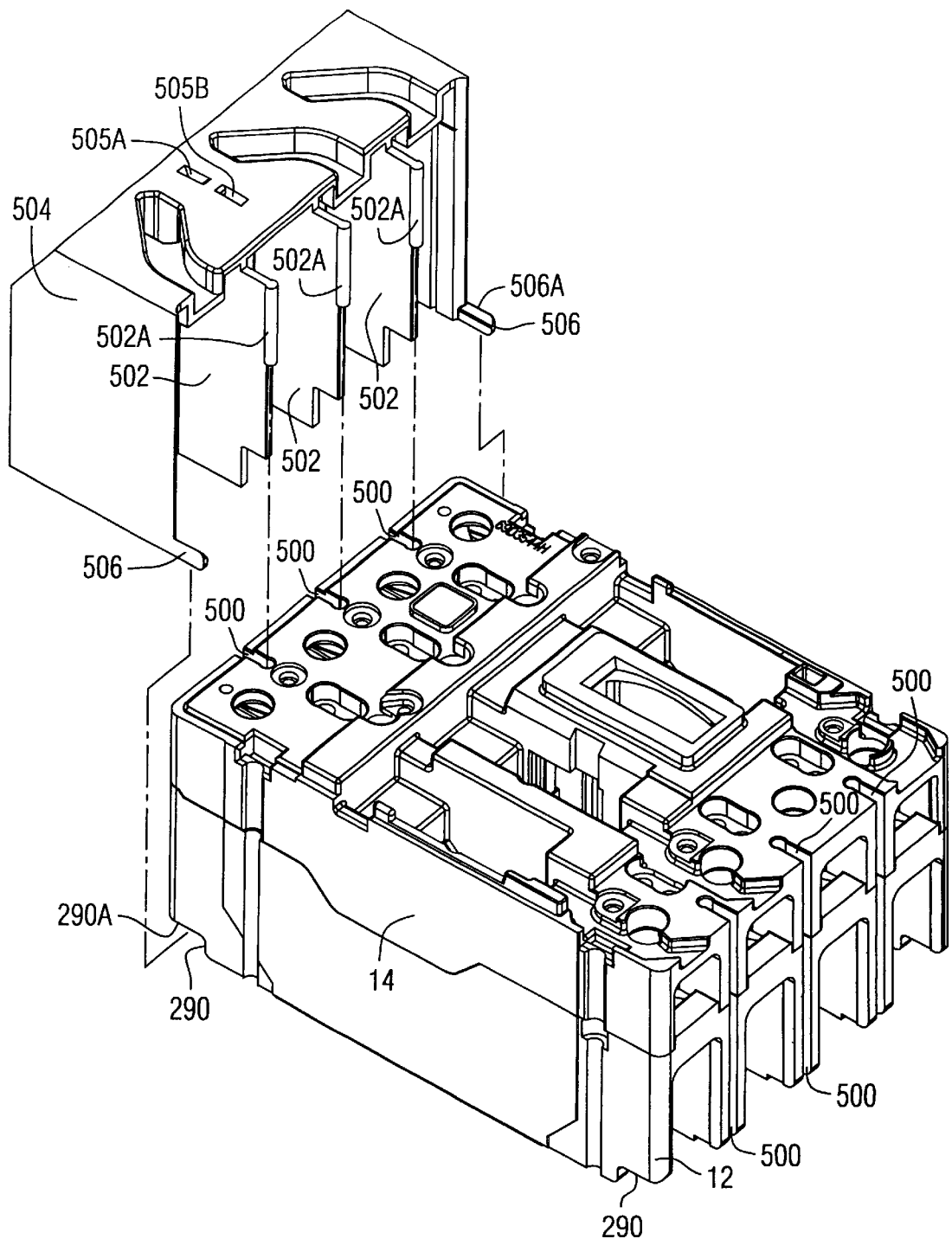
FIG. 51 is an exploded orthogonal view of a terminal shield and the base and primary cover of the circuit interrupter of FIG. 1.
Figure 52:
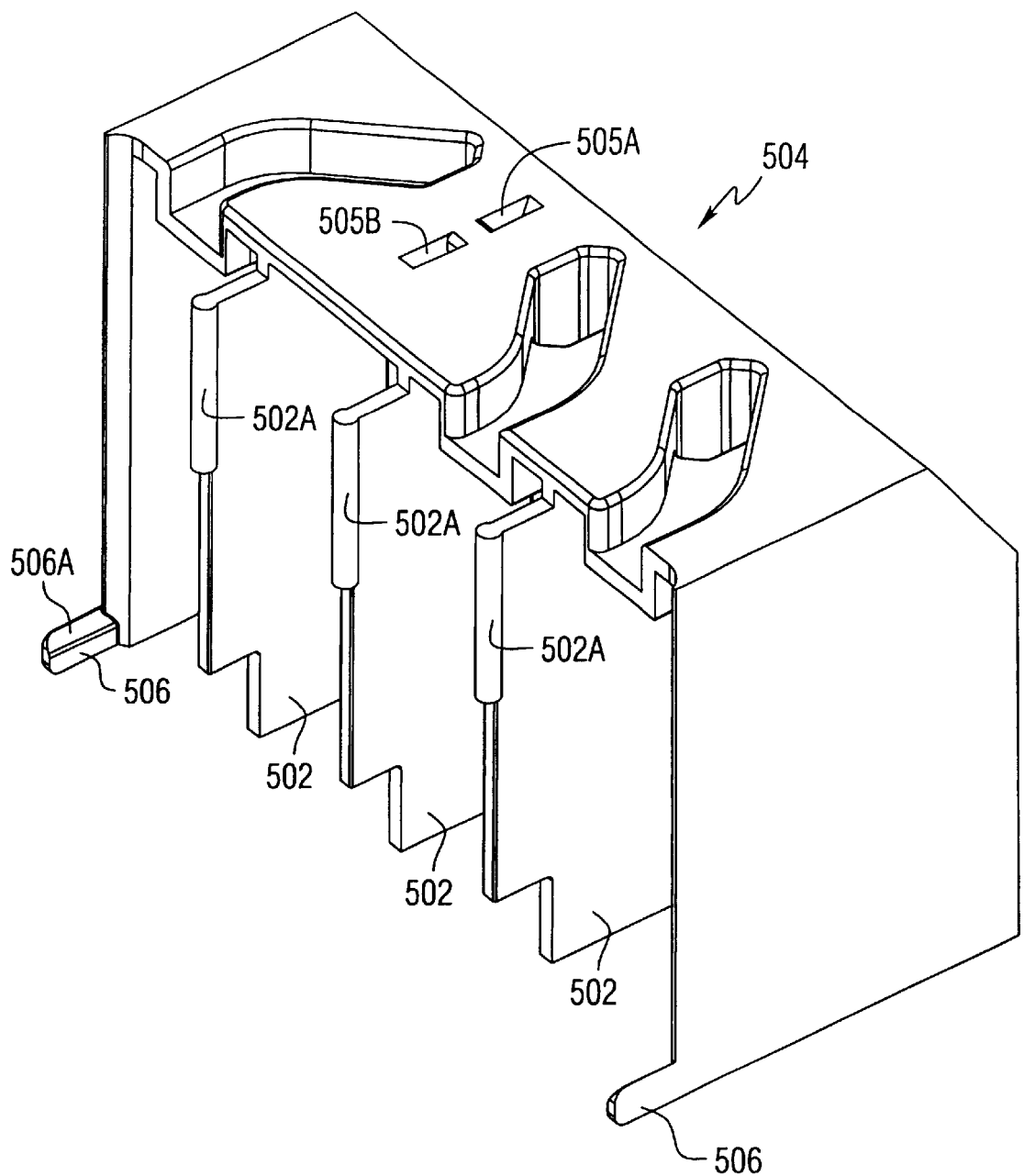
FIG. 52 is an orthogonal view of the terminal shield.
Figure 53:
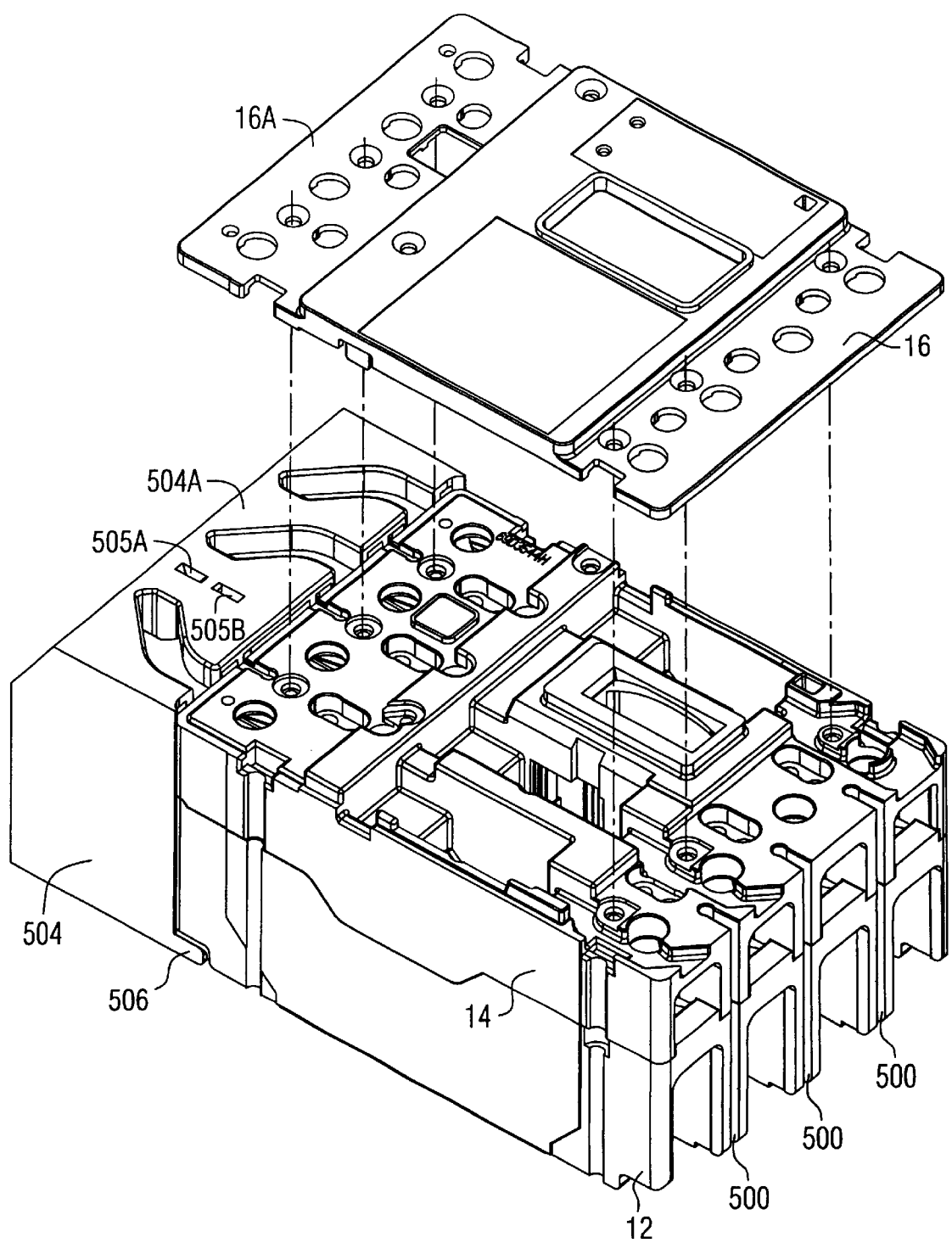
FIG. 53 is an partially exploded orthogonal view of the terminal shield, base, primary cover, and secondary cover of the circuit interrupter of FIG. 1.

Referring now to FIGS. 51–53, shown in FIG. 51 is base 12 with primary cover 14 positioned on top. On both the line terminal and load terminal ends of the base 12 and cover 14 combination are slots 500 that extend from the top of cover 14 to the bottom of base 12, as shown in FIG. 1. Engagement walls 502 of a terminal shield 504 may be vertically inserted into slots 500 until internal ledges within slots 500 abut stops 502A, resulting in a dovetailed engagement between shield 504 and slots 500 (FIG. 53). Such a shield 504 is conventionally used in order to provide increased protection to an operator of circuit breaker 10 from electrically active terminals, and can be implemented in connection with line terminals 52 and/or load terminals 50 (see FIG. 3). For ease of illustration, only one terminal shield 504 is shown in connection with the line terminal end of circuit breaker 10. Terminal shield 504 includes an aperture 505A and an aperture 505B for reasons discussed below.

Terminal Shield

As shown in FIGS. 52 and 53, terminal shield 504 also includes protection tabs or protrusions 506, each of which wings outwardly during the insertion of terminal shield 504 into slots 500 and which eventually substantially mates with a lower cutout or mounting area 290 (FIG. 51) on opposite sides of base 12. Protection tabs 506 substantially cover cutouts or mounting areas 290 of base 12 to ensure that tools or other external devices can not be inserted therein and touch an electrically active terminal. For this purpose, tabs 506 are sufficiently rigid so that they do not easily bend inwards. In the exemplary embodiment, terminal shield 504 (including tabs 506) is molded of thermoplastic material. Protections tabs 506 of the exemplary embodiment are not intended to help secure terminal shield 504 within slots 500 by way of an abutted engagement with cutouts 290. Rather, in order to facilitate the upward removal of terminal shield 504 from slots 500, each tab 506 preferably includes a chamfered region 506A which helps to channel or direct tab 506 outwardly around, and thereby minimize interference with, the upper ledge 290A (FIG. 51) of cutout 290.

Secondary Cover & shield Cover

Figure 54:
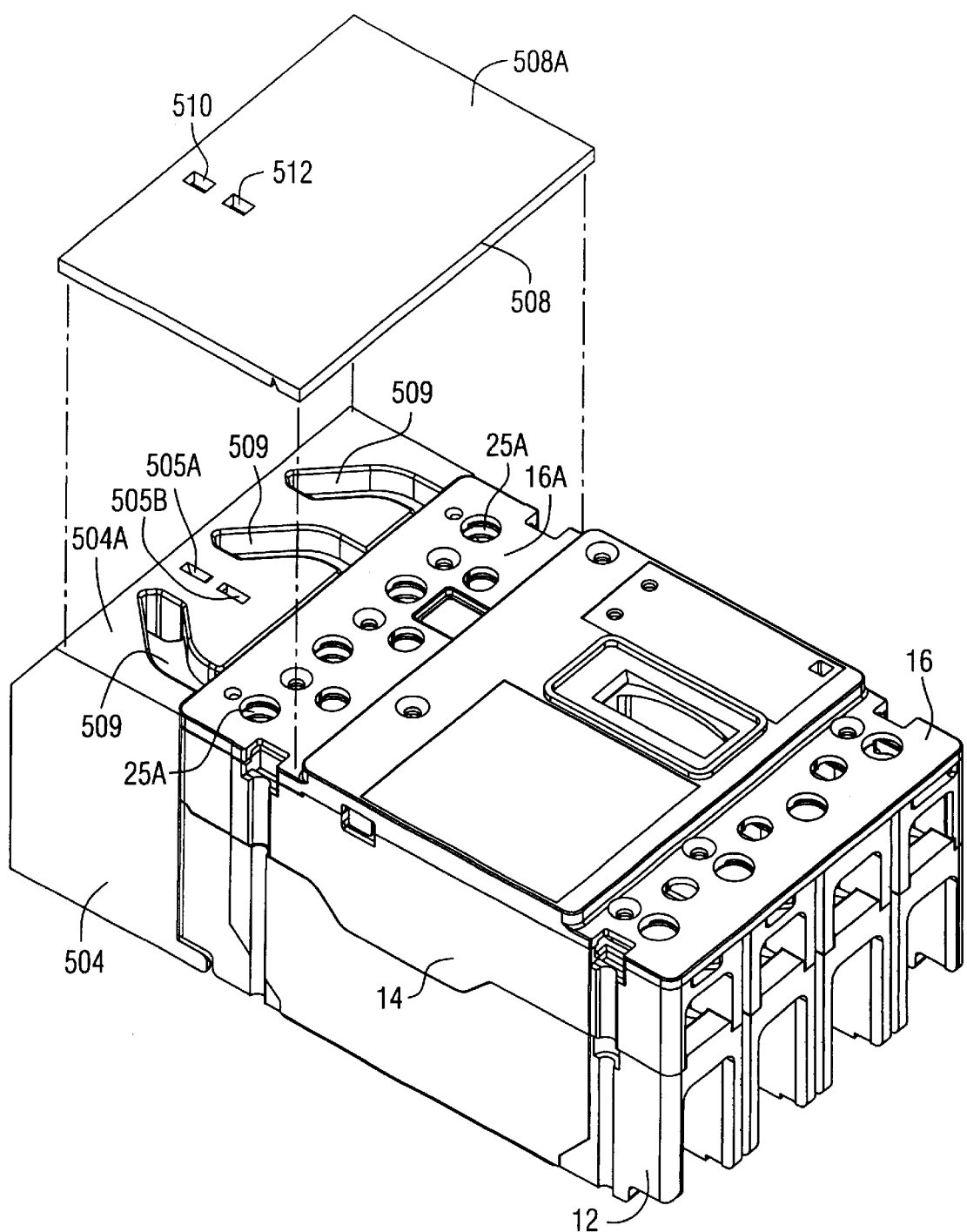
FIG. 54 is a partially exploded orthogonal view of a terminal shield cover in connection with the terminal shield, base, primary cover, and secondary cover of the circuit interrupter of FIG. 1.
Figure 55A:
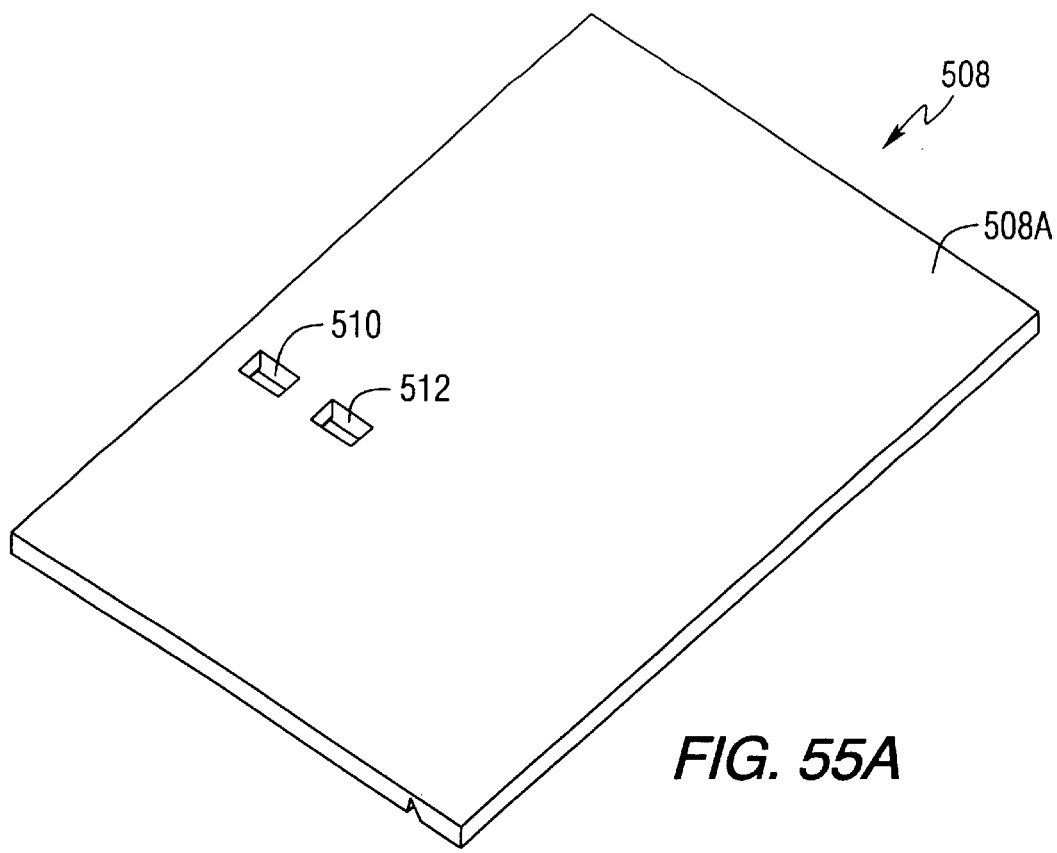
FIG. 55A is an orthogonal view of the terminal shield cover.
Figure 55B:
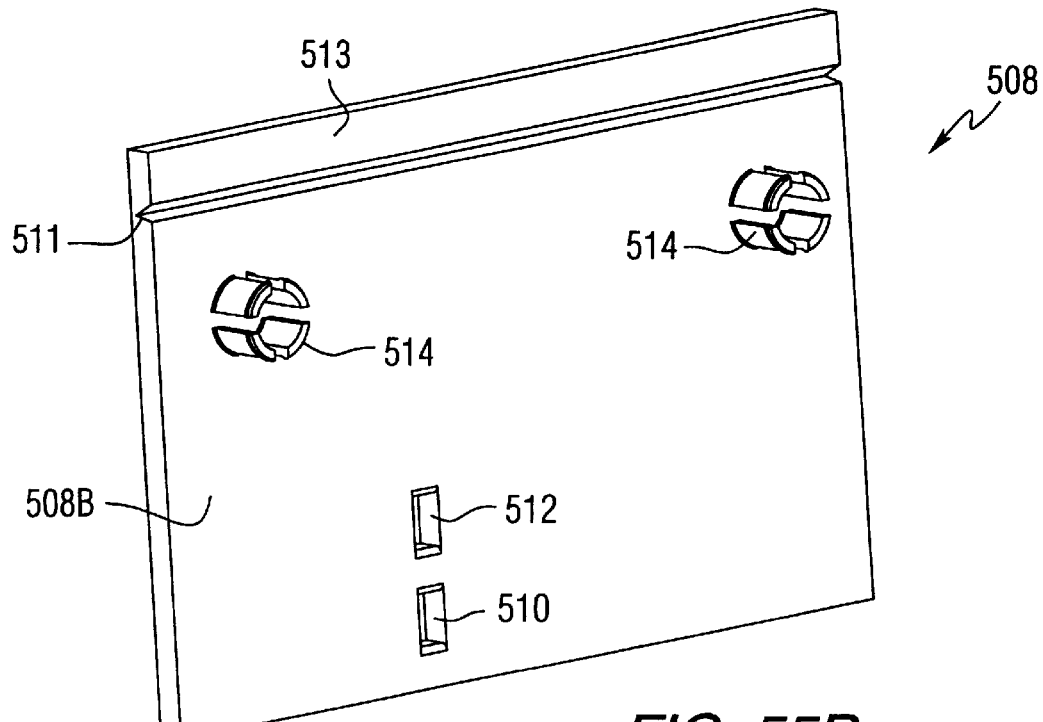
FIG. 55B is another orthogonal view of the terminal shield cover.
Figure 56:
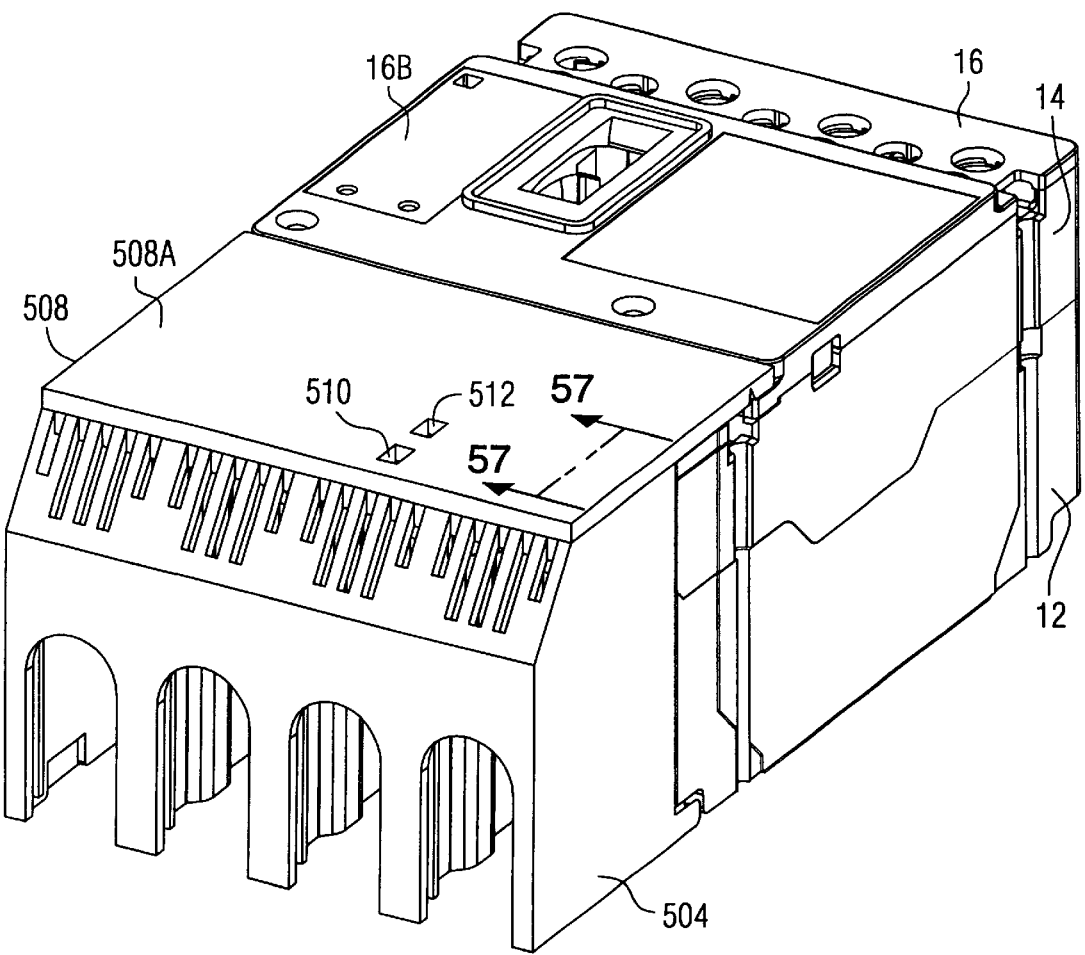
FIG. 56 is an orthogonal view of the terminal shield cover, terminal shield, base, primary cover, and secondary cover in a totally assembled state.

As shown in FIGS. 53 and 54, secondary cover 16 may be positioned on top of primary cover 14 after terminal shield 504 is fully inserted into slots 500. As shown, region 16A of secondary cover 16 covers the dovetail engagement between shield 504 and slots 500 (preventing removal of shield 504 without first removing cover 16), and is level with the top 504A of shield 504. After secondary cover 16 is so positioned, a terminal shield cover 508 may be positioned such that it overlaps region 16A of cover 16 and top 504A of shield 504, as shown in FIG. 56. As shown in FIG. 55B, the bottom surface 508B of cover 508 includes ribbed retaining protrusions 514 which engage holes 25A (FIG. 54) in secondary cover 16 and primary cover 14 and provide an interference fit therewith. When cover 508 is positioned as such, the top surface 508A thereof is desirably flush with the top surface 16B of secondary cover 16. In addition, cover 508 completely covers the holes in region 16A (FIG. 54) of secondary cover 16, and covers wire troughs 509 in top 504A of shield 504. As such, external access is prevented to those areas, thereby providing additional protection to an operator of circuit breaker 10, and thereby also preventing secondary cover 16 from being removed without first removing shield cover 508. As shown in FIGS. 55A and 55B, shield cover 508 includes openings 510 and 512 which are positioned on top of apertures 505A and 505B, respectively, of terminal shield 504, for purposes described below. Cover 508 also includes a elongated cutout portion or break line 511 that can be used to break off a region 513 in order to adapt a particular cover 508 for use with the load terminal end of circuit breaker 10. In the exemplary embodiment, terminal shield cover 508 is molded of thermoplastic material.

Figure 57:
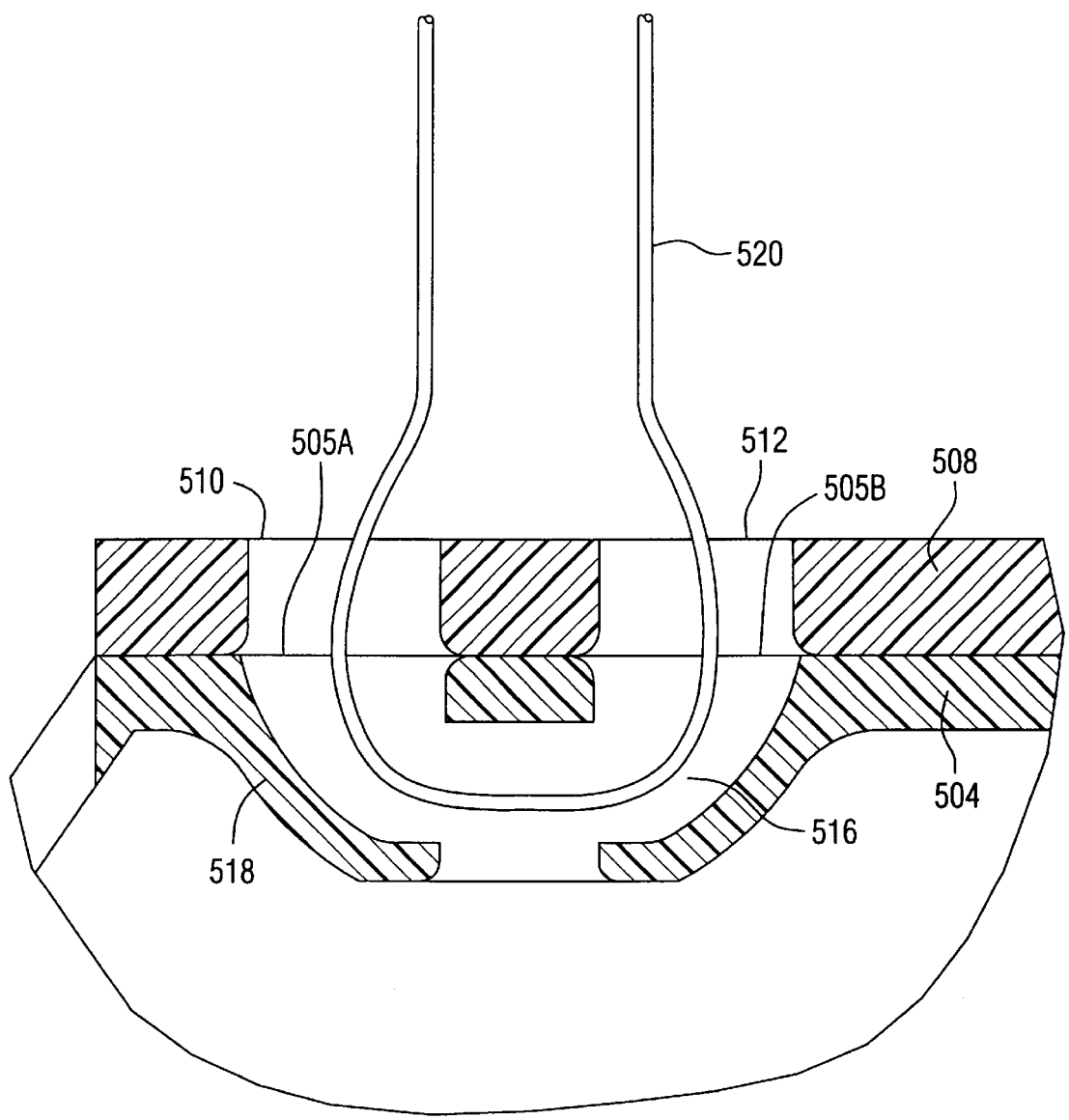
FIG. 57 is a cross-sectional, partially broken away view taken along the line 57—57 of FIG. 56 showing a wire seal arrangement.

Now referring also to FIG. 57, a cross-sectional view is shown taken along the lines 57—57 of FIG. 56. Openings 510 and 512 of shield cover 508 are shown positioned over apertures 505A and 505B, respectively, of terminal shield 504. A cavity 516 extends between apertures 505A and 505B. Cavity 516 is formed in a housing structure 518 that is molded into shield 504. As shown in FIG. 57, a wire 520 extends through openings 510 and 512 and through cavity 516, enabling a wire seal to be conveniently and effectively implemented. Such a wire seal is a tamper-evident device that will, upon proper inspection, indicate whether or not it was manipulated in order to remove terminal shield cover 508 from its disposition shown in FIG. 56.

DIN Rail Adaptor

Figure 58:
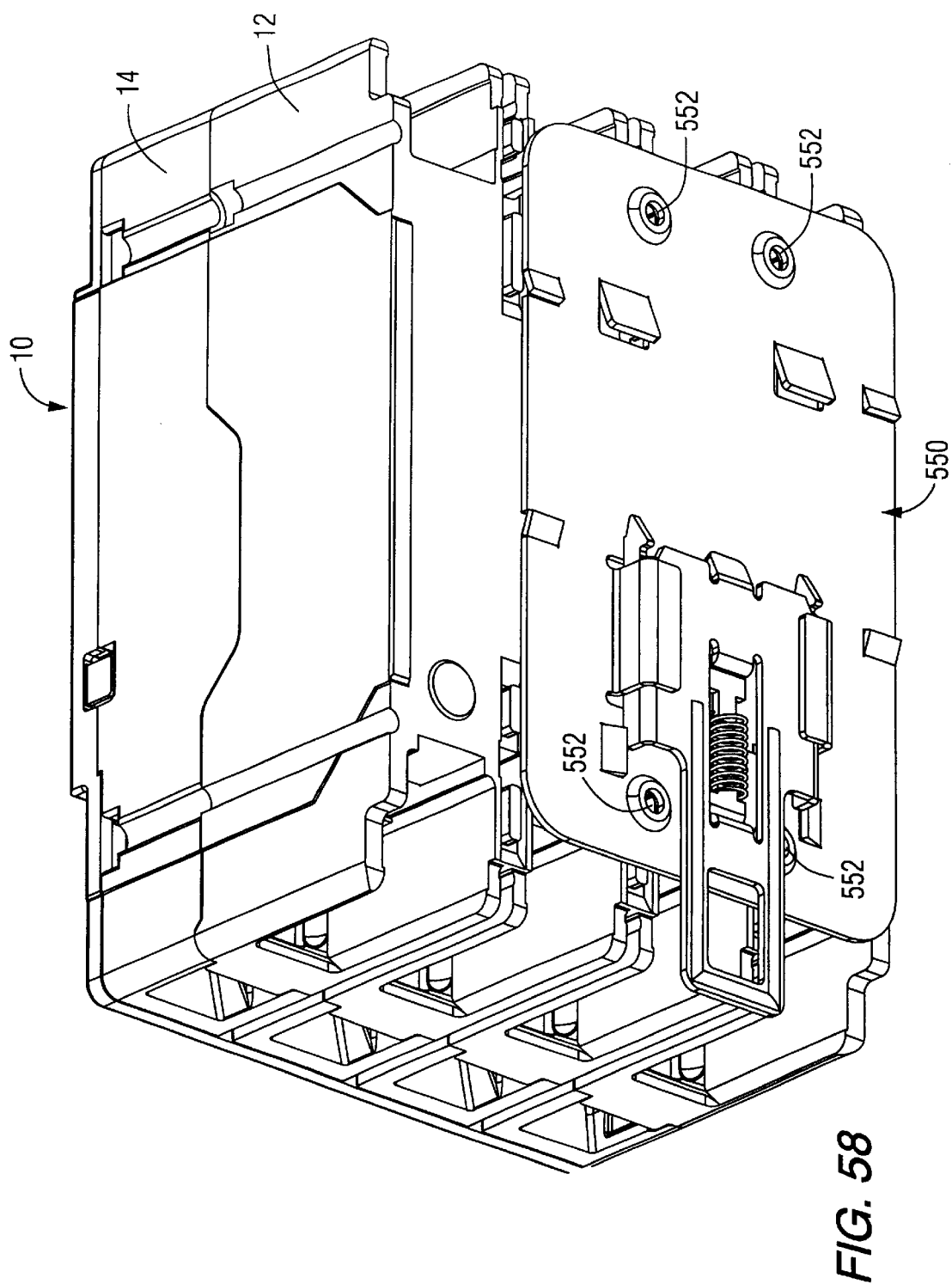
FIG. 58 is an orthogonal view of the circuit interrupter of FIG. 1 with a DIN rail adapter connected thereto.
Figure 59:
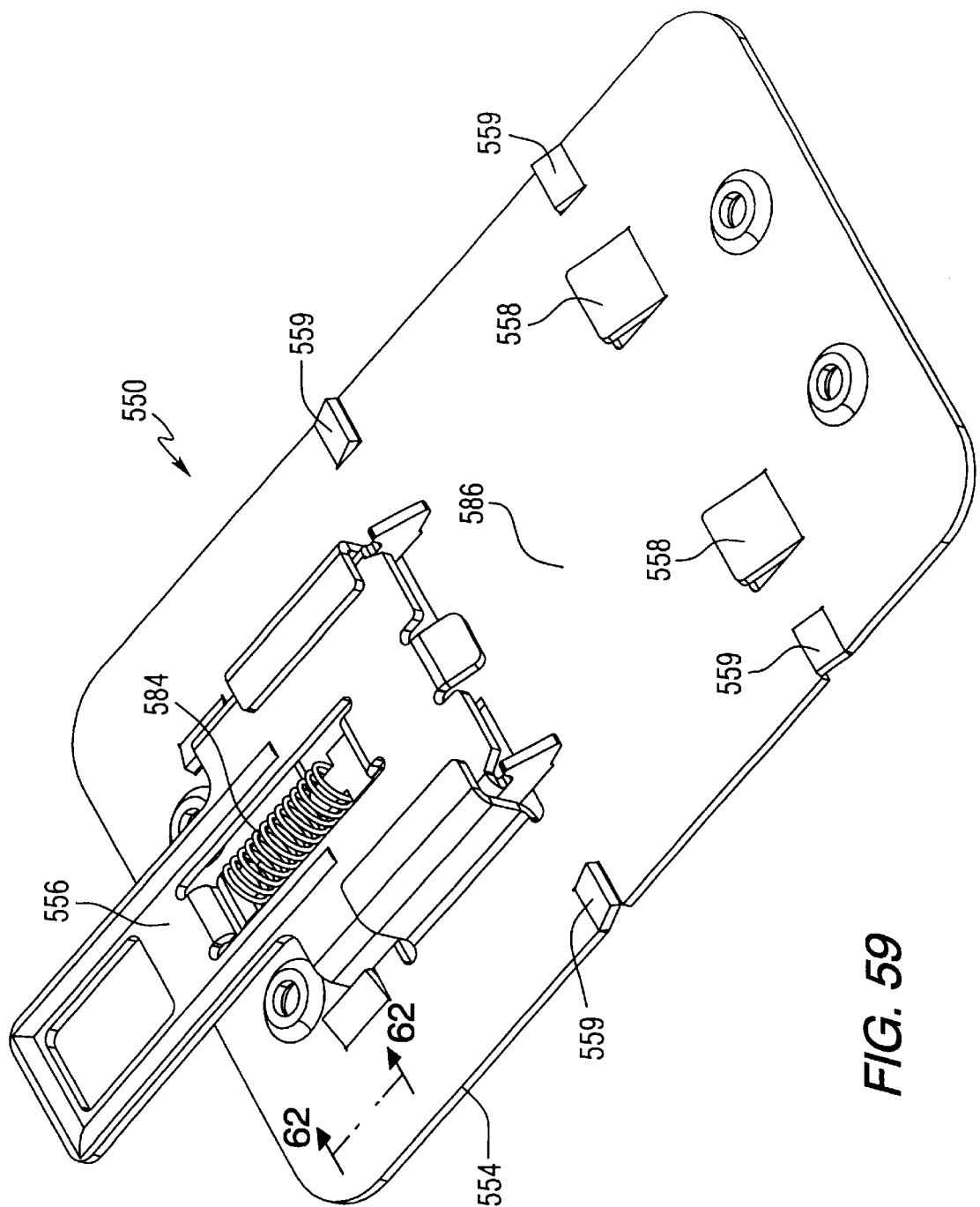
FIG. 59 is an orthogonal view of the DIN rail adapter.

Referring now to FIGS. 58 and 59, shown in FIG. 58 is circuit breaker 10 with a DIN rail adapter 550 positioned for connection to the bottom of base 12 by way of holes 552 that correspond to mounting holes 26 (FIG. 2) in circuit breaker 10. Such an adapter is used to enable attachment of circuit breaker 10 to a conventional DIN rail. As shown in FIG. 59, adapter 550 includes a backplate 554 engaged with a slider 556. In the exemplary embodiment, backplate 554 and slider 556 are made of stamped steel. Backplate 554 includes conventional tabs 558 that engage with a DIN rail, and stabilizing tabs 559 that enhance the stability of the engagement of backplate 554 with a DIN rail.

Figure 60:
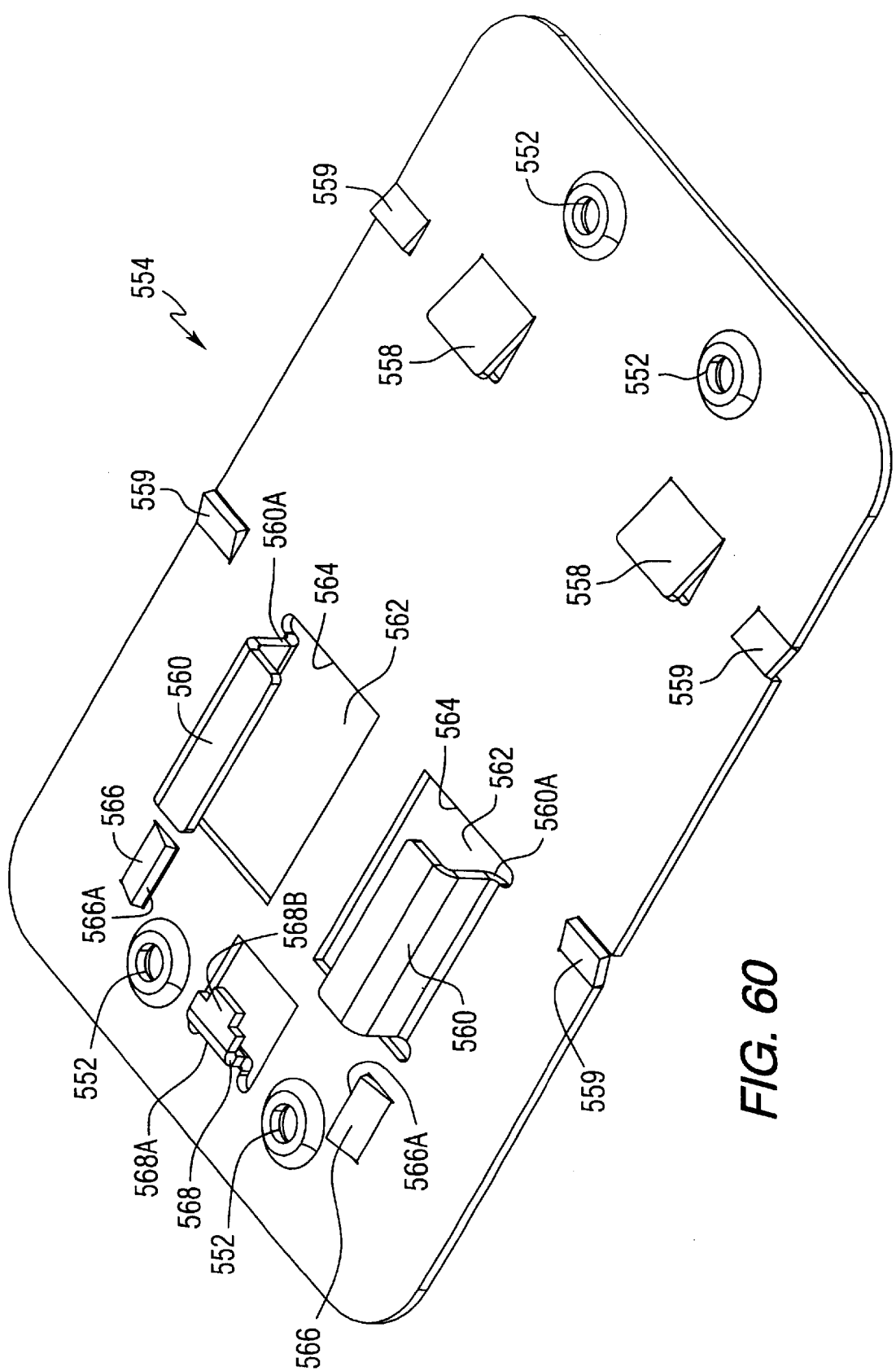
FIG. 60 is an orthogonal view of the backplate of the DIN rail adapter.

Referring now also to FIG. 60, backplate 554 also includes channeling portions or arms 560, for purposed described below. Adjacent to arms or guide members 560 are opening or cutouts 562, each with a bottom ledge 564. Rectangular stabilizing tabs 566 are provided above arms 560, each with an abutment surface 566A that is substantially in line with bottom 560A of an arm 560. Stabilizing tabs 566 are easily and conveniently stamped into backplate 554 using a simple lancing process that does not require any forming, bending, or curving of material. Also provided on backplate 554 is a curved protrusion 568 with a stop region 568A and a upper spring attachment region 568B.

Figure 61:
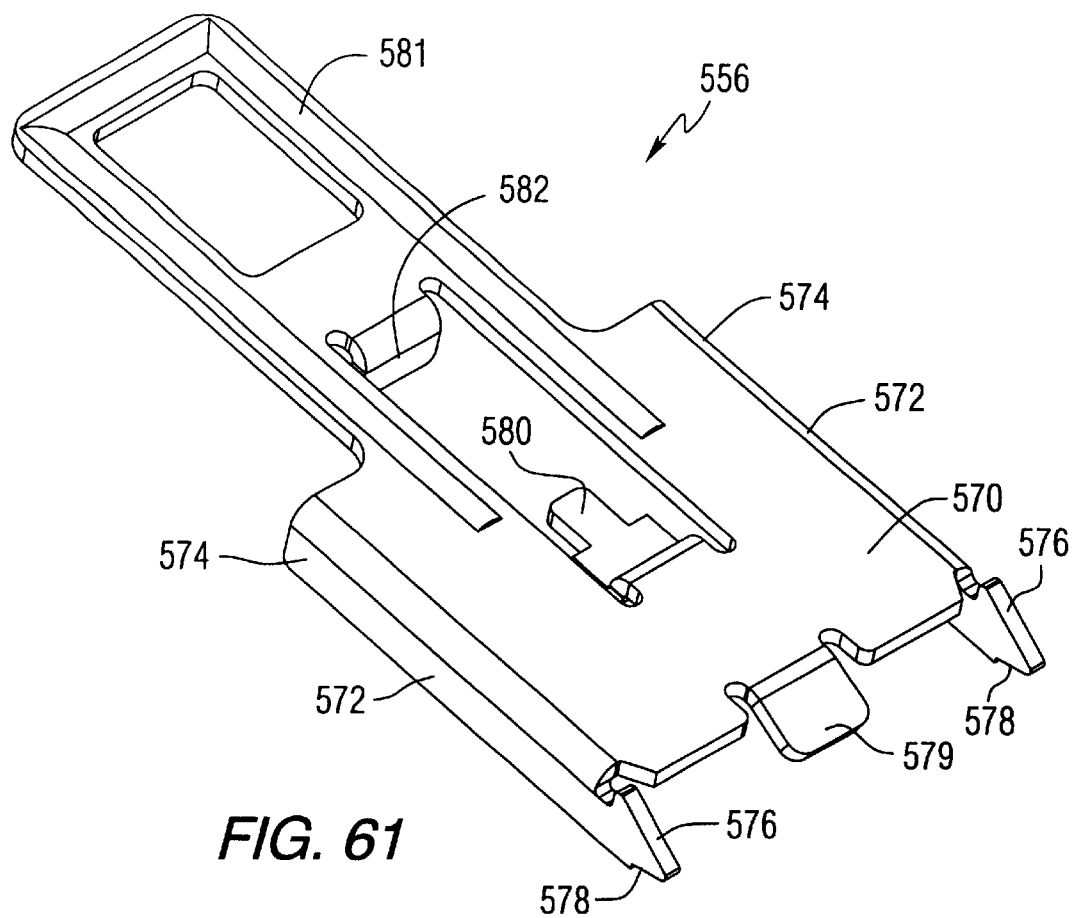
FIG. 61 is an orthogonal view of the slider of the DIN rail adapter.

Referring now also to FIG. 61, slider 556 includes a plate region 570 having elongated curved members 572. Each curved member 572 includes an upper region 574 and a lower engagement region 576. Each engagement region 576 includes a notch or cutout 578, for reasons discussed below. Plate region 570 of slider 556 also includes a stop protrusion 579 and a lower spring attachment region 580. Connected to plate region 570 is a handle portion 581 which includes a downwardly curved stop member 582.

Figure 62:
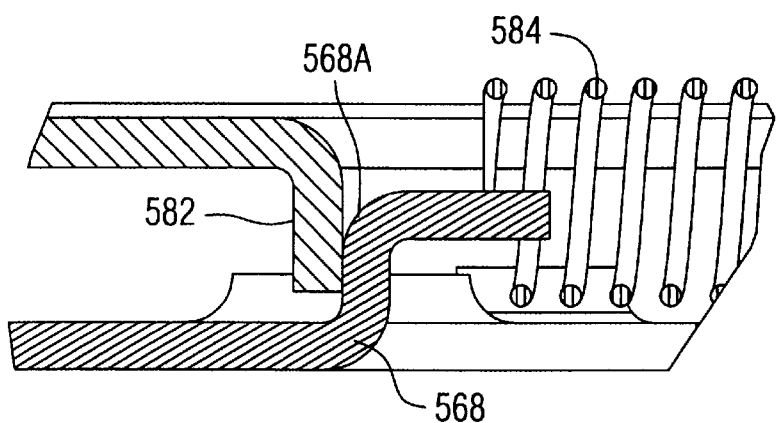
FIG. 62 is a cross-sectional, partially broken away view taken along the line 62—62 of FIG. 59 showing a stop mechanism.

As shown in FIG. 59 wherein backplate 554 and slider 556 are in an assembled state, plate region 570 is substantially positioned between channeling arms 560 of backplate 554. As such, channeling arms 560 will abut portions of curved members 572 if slider 556 is attempted to be laterally tilted. Cooperating with channeling arms 560 are stabilizing tabs 566 which provide lateral abutment to upper regions 574 of curved members 572 (which are not positioned between channeling arms 560) if slider 556 is attempted to be laterally tilted. Stabilizing tabs 566 thus provide enhanced stability to the connection between backplate 554 and slider 556. A spring 584 is shown connected between upper spring attachment region 568B of backplate 554 and lower spring attachment region 580 of slider 556. Positioned as such, slider 584 is spring biased in a downward direction, with the abutment of stop member 582 of slider 556 and stop region 568A of backplate 554 providing a limit to downward movement of slider 556 relative to backplate 554, as shown in the cross-sectional view shown in FIG. 62. FIG. 59 shows DIN rail adapter 550 in its closed disposition wherein a DIN rail could be securely engaged under lower engagement regions 576 of slider 556 and under tabs 558 of backplate 554.

In use, adapter 550 is placed in an open disposition in order to enable adapter 550 to be appropriately positioned on a DIN rail before the closed disposition is assumed. The open disposition is achieved by upwardly pulling handle portion 581 against the spring tension provided by spring 584. This causes slider 556 to slide upwards. Handle portion 581 is pulled until lower engagement regions 576 of slider 556 have sufficiently moved upwardly towards channeling portions 560 of backplate 554 to enable the DIN rail to make solid contact with surface 586. Thereafter, handle portion 581 is released, causing lower engagement regions 576 of slider 556 to ride over the DIN rail, leading to the closed disposition described above and shown in FIG. 59.

Figure 63:
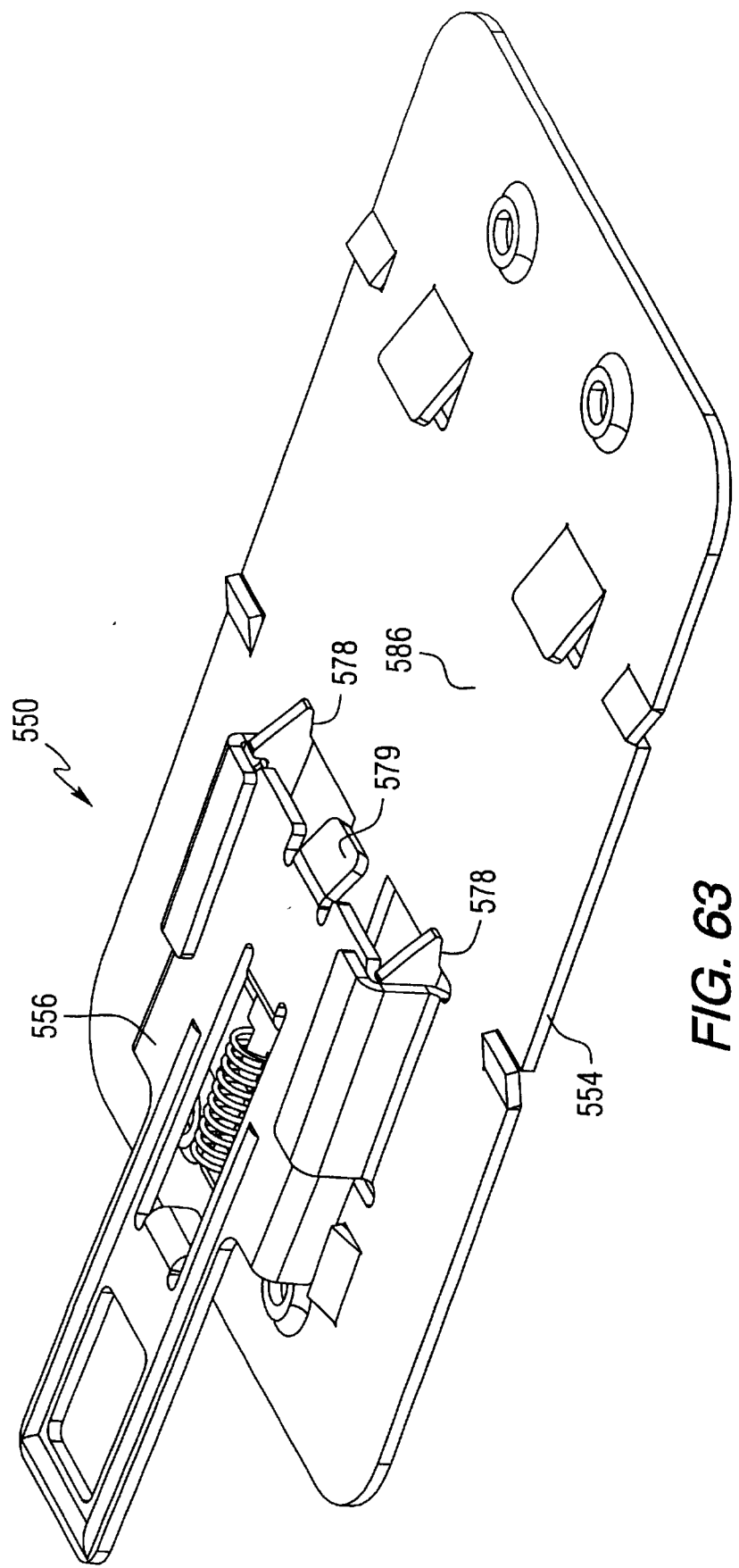
FIG. 63 is an orthogonal view of the DIN rail adapter in a locked-open state.

Referring now to FIG. 63, shown is DIN rail adapter 550 in a locked open disposition. This disposition is achieved by upwardly pulling handle portion 581 until lower engagement regions 576 are approximately above bottom ledges 564 of cutouts 562. Handle portion 581 is then tilted away from backplate 554, thereby enabling notches 578 of lower engagement regions 576 to be seated against bottom ledges 564. Stop protrusion 579 of slider 556 prevents lower engagement regions 576 from falling through cutouts 562 during the initiation of this seating process. The seating of notches 578 prevents slider 556 from sliding downwardly, thus enabling handle portion 581 to be released. In this locked open position, adapter 550 can be conveniently and advantageously positioned on a DIN rail without requiring constant manual pressure to hold slider 556 in a cleared disposition relative to surface 586. Once positioning on a DIN rail is achieved, handle portion 581 can be tapped towards backplate 554, thereby disengaging notches 578 from bottom ledges 564 which then leads to the closed disposition shown in FIG. 59.

Referring again to FIGS. 15 and 18, each of sideplates 106 in the preferred embodiment of circuit breaker 10 includes a pointed or raised region 600 and a pointed or raised region 602 along its top surface 106A. In the exemplary embodiment, pointed region or protrusion 600 is configured slightly differently from pointed region or protrusion 602.

Base & Cover Mounting

Figure 64:
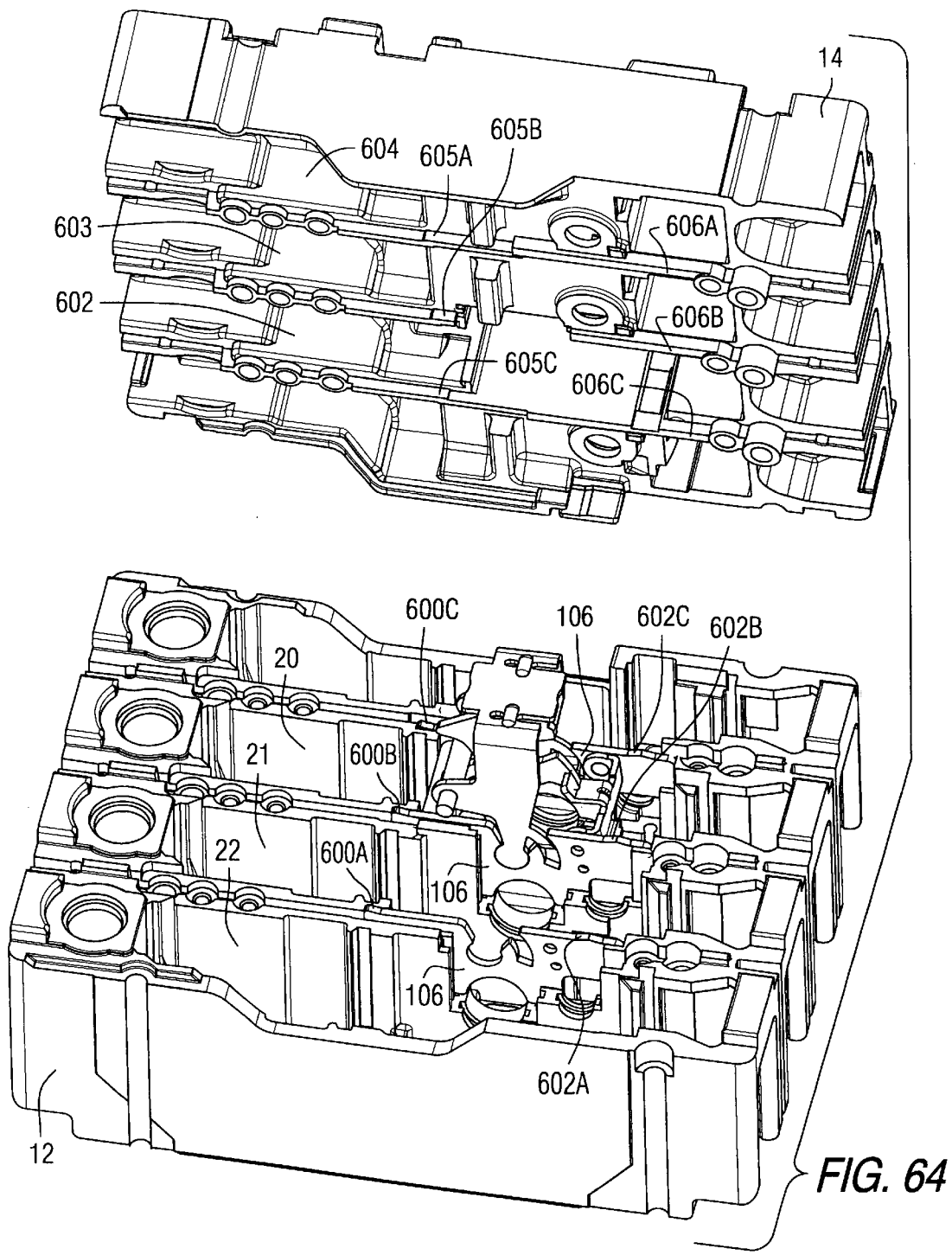
FIG. 64 is an exploded orthogonal view of the base and primary cover of the circuit interrupter of FIG. 1 with the sideplates positioned within the base.

Referring now also to FIG. 64, shown is a separated view of base 12 and primary cover 14 of circuit breaker 10, with sideplates 106 inserted into their assembled positions within base 12. For the sake of clarity, the other internal components of circuit breaker 10, including those components associated with sideplates 106, are not shown. Each of sideplates 106 is shown matched with one of internal phase walls 20, 21, and 22. In particular, each sideplate 106 is vertically slid into slots or channels (not shown) in its corresponding phase wall whereby a parallel disposition therewith is achieved. Primary cover 14 includes internal phase walls 602, 603, and 604 that correspond to internal phase walls 20, 21, and 22, respectively, of base 12. In particular, the bottom surfaces of internal phase walls 602, 603, and 604 are designed and configured to generally match up and mate together with the top surfaces of internals phase walls 20, 21, and 22, respectively, when primary cover 14 is positioned atop base 12 during the assembly process. In addition, where sideplates 106 are positioned within base 12, the bottom surfaces of internal phase walls 602, 603, and 604 are designed and configured to match up and mate together with the top surfaces 106A of sideplates 106, without accounting for the increased height of top surfaces 106A attributable to the presence of pointed regions 600 and 602 thereon. This mating together is important because sideplates 106, and the internal components associated therewith, constitute a "floating" mechanism that must be sufficiently held in place within base 12 in order to ensure proper positioning and functionality.

When sideplates 106 are slid into their respective phase walls of base 12, pointed regions 600 and 602 thereof protrude above the rest of top surfaces 106A and are positioned to make contact with the bottom surfaces of internal phase walls 602, 603, and 604 when primary cover 14 is positioned atop base 12. In particular, pointed regions 600A, 600B, and 600C make contact with substantially flat contact surfaces 605A, 605B, and 605C, respectively, and pointed regions 602A, 602B, and 602C make contact with substantially flat contact surfaces 606A, 606B, and 606C, respectively. Pointed regions 600 and 602 provide sufficient additional height to top surfaces 106A of sideplates 106 whereby they ensure that top surfaces 106A will substantially be the first areas within base 12 to be contacted by internal phase walls of primary cover 14 during the assembly process, thus ensuring proper engagement of sideplates 106. This is very beneficial because variability in parts and slight aberrations in the molding process can cause the internal phase walls of cover 14 to not mate perfectly with the internal phase walls of base 12 and top surfaces 106A of sideplates 106, potentially causing sideplates 106 to not be sufficiently engaged and held in place (if pointed regions 600 and 602 did not exist). When pointed regions 600 and 602 contact their respective contact surfaces, they accommodate further lowering of primary cover 14 onto base 12 (as cover 14 is screwed in place) by digging or piercing into the contact surfaces. In the exemplary embodiment, sideplates 106 (including pointed regions 600 and 602) are made of steel, and primary cover 14 is made of thermoset plastic.

Although the preferred embodiment of the present invention has been described with a certain degree of particularity, various changes to form and detail may be made without departing from the spirit and scope of the invention as hereinafter claimed.

We claim:

1. A DIN rail adapter for adapting a circuit interrupter for connection with a DIN rail, the adapter comprising:
   a backplate including guide members and a protrusion, said protrusion including a stop region and a first spring attachment region;
   a slider slideably disposed between said guide members and including a second spring attachment region, said slider further including a stop member; and
   a spring disposed between said first and second spring attachment regions for biasing said slider in a first direction, said stop member positioned to abut said stop region for limiting movement of said slider in said first direction.

2. The adapter as defined in claim 1 wherein said backplate includes a surface from which said protrusion upwardly extends, said protrusion curved to form a protrusion segment parallel with said surface, and wherein said stop region and said first spring attachment region are formed at opposite ends of said protrusion segment.

3. The adapter as defined in claim 1 wherein said stop member is a downwardly curved protrusion.

4. The adapter as defined in claim 1 wherein said slider includes a cutout having opposite ends, and wherein said stop member and said second spring attachment region are formed at said opposite ends of said cutout.

5. A DIN rail adapter for adapting a circuit interrupter for connection with a DIN rail, the adapter comprising:
   a backplate including guide members, an abutment portion, and a first spring attachment region;
   a slider slideably disposed between said guide members and including a second spring attachment region and an abutment member;
   a spring disposed between said first and second spring attachment regions for biasing said slider in a first direction; and
      wherein, when said slider is moved a predetermined distance in a second direction opposite to said first direction, said slider may be positioned in order to engage said abutment member with said abutment portion thereby preventing movement of said slider in said first direction.

6. The adapter as defined in claim 5 wherein said slider includes an engagement member for contacting a DIN rail, and wherein said abutment member of said slider is formed in said engagement member.

7. The adapter as defined in claim 6 wherein said backplate includes a opening forming a ledge, and wherein said ledge comprises said abutment portion.

8. The adapter as defined in claim 7 wherein said slider includes a stop protrusion positioned to contact said backplate and prevent said engagement member from protruding through said opening.

9. The adapter as defined in claim 5 wherein said backplate includes a opening forming a ledge, and wherein said ledge comprises said abutment portion.

10. The adapter as defined in claim 5 wherein said abutment member is a cutout.

11. The adapter as defined in claim 5 wherein said abutment member is a notch.

12. The adapter as defined in claim 5 wherein said backplate includes a second abutment portion and said slider includes a second abutment member, and wherein, when said slider is moved said predetermined distance in said second direction, said slider may be positioned in order to engage said second abutment member with said second abutment portion thereby preventing movement of said slider in said first direction.

13. The adapter as defined in claim 12 wherein said abutment member and said second abutment member are each a cutout.

14. The adapter as defined in claim 12 wherein said slider includes two engagement members for contacting a DIN rail, and wherein said abutment member and said second abutment member of said slider are each formed in one of said two engagement members.

15. The adapter as defined in claim 14 wherein said slider has two opposite sides, and wherein said two engagement members are positioned at said two opposite sides.

16. The adapter as defined in claim 14 wherein said backplate includes a first opening and a second opening, said first opening forming a first ledge comprising said abutment portion, said second opening forming a second ledge comprising said second abutment portion.

17. The adapter as defined in claim 16 wherein said slider includes a stop protrusion positioned to contact said backplate between said first and second openings and prevent said two engagement members from protruding through said first and second openings.

* * * * *